(12) United States Patent
Satori et al.

(10) Patent No.: US 7,719,774 B2
(45) Date of Patent: May 18, 2010

(54) ZOOM LENS SYSTEM AND ELECTRONIC IMAGE PICKUP APPARATUS USING THE SAME

(75) Inventors: Tomoyuki Satori, Kawagoe (JP); Toru Miyajima, Hachioji (JP); Masahiro Imamura, Hachioji (JP); Kazuya Nishimura, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 260 days.

(21) Appl. No.: 12/072,710

(22) Filed: Feb. 26, 2008

(65) Prior Publication Data

US 2008/0204892 A1 Aug. 28, 2008

(30) Foreign Application Priority Data

Feb. 27, 2007 (JP) ............................. 2007-047710

(51) Int. Cl.
*G02B 15/14* (2006.01)
(52) U.S. Cl. ...................................... 359/687; 359/690
(58) Field of Classification Search ................. 359/683, 359/677, 690
See application file for complete search history.

(56) References Cited

U.S. PATENT DOCUMENTS 7,151,638 B2  12/2006  Ohashi

2002/0097503 A1*  7/2002  Kohno et al. ................. 359/690
2003/0142412 A1*  7/2003  Shirasuna .................... 359/690

FOREIGN PATENT DOCUMENTS

| JP | 2005-242116 | 9/2005 |
|----|-------------|--------|
| JP | 2005-326743 | 11/2005 |
| JP | 2006-078979 | 3/2006 |

* cited by examiner

*Primary Examiner*—Scott J Sugarman
(74) *Attorney, Agent, or Firm*—Kenyon & Kenyon LLP

(57) ABSTRACT

In a zoom lens system, at a time of zooming from a wide angle end to a telephoto end, when focused on an object at a longest distance, at the telephoto end, a first lens unit moves to be positioned more toward an object side, than at a wide angle end, at the telephoto end, a second lens unit moves to be positioned more toward an image side, than at the wide angle end, at the telephoto end, an aperture stop and a third lens unit moves to be positioned more toward the object side, than at the wide angle end, and a combined system of the first lens unit and the second lens unit at the wide angle end has a negative refracting power, and at the time of zooming from the wide angle end to the telephoto end, the second lens unit is positioned more toward the object side than a position of the second lens unit at the wide angle end, and the first lens unit moves to be positioned more toward the object side, than at the wide angle end, at the intermediate zoom state, and in the intermediate zoom state, the aperture stop, the third lens unit, and an object point of the third lens unit move to be positioned more toward the object side, than at the wide angle end, and the zoom lens system satisfies predetermined conditional expressions.

30 Claims, 24 Drawing Sheets

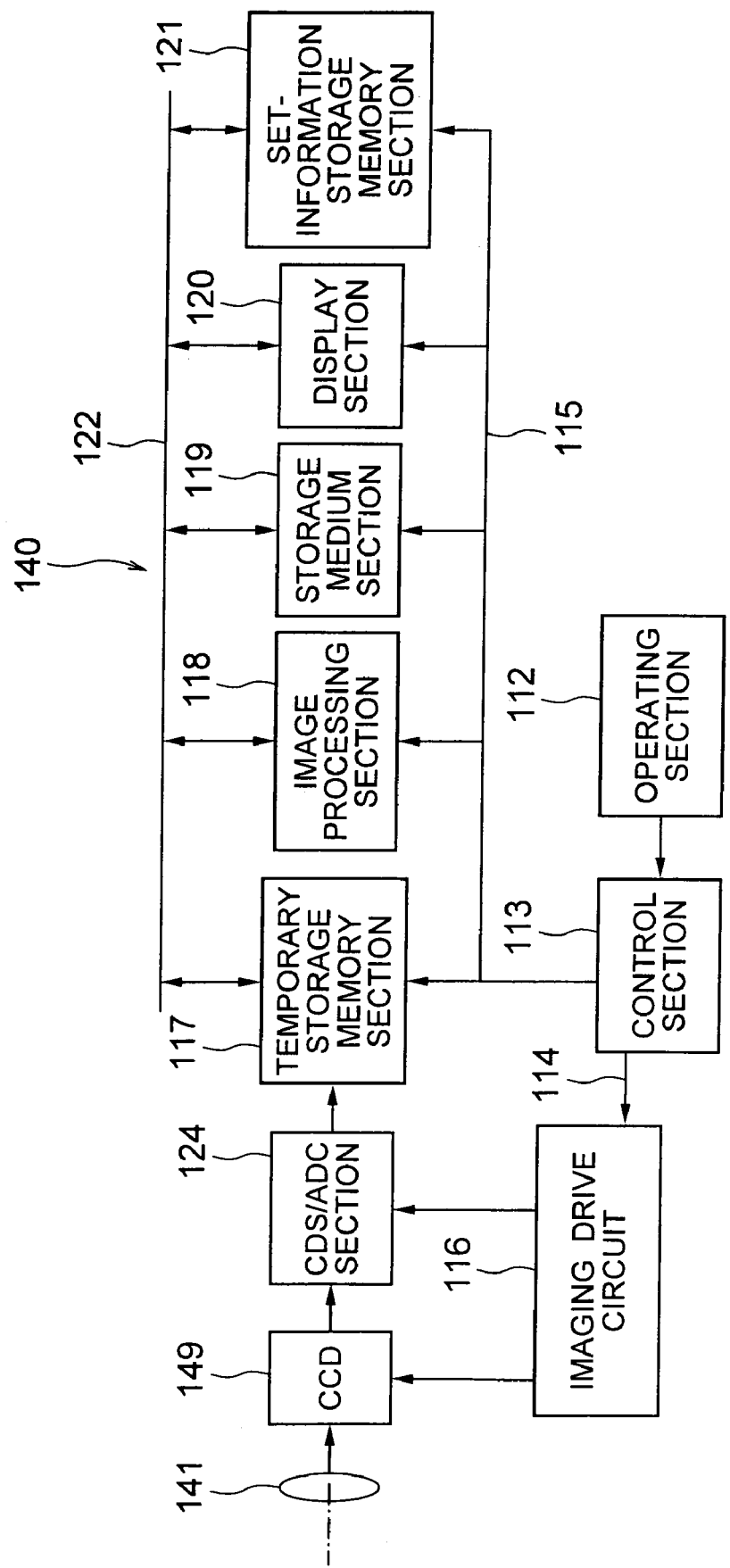

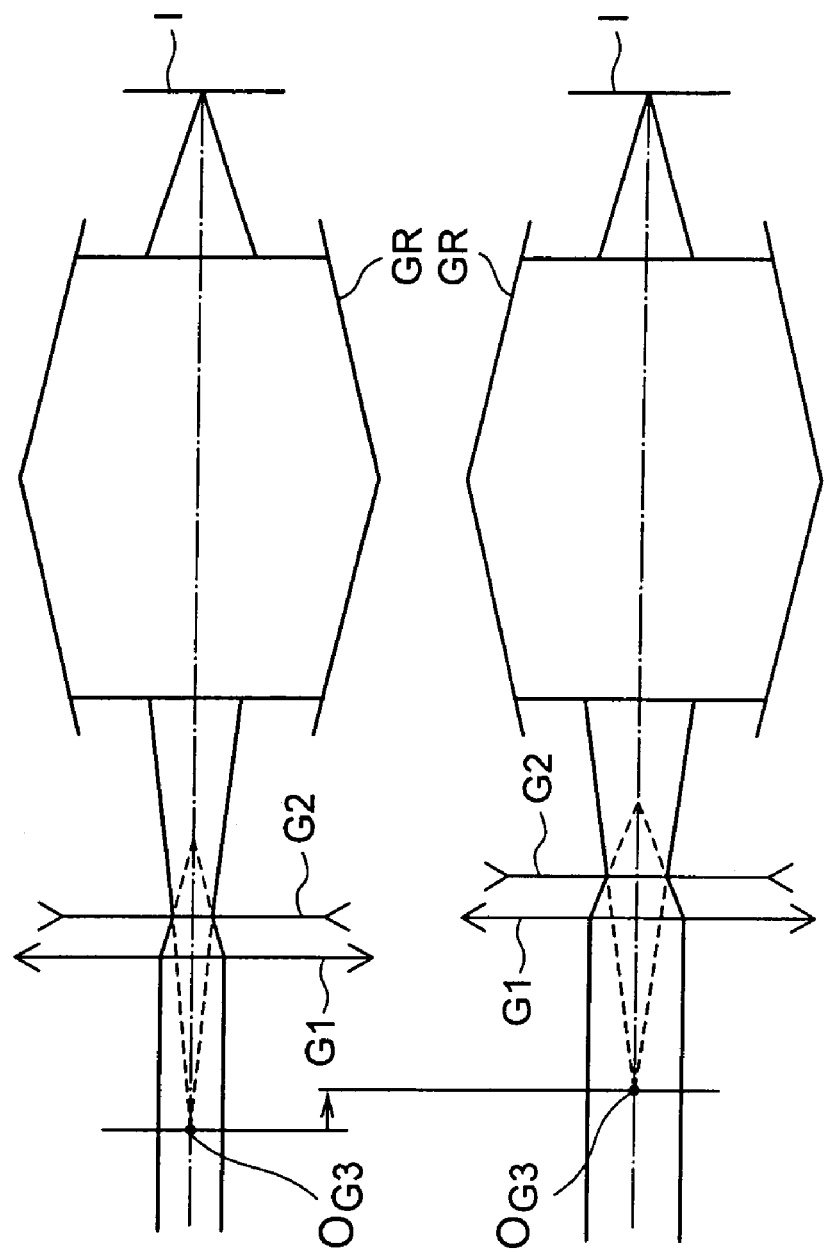

ZOOM LENS SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2007-047710 filed on Feb. 27, 2007; the entire contents of which are incorporated herein by reference.

BACKGROUND OF THE INVENTION

1. Field of the Invention

The present invention relates to a zoom lens system. Moreover, the present invention relates to an electronic image pickup apparatus such as a digital camera.

2. Description of the Related Art

In recent years, replacing a silver-salt film camera, a digital camera in which, an object is photographed by using a solid image pickup element such as a CCD (Charge Coupled Device) and a CMOS (Complementary Metal Oxide Semiconductor) has become a mainstream. Furthermore, there are several categories of digital cameras in a wide range, from a high-function type for professional use to a compact popular type. A user of the popular type digital camera seeks to enjoy photography readily, anywhere at any time with a wide range of scenes. In light of this, a small size camera, particularly a slim digital camera which can be accommodated easily in a pocket of clothes or a bag, and carried conveniently has been preferred.

On the other hand, while a magnification ratio of about 3 for a digital camera of a compact type has been common, a camera of a higher magnification ratio than the conventional one for widening a photography area has been sought.

As a type of a zoom lens system which is capable of achieving a high magnification (zooming) ratio, a zoom lens system having a structure of three or more lens units including in order from an object side, a first lens unit having a positive refracting power, a second lens unit having a negative refracting power, and a third lens unit having a positive refracting power has hitherto been known. For example, as a zoom lens system having approximately 4.5 times zooming ratio, zoom lens systems in Japanese Patent Application Laid-open Publication Nos. 2005-242116, 2005-326743, and 2006-78979 have hitherto been known.

In these zoom lens systems, for making it susceptible to have a magnification (zooming) function to a second lens unit and a third lens unit, at a telephoto end with respect to a wide angle end, a first lens unit and a third lens unit are moved toward an object side, and the second lens unit is either fixed or moved toward an image side.

SUMMARY OF THE INVENTION

According to one aspect of the present invention, a zoom lens system according to the present invention includes in order from an object side, a first lens unit having a positive refracting power, a second lens unit having a negative refracting power, and a rear lens group having a positive refracting power which includes a third lens unit having a positive refracting power, and an aperture stop which is disposed between the second lens unit and the third lens unit, and at a time of zooming from a wide angle end to a telephoto end, when focused on an object side at a longest distance, at the telephoto end, the first lens unit moves to be positioned more toward an object side, than at a wide angle end, at the telephoto end, the second lens unit moves to be positioned more toward the image side, than at the wide angle end, at the telephoto end, the aperture stop moves to be positioned more toward the object side, than at the wide angle end, at the telephoto end, the third lens unit moves to be positioned more toward the object side, than at the wide angle end, and a combined system of the first lens unit and the second lens unit at the wide angle end has a negative refracting power, and at the time of zooming from the wide angle end to the telephoto end, the second lens unit is positioned more toward the object side than a position of the second lens unit at the wide angle end, and when a state in which, the second lens unit is positioned closest to the object is defined as an intermediate zoom state, at the intermediate zoom state, the first lens unit moves to be positioned more toward the object side, than at the wide angle end, at the intermediate zoom state, the aperture stop moves to be positioned more toward the object side, than at the wide angle end, at the intermediate state, the third lens unit moves to be positioned more toward the object side, than at the wide angle end, and at the intermediate state, an object point of the third lens unit moves to be positioned more toward the object side, than at the wide angle end, and the zoom lens system satisfies the following conditional expression $$5.0 < f_t/f_w < 15.0 \qquad (21)$$

where, $f_w$ is a focal length at the wide angle end, of the entire zoom lens system, and $f_t$ is a focal length at the telephoto end, of the entire zoom lens system.

Moreover, according to another aspect of the present invention, an electronic image pickup apparatus according to the present invention includes a zoom lens system described above, and an image pickup element which converts an image formed by the zoom lens system to an electric signal.

BRIEF DESCRIPTION OF THE DRAWINGS

FIG. 1A shows a state at a wide angle end, FIG. 1B shows an intermediate state, and FIG. 1C shows a state at a telephoto end;

FIG. 9A shows a state at the wide angle end, FIG. 9B shows an intermediate state, and FIG. 9C shows a state at the telephoto end;

FIG. 21 is a structural block diagram of an internal circuit of main components of a digital cameral;

FIG. 22A and FIG. 22B are diagrams describing a function of an image forming optical system (zoom lens system) of the present invention;

DETAILED DESCRIPTION OF THE INVENTION

Figure 1A:
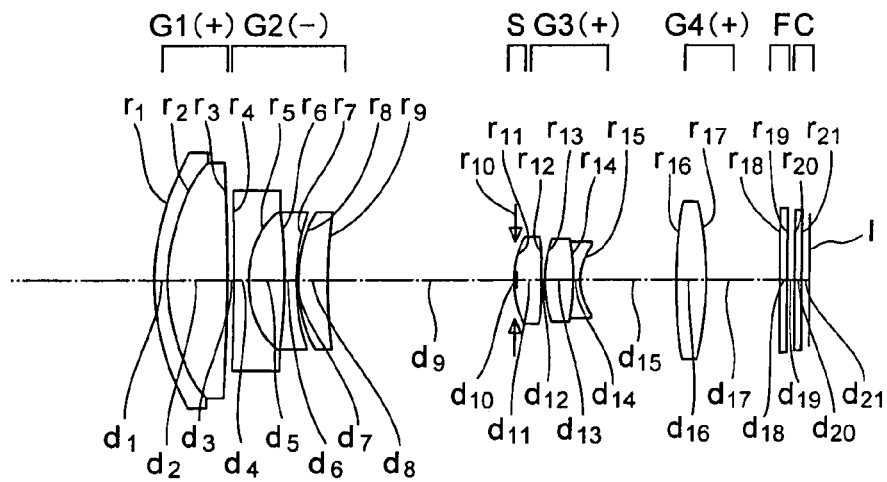
FIG. 1A, FIG. 1B, and FIG. 1C are cross-sectional views along an optical axis showing an optical arrangement at a time of infinite object point focusing according to a first embodiment of a zoom lens system of the present invention, where.

To solve the abovementioned issues and to achieve an object, a zoom lens system according to the present invention includes in order from an object side thereof a first lens unit having positive refracting power, a second lens unit having a negative refracting power, and a rear lens group having a positive refracting power, which includes a third lens unit having a positive refracting power, and an aperture stop which is disposed between the second lens unit and the third lens unit, and at a time of zooming from a wide angle end to a telephoto end, when focused on an object at a longest distance, at the telephoto end, the first lens unit moves to be positioned more toward an object side, than at a wide angle end, at the telephoto end, the second lens unit moves to be positioned more toward an image side, than at the wide angle end, at the telephoto end, the aperture stop moves to be positioned more toward the object side, than at the wide angle end, and at the telephoto end, the third lens unit moves to be positioned more toward the object side, than at the wide angle end, and a combined system of the first lens unit and the second lens unit at the wide angle end has a negative refracting power, and at the time of zooming from the wide angle end to the telephoto end, the second lens unit is positioned more toward the object side than a position of the second lens unit at the wide angle end, and when a state in which, the second lens unit is positioned closest to the object is defined as an intermediate zoom state, at the intermediate zoom state, the first lens unit moves to be positioned more toward the object side, than at the wide angle end, at the intermediate zoom state, the aperture stop moves to be positioned more toward the object side, than at the wide angle end, at the intermediate zoom state, the third lens unit moves to be positioned more toward the object side, than at the wide angle end, and at the intermediate zoom state, an object point of the third lens unit moves to be positioned more toward the object side, than at the wide angle end, and the zoom lens system satisfies the following conditional expression.

$$5.0 < f_t/f_w < 15.0 \tag{21}$$

where, $f_w$ is a focal length at the wide angle end, of the entire zoom lens system, and $f_t$ is a focal length at the telephoto end, of the entire zoom lens system.

A reason for and an effect of adopting the abovementioned arrangement in the zoom lens system will be described below. For making it easy to achieve a high magnification ratio (zooming ratio), the zoom lens system of the present invention includes in order from an object side thereof, a first lens unit having a positive refracting power, a second lens unit having a negative refracting power, and a a rear lens unit having a positive refracting power, which includes third lens unit having a positive refracting power.

Moreover, at the time of zooming from the wide angle end to the telephoto end, at the telephoto end, the first lens unit moves to be positioned more toward an object side, than at the wide angle end, at telephoto end, the second lens unit moves to be positioned more toward an image side, than at the wide angle end, and at the telephoto end, the third lens unit moves to be positioned more toward the object side, than at the wide angle end.

By having such an arrangement, a load of zooming) is distributed effectively between the second lens unit and the third lens unit, and an amount of movement of each lens unit is prevented from being substantial while suppressing a change in aberration at the time of zooming to be small, which leads to a compactness of the zoom lens system.

Moreover, an aperture stop is disposed between the second lens unit and the third lens unit, and at the telephoto end, the aperture stop moves to be positioned more toward the object side, than at the wide angle end. Accordingly, a height of incidence of off-axis ray which is incident on the third lens unit is suppressed, which is advantageous for making small a size of the third lens unit, and it becomes easy to secure a space in which the third lens unit moves.

Moreover, by moving the aperture stop, an effective correction of a chromatic aberration of magnification and distortion becomes possible, and it is possible to have an effect from a performance point of view.

Moreover, for making it easy to suppress an overall length of the zoom lens system at the wide angle end, according to the present invention, an arrangement is made such that a combined system of the first lens unit and the second lens unit has a negative refracting power at the wide angle end, and at the time of zooming of the second lens unit from the wide angle end to the telephoto end, an area which moves in a locus of convexity toward the object side is imparted.

Concretely, at the time of zooming from the wide angle end to the telephoto end, the second lens unit is positioned more toward the object side than a position of the second lens unit at the wide angle end, and when a state in which, the second lens unit is positioned closest to the object is defined as an intermediate zoom state, at the intermediate zoom state, the first lens unit moves to be positioned more toward the object side, than at the wide angle end, at the intermediate zoom step, the aperture stop moves to be positioned more toward the object side, than at the wide angle end, at the intermediate zoom state, the third lens unit moves to be positioned more toward the object side, than at the wide angle end, and at the intermediate zoom state, an object point of the third lens unit moves to be positioned more toward the object side, than at the wide angle end.

A function according to this structure will be described by using schematic diagrams in FIG. 22A and FIG. 22B, FIG. 23A, and FIG. 23B. FIG. 22A is a diagram describing a case in which an object point ($O_{G3}$) of the third lens unit moves toward the image side at the time of zooming from the wide angle end to a state in a half way of zooming. FIG. 22B is a diagram describing a case in which the object point ($O_{G3}$) of the third lens unit moves toward the object side at the time of zooming from the wide angle end to a state in a half way of zooming.

By letting a combined system of the first lens unit (G1) and the second lens unit (G2) at the wide angle end to be a front lens group having a negative refracting power, a retro focus lens system at a wide angle end is formed along with the rear lens group (GR) having the positive refracting power.

Figures 23A, 23B:
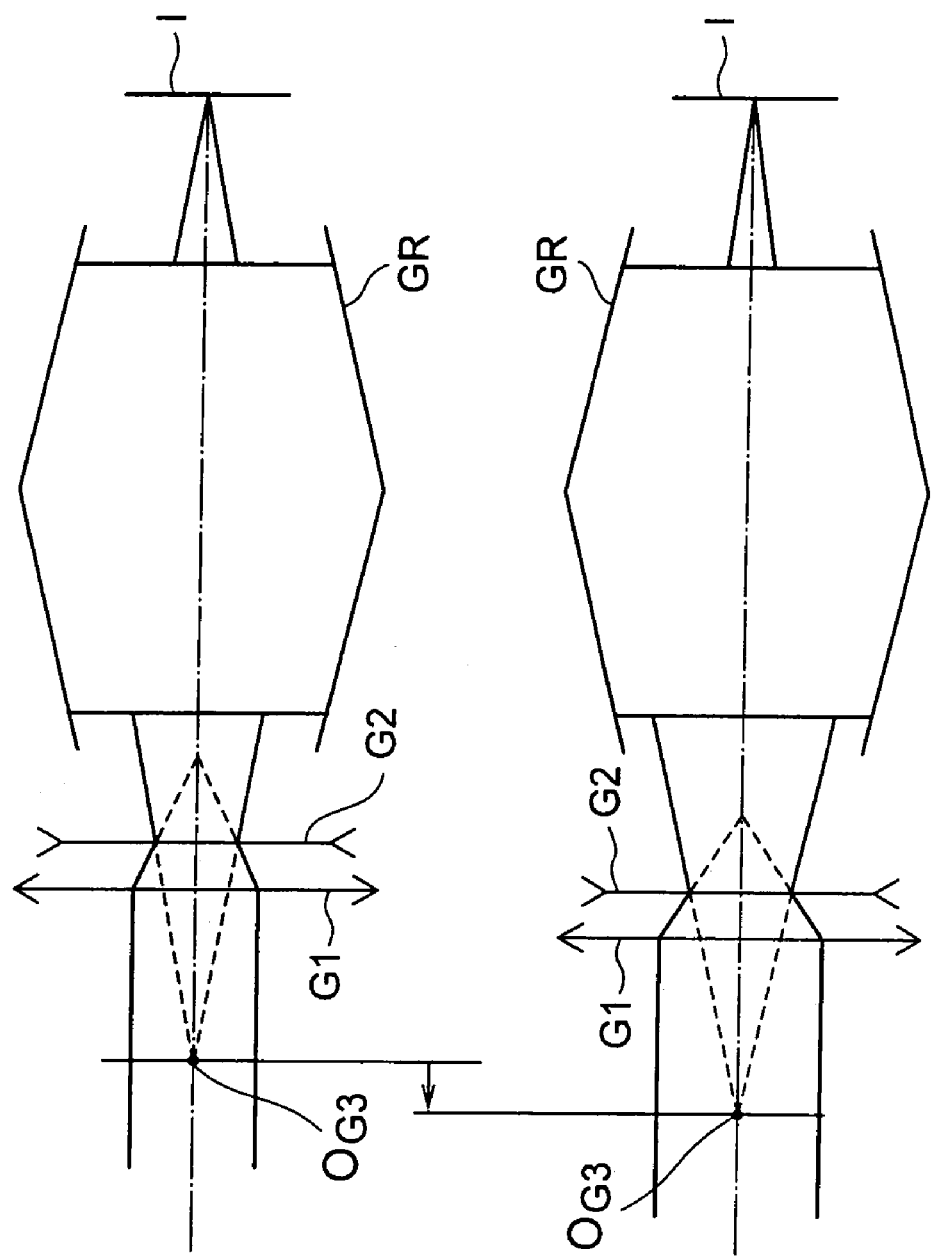
FIG. 23A and FIG. 23B are other diagrams describing the function of the image forming optical system (zoom lens system) of the present invention.

At this time, when an arrangement is let to be such that the object point ($O_{G3}$) of the third lens unit moves toward the image side at the time of zooming at the wide angle end side as in FIG. 22A, an arrangement becomes such that a change in an image plane position cannot be compensated if the second lens unit is not moved to the image side at the time of zooming. In other words, the total length at the wide angle end cannot be changed. On the other hand, when an arrangement is made such that the object point ($O_{G3}$) of the third lens unit moves toward the object side at the time of magnifying as shown in FIG. 23A and FIG. 23B, it is possible to move the first lens unit and the second lens unit toward the object side at the time of zooming at the wide angle end. In other words, it is advantageous for shortening the total length at the wide angle end.

Moreover, by moving the second lens unit toward the object side from the wide angle end to the intermediate zoom state, it becomes easy to suppress a change in the distance between the first lens unit and the second lens unit, and to suppress a change in the aberration.

By moving the third lens unit to be positioned more toward the object side at the intermediate zoom state than at the wide angle end, it is possible to let the third lens unit have a zooming load at the wide angle end (zooming from the wide angle end to the intermediate zoom state).

Moreover, by moving the first lens unit to be positioned more toward the object side at the intermediate zoom state than at the wide angle end, it is possible to secure a range of movement of the second lens unit, toward the object side. By moving the aperture stop to be positioned more toward the object side at the intermediate zoom state, than at the wide angle end, a height of the off-axis light ray incident on the first lens unit and the second lens unit is suppressed to be low.

Decreasing an outer diameter of the first lens unit at the wide angle end in particular, is advantageous for making compact the size in a direction of thickness of the lens. Moreover, the abovementioned movement of the aperture stop is advantageous for securing a zoom range in which an angle of incidence on an image pickup element is favorable in the zoom range.

On the other hand, at the time of a movement of the second lens unit to a telephoto end (zooming from the intermediate zoom state to the telephoto end), the second lens unit may be moved toward the image side such that the second lens unit is positioned more toward the image side at the telephoto end than at the wide angle end, and the second lens unit may be let to have a zooming function. It is possible to reduce a load of zooming on the third lens unit at the telephoto end. Moreover, it is possible to make it easy to suppress a change in $F_{NO}$, and it is advantageous for securing brightness at the telephoto end.

Conditional expression (21) is an expression which specifies a zooming ratio of the zoom lens system. By securing the zooming ratio by making an arrangement such that a lower limit value is less than a lower limit value in the conditional expression (21), it is possible to exert sufficiently a function which enables to have both compactness and a high zooming ratio of the zoom lens system of the present invention. On the other hand, it is preferable to make it easy to secure an optical performance and to shorten the overall length of the zoom lens system by making an arrangement such that an upper limit value is not higher than an upper limit value in the conditional expression (21).

It is preferable to let the lower limit value in the conditional expression (21) to be 5.5, and a lower limit value of 6.0 is more preferable. It is preferable to let the upper limit value in the conditional expression (21) to be 12.0, and an upper limit value of 10.0 is more preferable. The arrangement described above, and each of the arrangements that will be described below, are arrangements in which, the zoom lens system is focused on an object at the longest distance.

It is desirable that the zoom lens system satisfies the following conditional expressions with regard to the zooming from the wide angle end to the telephoto end.

$$0.06 < \Delta 2G\_{ws}/f_w < 1.5 \qquad (1)$$

$$-0.6 < \Delta 2G\_{st}/f_t < -0.02 \qquad (2)$$

where, $\Delta 2G\_{ws}$ is a difference in a distance of a position of the second lens unit at the wide angle end and a position of the second lens unit at the intermediate zoom state, $\Delta 2G\_{st}$ is a difference in a distance of a position of the second lens unit at the intermediate zoom state and a position of the second lens unit at the telephoto end, $f_w$ is a focal length at the wide angle end, of the entire zoom lens system, and $f_t$ is a focal length at the telephoto end, of the entire zoom lens system, and a reference numeral in a direction of advancement toward the image side has a minus sign, and a reference numeral in a direction of advancement toward the object side has a plus sign.

A reason for and an effect of adopting the abovementioned arrangement in the zoom lens system will be described below. Conditional expression (1) is an expression which specifies an amount of movement of the second lens unit from the wide angle end to the intermediate zoom state.

By making an arrangement such that a lower limit value is not lower than a lower limit value in conditional expression (1), an amount of movement toward the object side of the second lens unit at the zooming at the wide angle side is secured, and it becomes easy to suppress a change in a distance between the first lens unit and the second lens unit, which is advantageous for making small a diameter of the first lens unit. Moreover, it becomes easy to suppress a change in an oblique aberration at the time of zooming to the wide angle end. By making an arrangement such that an upper limit value is not higher than an upper limit value in the conditional expression (1), it becomes easy to secure a zooming load of the second lens unit which is advantageous for having a high zooming ratio.

Conditional expression (2) is an expression which specifies an amount of movement of the second lens unit from the intermediate zoom state to the telephoto end. By making an arrangement such that a lower limit value is not lower than a lower limit value in the conditional expression (2), it becomes easy to suppress the amount of movement of the second lens unit, and to suppress an increase in a size of a lens barrel which is for moving the second lens unit. By making an arrangement such that an upper limit value is not higher than an upper limit value in the conditional expression (2), a zooming function by the second lens unit is secured, which is advantageous for having a high zooming ratio. Moreover, it is advantageous for securing brightness at the telephoto end.

It is preferable to let the lower limit value in conditional expression (1) to be 0.09, and a lower limit value of 0.12 is more preferable. It is preferable to let the upper limit value in conditional expression (1) to be 1.0, and an upper limit value of 0.5 is more preferable. It is preferable to let the lower limit value in conditional expression to be −0.3, and a lower limit value of −0.15 is more preferable. It is preferable to let the upper limit value in conditional expression (2) to be −0.03, and an upper limit value of −0.04 is more preferable.

Furthermore, it is desirable that the zoom lens system satisfies the following conditional expression at the time of zooming from the wide angle end to the telephoto end.

$$0.9 < \Delta 1G\_{ws}/\Delta 2G\_{ws} < 10.0 \quad (A)$$

$$-2.0 < \Delta 1G\_{st}/\Delta 2G\_{st} < 0.3 \quad (B)$$

$$2.0 < \Delta 3G\_{ws}/\Delta 2G\_{ws} < 10.0 \quad (C)$$

$$-1.5 < \Delta 3G\_{st}/\Delta 2G\_{st} < 0.5 \quad (D)$$

where, $\Delta 1G\_{ws}$ is a difference in a distance of a position of the first lens unit at the wide angle end and a position of the first lens unit at the intermediate zoom state, $\Delta 1G\_{st}$ is a difference in a distance of a position of the first lens unit at the intermediate zoom state and a position of the first lens unit at the telephoto end, $\Delta 3G\_{ws}$ is a difference in a distance of a position of the third lens unit at the wide angle end and a position of the third lens unit at the intermediate zoom state, and $\Delta 3G\_{st}$ is a difference in a distance of a position of the third lens unit at the intermediate zoom state and a position of the third lens unit at the telephoto end, and a reference numeral in a direction of advancement toward the image side has a minus sign and a reference numeral in a direction of advancement toward the object side has a plus sign.

A reason for and an effect of adopting the abovementioned arrangement in the zoom lens system will be described below. Conditional expressions (A), (B), (C), and (D) are expressions which specify a relation of the movement of the first lens unit, the second lens unit, and the third lens unit. By satisfying each of the conditional expressions (A), (B), (C), and (D), the rear lens group including the third lens unit is let to have a zooming function at the wide angle side, it is possible to secure a zooming function at the second lens unit at the telephoto side, and it becomes easy to have a balance between securing of the zooming ratio and shortening of the overall length.

Conditional expressions (A) and (B) are expressions which specify about a relationship between the movement of the first lens unit and the movement of the second lens unit. By making an arrangement such that a lower limit value is not lower than a lower limit value in the conditional expression (A), it is possible to suppress an excessive widening of an axial distance between the first lens unit and the second lens unit at the wide angle end, which is advantageous for making small the diameter of the first lens unit. By making an arrangement such that an upper limit value is not higher than an upper limit value in conditional expression (A), it is possible to suppress the amount of movement of the first lens unit at the wide angle end, and it becomes easy to suppress the total length of the zoom lens system in the intermediate zoom state.

By making an arrangement such that a lower limit value is not lower than a lower limit value in conditional expression (B), the amount of movement of the first lens unit at the telephoto end is suppressed, which is advantageous for shortening the total length of the zoom lens system at the telephoto end. By making an arrangement such that an upper limit value is not higher than an upper limit value in conditional expression (B), a change in the distance between the first lens unit and the second lens unit at the telephoto side is secured, and it becomes easy to secure a zooming ratio by securing the zooming function of the second lens unit at the telephoto side.

Conditional expressions (C) and (D) are expressions which specify a relationship between the movement of the second lens unit and the movement of the third lens unit. By making an arrangement such that a lower limit value is not lower than a lower limit value in conditional expression (C), it becomes easy to have a high zooming ratio by securing a contribution to zooming, of the third lens unit at the wide angle end. By making an arrangement such that an upper limit value is not higher than an upper limit value in conditional expression (C), a distance between the second lens unit and the third lens unit at the wide angle end is suppressed, and it becomes easy to make small the overall length of the zoom lens system at the wide angle end.

By making an arrangement such that a lower limit value is not lower than a lower limit value in conditional expression (D), it becomes easy to secure a zooming load of the second lens unit at the telephoto side, and moreover, it is advantageous also for securing brightness at the telephoto end. By making an arrangement such that an upper limit value is not higher than an upper limit value in conditional expression (D), a distance from the first lens unit up to an entrance pupil at the telephoto end is suppressed, which is advantageous for making small the diameter of the first lens unit.

It is preferable to let the lower limit value in conditional expression (A) to be 1.0. It is more preferable to let the upper limit value in conditional expression (A) to be 6.0. It is preferable to let the lower limit value in conditional expression (B) to be −0.1. It is more preferable to let the upper limit value in conditional expression (B) to be 0.0. It is preferable to let the lower limit value in conditional expression (C) to be 2.5. It is more preferable to let the upper limit value in conditional expression (C) to be 7.0. It is preferable to let the lower limit value in conditional expression (D) to be −1.2. It is more preferable to let the upper limit value in conditional expression (D) to be 0.3.

Moreover, in the zoom lens system, it is preferable to make the following arrangement.

It is preferable that the rear lens group includes a fourth lens unit having a positive refracting power, which is disposed toward the image side of the third lens unit, and the zoom lens system is a four-unit zoom lens system.

A reason for and an effect of adopting the abovementioned arrangement will be described below. By letting the rear lens group having a positive refracting power to be two lens unit having the positive refracting power, it is further advantageous for shorting the overall length of the zoom lens system. Particularly, when the fourth lens unit is let to be positioned more toward the image side at the telephoto end, than at the wide angle end, the zooming function is also borne by the fourth lens unit, and it is even more advantageous for securing the zooming ratio.

Moreover, in the zoom lens system, it is preferable that the following conditional expressions are satisfied.

$$0.8 < \beta_{4Gs}/\beta_{4Gw} < 1.3 \quad (E),$$

$$1.3 < \beta_{3Gs}/\beta_{3Gw} < 3.0 \quad (F), \text{ and}$$

$$-1.3 < \beta_{3Gw} < -0.8 \quad (G)$$

where, $\beta_{3Gw}$ denotes a lateral magnification of the third lens unit, at a wide angle end, $\beta_{3Gs}$ denotes a lateral magnification of the third lens unit, at the intermediate zoom state, $\beta_{4Gw}$ denotes a lateral magnification of the fourth lens unit, at the wide angle end, and $\beta_{4Gs}$ denotes a lateral magnification of the fourth lens unit, at the intermediate zoom state.

A reason for and an effect of adopting the abovementioned structure in the zoom lens system will be described below. Conditional expression (E) is an expression which specifies a zooming ratio of the fourth lens unit at the wide angle side. By satisfying conditional expression (E), it becomes easy to make small the amount of movement of the fourth lens unit, which is advantageous for making small the size of the apparatus. Moreover, by making an arrangement such that a lower limit value is lower than a lower limit value in conditional expression (E), it becomes easy to move the object point of the third lens unit toward the object side, at the time of zooming at the wide angle side.

Conditional expression (F) is an expression which specifies a zooming ratio of the third lens unit at the wide angle side (end). By making an arrangement such that a lower limit value is not lower than a lower limit value in conditional expression (F), a zooming function by the third lens unit at the wide angle side is secured, which is advantageous for having a high zooming ratio. By making an arrangement such that an upper limit value is not higher than an upper limit value in conditional expression (F), it becomes easy to suppress the amount of movement of the third lens unit and to suppress the size of the zoom lens system from becoming large.

Conditional expression (G) is an expression which specifies a lateral magnification ratio at the wide angle end of the third lens unit. By making an arrangement such that a lower limit value is not lower than a lower limit value in conditional expression (G), it becomes easy to make small a distance of the third lens unit from an image plane, at the wide angle end, and to shorten the overall length of the zoom lens system. By making an arrangement such that an upper limit value is not higher than an upper limit value in conditional expression (G), it becomes easy to move the object point of the third lens unit toward the object side, at the wide angle side, and to secure the amount of movement of the second lens unit toward the object side, at the wide angle side. Moreover, it becomes easy to suppress the overall length of the zoom lens system at the wide angle end, which is advantageous for making small the diameter of the first lens unit and the second lens unit.

It is preferable to let the lower limit value in conditional expression (E) to be 0.9. Further, it is more preferable to let the lower limit value to be 1.01 for making it advantageous for the magnification at the wide angle side of the fourth lens unit. It is preferable to let the upper limit value in conditional expression (E) to be 1.2. It is preferable to let the lower limit value in conditional expression (F) to be 1.4. It is preferable to let the upper limit value in conditional expression (F) to be 2.0. It is preferable to let the lower limit value in conditional expression (G) to be −1.1. It is preferable to let the upper limit value in conditional expression (G) to be −0.9.

Moreover, in the zoom lens system, it is preferable to make the following arrangement.

It is preferable that the rear lens group includes a fourth lens unit having a negative refracting power and a fifth lens unit having a positive refracting power, which are disposed toward the image side of the third lens unit, and in the intermediate zoom state, the fourth lens unit moves to be positioned more toward the object side, than at the wide angle end, and that the zoom lens system is a five-unit zoom lens system.

A reason for and an effect of adopting the abovementioned arrangement in the zoom lens system will be described below. by letting the rear lens group having the positive refracting power to be a three lens unit group, and by moving the fourth lens unit as described above, it is advantageous for shortening the overall length of the zoom lens system, and for correction of an aberration change. Particularly, when an arrangement is made such that the fifth lens unit is positioned more toward the image side at the telephoto end, as compared to a position at the wide angle end, the zooming function is also to be borne by the fifth lens unit, and it is even more advantageous for securing the zooming ratio.

Furthermore, it is preferable that in the zoom lens system, the following conditional expressions are satisfied.

$$0.8 < \beta_{5Gs}/\beta_{5Gw} < 1.3 \quad (H),$$

$$1.3 < \beta_{34Gs}/\beta_{34Gw} < 3.0 \quad (I), \text{ and}$$

$$-1.3 < \beta_{34Gw} < -0.9 \quad (J)$$

where, $\beta_{34Gw}$ denotes a lateral magnification of a combined system of the third lens unit and the fourth lens unit, at a wide angle end, $\beta_{34Gs}$ denotes a lateral magnification of the combined system of the third lens unit and the fourth lens unit, at the intermediate zoom state, $\beta_{5Gw}$ denotes a lateral magnification of the fifth lens unit, at the wide angle end, and $\beta_{5Gs}$ denotes a lateral magnification of the fifth lens unit, at the intermediate zoom state.

A reason for and an effect of adopting the abovementioned arrangement in the zoom lens system will be described below. Conditional expression (H) is an expression which specifies a zooming ratio of the fifth lens unit at the wide angle side. By satisfying conditional expression (H), it becomes easy to make small an amount of movement of the fifth lens unit, which is advantageous for making small the size of the apparatus. Moreover, by making an arrangement such that a lower limit value is not lower that a lower limit value in conditional expression (H), it becomes easy to move the object point of the third lens unit toward the object side at the time of zooming at the wide angle side.

Conditional expression (I) is an expression which specifies a zooming ratio of a combined system of the third lens unit and the fourth lens unit at the wide angle side. By making an arrangement such that a lower limit value is not lower than a lower limit value in conditional expression (I), a zooming function is secured by the combined system of the third lens unit and the fourth lens unit at the wide angle side, which is advantageous for having a high zooming ratio. By making an arrangement such that an upper limit value is not higher than an upper limit value in conditional expression (I), it becomes easy to suppress an amount of movement of the combined system of the third lens unit and the fourth lens unit, and to suppress the size of the zoom lens system from becoming large.

Conditional expression (J) is an expression which specifies a lateral magnification at the wide angle end of the combined system of the third lens unit and the fourth lens unit. By making an arrangement such that a lower limit value is not lower than a lower limit value in conditional expression (J), it becomes easy to make small a distance of the third lens unit and the fourth lens unit at the wide angle end, from an image plane, and to shorten the overall length of the zoom lens system. By making an arrangement such that an upper limit value is not higher than an upper limit value in conditional expression (J), it becomes easy to move the object point of the third lens unit toward the object side at the wide angle side, and to secure an amount of movement toward the object side of the second lens unit at the wide angle end. Moreover, it becomes easy to suppress the total length of the zoom lens system at the wide angle end, which is advantageous for making small the diameter of the first lens unit and the second lens unit.

It is preferable to let the lower limit value in conditional expression (H) to be 0.9, and a lower limit value of 1.01 is more preferable. It is preferable to let the upper limit value in conditional expression (H) to be 1.2. It is preferable to let the lower limit value in conditional expression (I) to be 1.4. It is preferable to let the upper limit value in the conditional expression (I) to be 2.0. It is preferable to let the lower limit value in conditional expression (J) to be −1.1. It is preferable to let the upper limit value in conditional expression (J) to be −0.9.

It is preferable to make the following arrangement in the zoom lens system.

It is preferable that a lens surface closest to the object, of the second lens unit is a concave surface, and a lens surface closest to the image, of the first lens unit is a convex surface.

A reason for and an effect of adopting the abovementioned arrangement in the zoom lens system will be described below. When the lens surface closest to the object of the second lens unit is let to be a concave surface, and the lens surface closest to the image of the first lens unit is let to be a convex surface, the distance between the first lens unit and the second lens unit becomes short, which is advantageous for making even smaller the overall length at the wide angle end.

Moreover, it is also advantageous for securing the positive refracting power of the first lens unit and the negative refracting power of the second lens unit, for securing a zooming load by the second lens unit. In this case, at mutually facing surfaces of the first lens unit and the second lens unit, since a height at which the off-axis light flux is incident is substantial at the wide angle end, an angle of incidence of off-axis light flux at both surfaces becomes large, and an oblique aberration at each of these surfaces is susceptible to occur. However, since the direction is such that the occurrence of the aberration of the mutual surfaces is cancelled mutually, it is advantageous for securing the optical performance when the system is considered to be a combined system of the first lens unit and the second lens unit.

Moreover, by moving the second lens unit toward the object side, at the wide angle side, it is possible to prevent the distance between the first lens unit and the second lens unit from being excessively large, at the time of zooming at the wide angle end, and there is also an effect of reduction of a change in the oblique aberration. On the other hand, at the telephoto end, since an angle of incidence of the off-axis light beam at an object side surface of the second lens unit becomes small, the fluctuation in the aberration cannot occur easily even when the zooming function is imparted to the second lens unit by moving the first lens unit and the second lens unit further apart.

Various ideas apart from those mentioned above, have been devised in the present invention to achieve an efficient and favorable optical performance while realizing the compactness. These ideas will be described below in detail.

It is preferable to have the following arrangement in the second lens unit of the zoom lens system.

It is preferable that the second lens unit includes two negative lenses namely a first negative lens (hereinafter, called appropriately as a 'negative lens $L_{2n1}$') which is disposed closest to the object side in the second lens unit, and a second negative lens (hereinafter, called appropriately as a 'negative lens $L_{2n2}$') which is disposed toward an image side of the first negative lens, and a first positive lens (hereinafter, called appropriately as a 'positive lens $L_{2p}$'), and that the total number of lenses included in the second lens unit is three.

A reason for and an effect of adopting the abovementioned arrangement in the zoom lens system will be described below. By arranging the second lens unit by a fewer number of lenses, in other words, by three lenses, it is easy to suppress a thickness of the zoom lens system when collapsed. Moreover, it is easy to make small also a distance from a surface of the first lens unit nearest to the object up to an entrance pupil, and to make compact a size in a radial direction of the zoom lens system. Moreover, an occurrence of an aberration is suppressed to be small by distributing the negative refracting power of the second lens unit by disposing two negative lenses, and further, an arrangement is made such that it is possible to carry out an aberration correction efficiently by disposing one positive lens.

Further, in order to have more favorable compactness and aberration balance, it is preferable that the zoom lens system satisfies the following conditional expression.

$$-0.5 < SF_{2n1} < 1.0 \quad (3)$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the first negative lens, and $R_{2n1r}$ is a paraxial radius of curvature of a surface on an image side of the first negative.

A reason for and an effect of adopting the abovementioned arrangement in the zoom lens system will be described below. Conditional expression (3) is an expression for balancing the compactness and securing the performance while securing a refracting power of the negative lens closest to the object, in the second lens unit.

By making an arrangement such that an upper limit value is not higher than an upper limit value in conditional expression (3), it becomes easy to secure the negative refracting power of the negative lens even when a curvature of an image side surface is made smaller. Accordingly, it becomes easy to make small an amount of change in a distance before and after the second lens unit, and it is advantageous also for making a lens frame small. Moreover, by lowering a height of light rays in the first lens unit, it becomes advantageous for compactness in the radial direction. Moreover, it becomes easy to make small an axial thickness of the second lens unit. It is preferable to suppress the object side surface from becoming a surface having a strong negative refracting power, and to suppress a distortion and an image plane curvature at the wide angle end by making an arrangement such that a lower limit value is not lower than a lower limit value in conditional expression (3).

Moreover, the zoom lens system may satisfy the following conditional expression.

$$0 < SF_{2n1} < 0.9 \quad (3')$$

Furthermore, the zoom lens system may satisfy the following conditional expression.

$$0.25 < SF_{2n1} < 0.8 \quad (3'')$$

The upper limit value and the lower limit value in conditional expression (3) may be let to be an upper limit value or a lower limit value of conditional expressions (3') and (3''). Similar changes are possible in a lower limit value and an upper limit value in conditional expressions shown below.

Moreover, an appropriate material may be set for the negative lens $L_{2n1}$ in the second lens unit. Concretely, it is preferable that the zoom lens system satisfies the following conditional expressions.

$$1.78 < n_{d2n1} < 2.20 \quad (4)$$

$$35 < v_{d2n1} < 50 \quad (5)$$

where, $n_{d2n1}$ denotes a refractive index for a d-line, of the negative lens $L_{2n1}$, and $v_{d2n1}$ denotes an Abbe's number for the negative lens $L_{2n1}$.

A reason for an effect of adopting the abovementioned structure will be described below. It is preferable to improve a mass production and a procurement of the material, and to carry out a cost reduction by making an arrangement such that an upper limit value is not higher than an upper limit value in conditional expression (4). It is preferable to make it easy to suppress a field curvature and a coma aberration at the wide angle end by making small an absolute value of curvature of a lens surface while securing the refracting power by making an arrangement such that a lower limit value is not lower than a lower limit value in conditional expression (4).

It is preferable to secure a procurement of the material having a high refracting power by making an arrangement such that an upper limit value is not higher than an upper limit value in conditional expression (5). It is preferable to make it easy to suppress a chromatic dispersion to be at moderate level and to suppress a chromatic aberration by making an arrangement such that a lower limit value is not lower than a lower limit value in conditional expression (5).

Moreover, the zoom lens system may satisfy the following conditional expressions.

$$1.79 < n_{d2n1} < 1.95 \quad (4')$$

$$37 < v_{d2n1} < 47 \quad (5')$$

The zoom lens system may satisfy further, the following conditional expressions.

$$1.80 < n_{d2n1} < 1.90 \quad (4'')$$

$$40 < v_{d2n1} < 43 \quad (5'')$$

Accordingly, it is possible to show further the abovementioned effect.

Moreover, an appropriate material may be set for a negative lens $L_{2n2}$ in the second lens unit. Concretely, the following arrangement may be made.

$$1.78 < n_{d2n2} < 2.00 \quad (6)$$

$$35 < v_{d2n2} < 50 \quad (7)$$

where, $n_{d2n2}$ denotes a refractive index for a d-line, of the negative lens $L_{2n2}$, and $v_{d2n2}$ denotes an Abbe's number for the negative lens $L_{2n2}$.

It is preferable to improve the mass production and the procurement of the material, and to carry out the cost reduction by making an arrangement such that an upper limit value is not higher than an upper limit value in conditional expression (6). It is preferable to make it easy to suppress an occurrence of coma aberration and spherical aberration by making small an absolute value of curvature of a lens even when the refracting power is secured, by making an arrangement such that a lower limit value is not lower than a lower limit value in conditional expression (6).

It is preferable to improve the procurement of the material having a high refracting power by making an arrangement such that an upper limit value is not higher than an upper limit value in conditional expression (7). Making an arrangement such that a lower limit value is not lower than a lower limit value in conditional expression (7), is advantageous for suppressing the chromatic dispersion and correcting the chromatic aberration.

The zoom lens system may satisfy the following conditional expressions.

$$1.79 < n_{d2n2} < 1.95 \quad (6')$$

$$38 < v_{d2n2} < 48 \quad (7')$$

The zoom lens system may satisfy further, the following conditional expressions.

$$1.80 < n_{d2n2} < 1.90 \quad (6'')$$

$$40 < v_{d2n2} < 47 \quad (7'')$$

Accordingly, it is possible to show further the abovementioned effect.

Moreover, it is preferable to make the following arrangement for the positive lens $L_{2p}$ in the second lens unit. For this, it is preferable that in the zoom lens system, the following conditional expressions are satisfied.

$$1.84 < n_{d2p} < 2.20 \quad (8)$$

$$13 < \nu_{d2p} < 30 \quad (9)$$

where, $n_{d2p}$ denotes a refractive index for a d-line, of the positive lens $L_{2p}$, and $\nu_{d2p}$ denotes an Abbe's number for the first positive lens.

It is preferable to improve the mass production and the procurement of the material, and to carry out a cost reduction by making an arrangement such that an upper limit value is not higher than an upper limit value in conditional expression (8) By making an arrangement such that a lower limit value is not lower than a lower limit value in conditional expression (8), it is possible to make small the absolute value of curvature of the lens surface while securing the refracting power, and it becomes easy to suppress the occurrence of the spherical aberration and the coma aberration.

Conditional expression (9) is an expression regarding a correction of the chromatic aberration, and in particular, an oblique chromatic aberration of magnification. For correcting favorably inside the lens unit, the chromatic aberration occurred due to a substantial negative refracting power, it is preferable to use for the positive lens, a material having a comparatively substantial chromatic dispersion in an appropriate range. It is preferable to secure dispersion and to carry out correction of the chromatic aberration occurred in (at) the negative lens by making an arrangement such that an upper limit value is not higher than an upper limit value in conditional expression (9). It is preferable to suppress a chromatic dispersion at a short wavelength side and an occurrence of a secondary spectrum by suppressing a chromatic aberration at a short wavelength side occurred due to this positive lens, by making an arrangement such that a lower limit value is not lower than a lower limit value in conditional expression (9).

The zoom lens system may satisfy the following conditional expressions.

$$1.87 < n_{d2p} < 2.15 \quad (8')$$

$$15 < \nu_{d2p} < 26 \quad (9')$$

The zoom lens system may further satisfy the following conditional expressions.

$$1.90 < n_{d2p} < 2.12 \quad (8'')$$

$$17 < \nu_{d2p} < 21 \quad (9'')$$

Accordingly, it is possible to show further the abovementioned effect.

Moreover, for achieving a favorable optical performance by suppressing the occurrence of aberration, it is preferable that the following arrangement is made in the zoom lens system.

It is preferable that one surface or both surfaces of the negative lens $L_{2n1}$ in the second lens unit is or are aspheric, and the zoom lens system satisfies the following conditional expression.

$$0.005 < (|asp_{2n1f}| + |asp_{2n1r}|)/f_w < 0.1 \quad (10)$$

where, $asp_{2n1f}$ denotes an aspherical deviation of the negative lens closest to the object, in the second lens unit, at a lens surface toward the object, $asp_{2n1r}$ denotes an aspherical deviation of the negative lens closest to the object, in the second lens unit, at a lens surface toward the image, and fw denotes a focal length at the wide angle end, of the entire zoom lens system.

A reason for and an effect of adopting the abovementioned arrangement in the zoom lens system will be described below. For achieving favorable optical performance by suppressing the occurrence of aberration, an aspheric surface may be disposed for at least one lens surface of the negative lens $L_{21n}$ which is closest to the object, in the second lens unit. Moreover, both the surfaces of the lens $L_{21n}$ may be let to be aspheric surfaces. Such an arrangement has an effect on a correction of the coma aberration and the image plane curvature.

Figure 24:
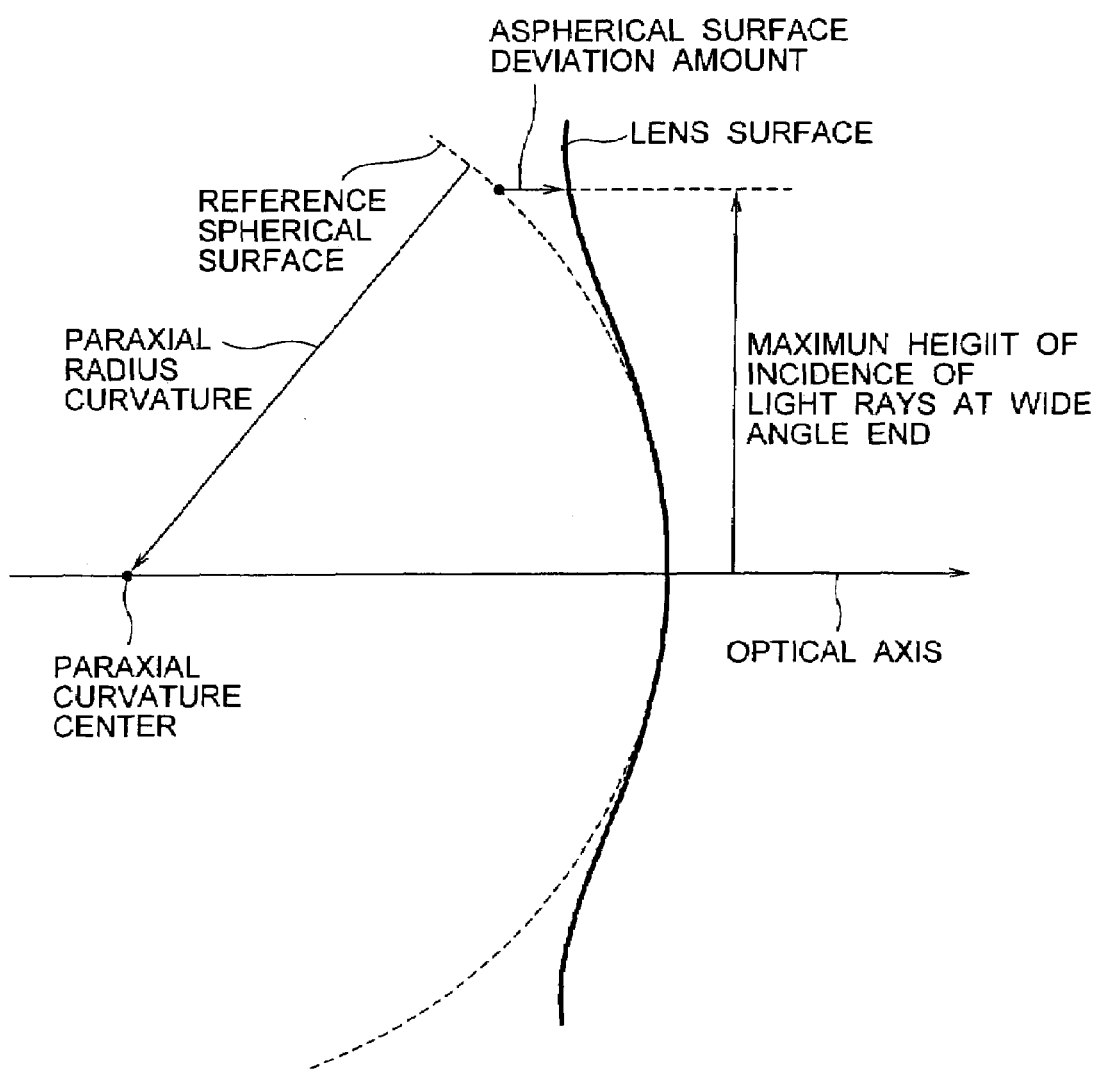
FIG. 24 is a diagram describing an amount of aspherical deviation.

At this time, the zoom lens system may satisfy conditional expression (10) mentioned above. Here, an amount of aspherical deviation, as shown in FIG. 24, is a distance from a reference spherical surface up to that lens surface when measured in a direction parallel to an optical axis, at a position of maximum height of incidence of light rays at the wide angle end, at that lens surface, when a spherical surface having a vertex same as an apex of the lens surface, and for which a paraxial radius of curvature of that lens surface is a radius of curvature, is let to be the reference spherical surface, and a direction toward the image is let to be a positive reference numeral. The amount of aspherical deviation when the lens surface is spherical or flat is zero.

By making an arrangement such that a lower limit value is not lower than a lower limit value in conditional expression (10), it becomes easy to secure an effect of aberration correction due to the aspherical surface, which is advantageous for a correction of the oblique aberration at the wide angle side.

The zoom lens system may satisfy the following conditional expression.

$$0.008 < (|asp_{2n1f}| + |asp_{2n1r}|)/f_w < 0.08 \quad (10')$$

The zoom lens system may further satisfy the following conditional expression.

$$0.01 < (|asp_{2n1f}| + |asp_{2n1r}|)/f_w < 0.05 \quad (10'')$$

Accordingly, it is possible to show further the abovementioned effect.

The zoom lens system may have the following arrangement.

It is preferable that the second lens unit includes in order from the object side thereof, the negative lens $L_{2n1}$, the negative lens $L_{2n2}$, and the positive lens $L_{2p}$. Accordingly, it becomes easy to bring principal points of the second lens unit toward the object, which is advantageous for making small the diameter.

Moreover, the zoom lens system may have the following arrangement.

It is preferable that the second lens unit includes in order from the object side thereof, the negative lens $L_{2n1}$, the positive lens $L_{2p}$, and the negative lens $L_{2n2}$. Accordingly, it becomes easy to suppress a change in the spherical aberration at the time of zooming.

Moreover, from a point of view of making compact similarly as the second lens unit, it is advantageous to form also the first lens unit by a fewer number of lenses. It is preferable to make the following arrangement for the first lens unit. It is preferable that the zoom lens system has the following arrangement.

It is preferable that the first lens unit includes a first positive lens (hereinafter, called appropriately as a 'positive lens $L_{1p}$') and a first negative lens (hereinafter, called appropriately as a 'negative lens $L_{1n}$'), and that the total number of lenses in the first lens unit is two. When zooming with a high zooming ratio is carried out, the chromatic aberration at the telephoto end particularly, is susceptible to be problematic. Therefore, it is preferable from the point of chromatic aberration that the first lens unit includes the positive lens and the negative lens.

Further, it is preferable that the zoom lens system has the following arrangement.

It is preferable that each of the negative lens $L_{1n}$ and the positive lens $L_{1p}$ in the first lens unit is a single lens. When such an arrangement is made, it is possible to correct favorably the coma aberration at the wide angle end in particular, by using an air lens which is formed between the two lenses.

At this time, the zoom lens system may have the following arrangement.

It is preferable that a distance on the optical axis between the negative lens $L_{1n}$ and the positive lens $L_{1p}$ of the first lens unit satisfies the following conditional expression.

$$0.0 \leq d_{1np}/d_1 < 0.2 \quad (12)$$

where, $d_{1np}$ denotes the distance on the optical axis between the first negative lens and the first positive lens in the first lens unit, and $d_1$ denotes an overall thickness of the first lens unit on the optical axis.

A reason for and an effect of adopting the abovementioned arrangement in the zoom lens system will be described below. It is preferable to suppress a height of off-axis light rays passing through a lens closest to the object, and to make compact in the radial direction, by making an arrangement such that an upper limit value is not higher than an upper limit value in conditional expression (12).

The zoom lens system may satisfy the following conditional expression.

$$0.0 \leq d_{1np}/d_1 < 0.1 \quad (12')$$

The zoom lens system may further satisfy the following conditional expression.

$$0.0 \leq d_{1np}/d_1 < 0.03 \quad (12'')$$

Accordingly, it is possible to show further the abovementioned effect.

Moreover, the zoom lens system may have the following arrangement.

It is preferable that the negative lens $L_{1n}$ and the positive lens $L_{1p}$ in the first lens unit are cemented. Accordingly, it is possible to correct favorably a chromatic aberration of magnification at the wide angle end and a longitudinal chromatic aberration at the telephoto end. Moreover, it is possible to reduce a decline in yield which is caused due to a deterioration of performance due to a relative decentering, which leads to a reduction in cost.

At this time, an optimum material may be set for the positive lens $L_{1p}$ and the negative lens $L_{1n}$ in the first lens unit. Concretely, the zoom lens system may satisfy the following conditional expressions.

$$1.47 < n_{d1p} < 1.90 \quad (13)$$

$$40 < v_{d1p} < 85 \quad (14)$$

$$1.75 < n_{d1n} < 2.05 \quad (15)$$

$$12 < v_{d1n} < 31 \quad (16)$$

where, $n_{d1p}$ denotes a refractive index for a d-line, of the positive lens $L_{1p}$, $v_{d1p}$ denotes an Abbe's number for the positive lens $L_{1p}$, $n_{d1n}$ denotes a refractive index for a d-line, of the negative lens $L_{1n}$, and $v_{d1n}$ denotes an Abbe's number for the negative lens $L_{1n}$.

It is preferable to improve the mass production and the procurement of the material, and to carry out a cost reduction by making an arrangement such that an upper limit value is not higher than an upper limit value in conditional expression (13). By making an arrangement such that a lower limit value is not lower than a lower limit value in conditional expression (13), it is possible to make small the absolute value of curvature of the lens surface even when the refracting power is secured, and it becomes easy to suppress the occurrence of the spherical aberration and the coma aberration.

It is preferable to improve the procurement of the material having the high refracting power by making an arrangement such that an upper limit value is not higher than an upper limit value in conditional expression (14). By making an arrangement such that a lower limit value is not lower than a lower limit value in conditional expression (14), the chromatic dispersion is suppressed, which is advantageous for correction of the chromatic aberration.

It is preferable to improve the mass production and the procurement of the material, and to carry out the cost reduction by making an arrangement such that an upper limit value is not higher than an upper limit value in conditional expression (15). By making an arrangement such that a lower limit value is not lower than a lower limit value in conditional expression (15), it is possible to make small the absolute value of curvature of the lens surface even when the refracting power is secured, and it becomes easy to suppress the occurrence of the spherical aberration and the coma aberration.

Conditional expression (16) is an expression regarding a correction of the chromatic aberration of magnification, and in particular, a correction of a longitudinal chromatic aberration of magnification. For correcting favorably inside the lens unit, the chromatic aberration occurred due to a substantial positive refracting power, it is preferable to use for the negative lens, a material having a comparatively substantial chromatic dispersion in an appropriate range. It is appropriate to secure dispersion and to carry out correction of the chromatic aberration occurred at the positive lens by making an arrangement such that an upper limit value is not higher than an upper limit value in conditional expression (16). It is preferable to suppress the chromatic dispersion at a short wavelength side and the occurrence of the secondary spectrum by suppressing the chromatic aberration at the short wavelength side occurred due to this positive lens, by making an arrangement such that a lower limit value is not lower than a lower limit value in conditional expression (16).

The zoom lens system may satisfy the following conditional expressions.

$$1.55 < n_{d1p} < 1.80 \quad (13')$$

$$45 < v_{d1p} < 75 \quad (14')$$

$$1.79 < n_{d1n} < 2.01 \quad (15')$$

$$15 < v_{d1n} < 26 \quad (16')$$

The zoom lens system may further satisfy the following conditional expressions.

$$1.58 < n_{d1p} < 1.75 \tag{13''}$$

$$48 < \nu_{d1p} < 68 \tag{14''}$$

$$1.83 < n_{d1n} < 1.95 \tag{15''}$$

$$17.5 < \nu_{d1n} < 24 \tag{16''}$$

Accordingly, it is possible to show further the abovementioned effect.

Moreover, the zoom lens system may have the following arrangement.

It is preferable that the first lens unit includes in order from the object side thereof, the negative lens $L_{1n}$ and the positive lens $L_{1p}$. When such an arrangement is made, since position of principal points on a rear side of the first lens unit is toward the image side, it is effective for securing the zooming ratio.

The zoom lens system may have the following arrangement.

It is preferable that the third lens unit includes not more than three lenses. This is advantageous for slimming of the lens barrel.

Moreover, the zoom lens system may have the following arrangement.

It is preferable that the third lens unit includes in order from the object side thereof, three lenses namely a positive lens, a positive lens, and a negative lens.

A reason for and an effect of adopting the abovementioned arrangement will be described below. By using two positive lenses, the positive refracting power of the third lens unit is distributed, and adding the negative lens is advantageous for correction of various aberrations. Allowing to converge axial light ray which is diverged from the second lens unit, by two positive lenses is advantageous for making small the third lens unit. Moreover, by allowing to refract the off-axis light beam, in a direction away from the optical axis, it is possible to secure a height of incidence on an image pickup surface. Moreover, since the principal points of the third lens unit are toward the object, it becomes easy to bring the principal points of the third lens unit at the telephoto end closer to the principal points of the second lens unit, which is advantageous for achieving a high zooming ratio.

Further, it is preferable to cement a second positive lens and a negative lens from the object side. By cementing the positive lens and the negative lens, it is possible to carry out more effectively the correction of the longitudinal chromatic aberration. Moreover, since it is possible to prevent a degradation of optical performance due to relative decentering of lenses in the assembling process, it leads to an improvement in the yield and the reduction of cost.

Further, it is preferable to dispose one or more aspheric surfaces in the third lens unit. This is effective for correction of the spherical aberration and the coma aberration. Furthermore, it is preferable to let the positive lens closest to the object in the third lens unit to be a biaspherical lens. When an aspherical surface is disposed on a plurality of lenses, the degradation of optical performance due to the relative decentering of the lenses tends to be substantial. However, by letting both side surfaces of one lens to be aspherical, it is possible to carry out a further favorable correction of the spherical aberration and the coma aberration while suppressing the degradation of optical performance due to the relative decentering of the lenses to be small.

A preferable refracting power of each lens unit will be described below. It is preferable that the following conditional expression is satisfied for the second lens unit.

$$0.08 < |f_2/f_t| < 0.24 \tag{17}$$

where, $f_2$ denotes a focal length of the second lens unit, and $f_t$ denotes a focal length of the entire zoom lens system, at a telephoto end.

A reason for and an effect of adopting the abovementioned arrangement in the zoom lens system will be described below. By making an arrangement such that an upper limit value is not higher than an upper limit value in conditional expression (17), the amount of movement for zooming while securing the refracting power is suppressed which is advantageous for making compact the lens barrel. By making an arrangement such that a lower limit value is not lower than a lower limit value in conditional expression (17), the aberration correction becomes easy by suppressing the refracting power.

The zoom lens system may satisfy the following conditional expression.

$$0.10 < |f_2/f_t| < 0.22 \tag{17'}$$

The zoom lens system may further satisfy the following conditional expression.

$$0.12 < |f_2/f_t| < 0.18 \tag{17''}$$

Accordingly, it is possible to show further the abovementioned effect.

From a point of view of a balance of the compactness and the optical performance, it is preferable that the zoom lens system satisfies the following conditional expression regarding the first lens unit.

$$0.3 < f_1/f_t < 0.95 \tag{18}$$

where, $f_1$ denotes a focal length of the first lens unit, and $f_t$ denotes a focal length of the entire zoom lens system, at a telephoto end.

A reason for and an effect of adopting the abovementioned arrangement in the zoom lens system will be described below. By securing the refracting power of the first lens unit by making an arrangement such that an upper limit value is not higher than an upper limit value in conditional expression (18), it becomes easy to reduce the overall length of the entire zoom lens system, and to make the size small. By making an arrangement such that a lower limit value is not lower than a lower limit value in conditional expression (18), the refracting power is suppressed to be moderate, and it becomes easy to suppress the coma aberration and the spherical aberration at the telephoto end.

The zoom lens system may satisfy the following conditional expression.

$$0.4 < f_1/f_t < 0.8 \tag{18'}$$

The zoom lens system may further satisfy the following conditional expression.

$$0.5 < f_1/f_t < 0.68 \tag{18''}$$

Accordingly, it is possible to show further the abovementioned effect.

Moreover, it is preferable that the zoom lens system satisfies the following conditional expression regarding the refracting power of the third lens unit.

$$0.1 < f_3/f_t < 0.5 \tag{19}$$

where, $f_3$ denotes a focal length of the third lens unit, and $f_t$ denotes a focal length of the entire zoom lens system at the telephoto end.

A reason for and an effect of adopting the abovementioned arrangement in the zoom lens system will be described below. Securing the refracting power by making an arrangement such that an upper limit value is not higher than an upper limit value in conditional expression (19) becomes advantageous for shortening the total length and securing the zooming ratio. Suppressing the refracting power by making an arrangement such that a lower limit value is not lower than a lower limit value in conditional expression (19) becomes advantageous for the aberration correction.

The zoom lens system may satisfy the following conditional expression.

$$0.12 < f_3/f_t < 0.40 \qquad (19')$$

The zoom lens system may further satisfy the following conditional expression.

$$0.15 < f_3/f_t < 0.30 \qquad (19'')$$

Accordingly, it is possible show further the abovementioned effect.

Moreover, it is preferable that the zoom lens system has the following arrangement regarding the lens unit which is disposed closest to the image in the zoom lens system.

It is preferable that the rear lens group includes a lens unit having a positive refracting power closest to the image, which is different from the third lens unit, and the zoom lens system satisfies the following conditional expression.

$$0.2 < f_{RE}/f_t < 0.6 \qquad (20)$$

where, $f_{RE}$ denotes a focal length of the lens unit which is positioned closest to the image, in the rear lens group, and $f_t$ denotes a focal length of the entire zoom lens system, at a telephoto end.

A reason for and an effect of adopting the abovementioned arrangement in the zoom lens system will be described below. It is preferable to secure an effect of making refract off-axis light beam by securing the positive refracting power of the lens unit closest to the image by making an arrangement such that an upper limit value is not higher than an upper limit value in conditional expression (20). It is possible to make small an angle of light beam which is incident on an electronic image pickup element such as a CCD and a CMOS disposed at an image plane, and it becomes easy to suppress an occurrence of shading of brightness at a portion around a taking screen. By making an arrangement such that a lower limit value is not lower than a lower limit value in conditional expression (20), it becomes easy to suppress a lack of correction of an image plane curvature. Moreover, it is desirable to carry out a focusing operation by moving a lens unit which is closest to the image, and it also becomes easy to suppress a change in the image plane curvature at the time of focusing.

The zoom lens system may satisfy the following conditional expression.

$$0.28 < f_{RE}/f_t < 0.53 \qquad (20')$$

The zoom lens system may further satisfy the following conditional expression.

$$0.35 < f_{RE}/f_t < 0.46 \qquad (20'')$$

Accordingly, it is possible to show further the abovementioned effect.

Further, the lens unit closest to the image may be formed of a plastic material. The main function of the lens unit closest to the image is to allow to incident light rays efficiently on the electronic image pickup element such as a CCD and a CMOS by disposing an exit pupil at an appropriate position. Due to such function, when the refracting power is set in a range as in the abovementioned conditional expression (20), comparatively substantial refracting power is not necessary, and it is possible to form by a glass having a low refracting power such as a plastic lens. When a plastic lens is used in the lens unit closest to the image, it is possible to suppress the cost to be low, and to provide even lower cost zoom lens system.

Moreover, it is preferable that an image pickup apparatus includes a zoom lens of the present invention, and has the following arrangement.

It is preferable that the image pickup apparatus includes the zoom lens system and an image pickup element which converts an image formed by the zoom lens system to an electric signal.

Furthermore, it is preferable that the image pickup element satisfies the following conditional expression.

$$0.4 < I_m/f_w < 0.8 \qquad (22)$$

where, $I_m$ denotes a maximum image height in an effective image pickup area, and $f_w$ denotes a focal length of the entire zoom lens system, at a wide angle end.

An effective image pickup area is an area of an image pickup surface on an image pickup element, on which an image is displayed and recorded, at when the area changes, an image height in a state of the maximum image height is defined as the maximum image height 1 m. Not letting a taking image angle to be excessively large by making an arrangement such that an upper limit value is not higher than an upper limit value in conditional expression (22), is advantageous for making small an occurrence of a barrel distortion. It is preferable to make use of merits of making small the size and widening of an angle in which this arrangement is adopted, by making an arrangement such that a lower limit value is not lower than a lower limit value in conditional expression (22).

The zoom lens system may satisfy the following conditional expression.

$$0.45 < I_m/f_w < 0.7 \qquad (22')$$

The zoom lens system may further satisfy the following conditional expression.

$$0.55 < I_m/f_w < 0.6 \qquad (22'')$$

Accordingly, it is possible to show further the abovementioned effect.

Moreover, the aperture stop may be moved integrally with the third lens unit at the time of zooming from the wide angle end to the telephoto end. Since the height of the off-axis light rays may be lowered, it is even more advantageous for making small the third lens unit. Further, the aperture stop and a shutter mechanism may be let to be an integral structure. Accordingly, the purpose is served without making small a size of a shutter unit, and with a small dead space at the time of moving the aperture stop and the shutter unit.

Moreover, for cutting unnecessary light such as a ghost and a flare, a flare aperture may be disposed at a location other than a location of the aperture stop. The flare aperture may be disposed at any location such as an object side of the first lens unit, between the first lens unit and the second lens unit, between the second lens unit and the third lens unit, between the lens units in the rear lens group, and between the rear lens group and an image plane. An arrangement may be made to cut the flare light rays by a frame member which holds the lens unit, or the flare aperture may be formed by a member other than the frame member. Moreover, a direct printing may be carried out, or a paint may be applied, or a seal may be adhered to the lens. Moreover, the shape may be any shape such as a circular shape, an elliptical shape, a rectangular shape, a polygon, and an area surrounded by a function curve. Moreover, not only harmful light beam, but also light beam such as a coma flare around a screen may be cut.

Moreover, the ghost and the flare may be reduced by applying an antireflection coating to each lens. A multi-coating is desirable, as the multi-coating is capable of reducing effectively the ghost and the flare. Moreover, an infra-red rays cutting coating may be applied to the lens surfaces and cover glasses.

Moreover, it is desirable that focusing is carried out at a lens unit closest to the image in the zoom lens system. Since it is easy to make light the lens unit closest to the image, it is possible to reduce a load exerted on a motor at the time of focusing. Furthermore, since the overall length does not change at the time of focusing, and a drive motor can be disposed inside a lens frame, it is advantageous for making the lens frame compact. Although it is desirable to carry out focusing by the lens unit closest to the image as described above, the focusing may be carried out by the first lens unit, the second lens unit, and the third lens unit. Moreover, the focusing may also be carried out by moving a plurality of lens units. Moreover, the focusing may be carried out by drawing out the entire lens system, or by drawing out some of the lenses, or the focusing may be carried over.

Moreover, the shading of brightness in a portion around an image may be reduced by shifting a micro lens of the CCD. For instance, a design of the micro lens of the CCD may be changed according to an angle of incidence of light rays for each image height. Moreover, an amount of degradation in the portion around an image may be corrected by an image processing. Moreover, a distortion may be let to occur intentionally in the optical system, and the distortion may be corrected by carrying out electrically an image processing after taking pictures.

It is preferable that each of the abovementioned inventions satisfies arbitrarily a plurality of conditional expressions simultaneously. Moreover, regarding each conditional expression, only an upper limit value or a lower limit value of a numerical range of further restricted conditional expressions may be restricted. Moreover, various arrangements described above may be combined arbitrarily.

As it has been described above, according to the present invention, it is possible to provide a compact zoom lens system having a high zooming ratio and which is capable of securing oblique incident rays in a zoom range near the wide angle end, and which is bright even at the wide angle end, and an electronic image pickup apparatus in which this zoom lens system is used.

Exemplary embodiments of a zoom lens system and an electronic image pickup apparatus according to the present invention will be described below in detail by referring to the accompanying diagrams. However, the present invention is not restricted to the embodiments described below. In each embodiment described below, a further compact zoom lens system having a high zooming ratio of about seven times, which is capable of securing easily oblique incident rays in a zoom range near a wide angle end, and making bright $F_{NO}$ at a telephoto end is realized. Moreover, it is a zoom lens system in which an image quality of an image taken is maintained to be favorable and which is a low cost zoom lens system suitable for an electronic image pickup apparatus such as a CCD and a CMOS.

Embodiments from a first embodiment to an eighth embodiment of the zoom lens system of the present invention will be described below. Lens cross-sectional views at a wide angle end, an intermediate state, and at a telephoto end of an infinite object point focusing of the first embodiment to the eighth embodiment are shown in FIG. 1A, FIG. 1B, and FIG. 1C to FIG. 8A, FIG. 8B, and FIG. 8C. In FIG. 1A to FIG. 8C, G1 denotes a first lens unit, G2 denotes a second lens unit, S denotes an aperture stop, G3 denotes a third lens unit, G4 denotes a fourth lens unit, G5 denotes a fifth lens unit, F denotes a parallel flat plate which forms a low pass filter in which, a wavelength region restricting coating which restricts infrared light is applied, C denotes a parallel flat plate of carbon glass of an electronic image pickup element (CCD), and I denotes an image plane (last plane). A multilayered film for restricting a wavelength region may be applied to a surface of the carbon glass C. Moreover, the carbon glass C may be let to have a low pass filter effect.

Moreover, in each embodiment, the aperture stop S moves integrally with the third lens unit G3. Each numerical data is data in a state when focused at infinite object. A unit of a length for each value is mm, and a unit of angle is degrees (°). Focusing in each embodiment is carried out by moving a lens unit closest to an image. An image height in each embodiment is 3.84 mm. Further, zoom data are values at a wide angle end (WE), at an intermediate zoom state (ST) defined in the present invention, and at a telephoto end (TE).

Figure 1B:
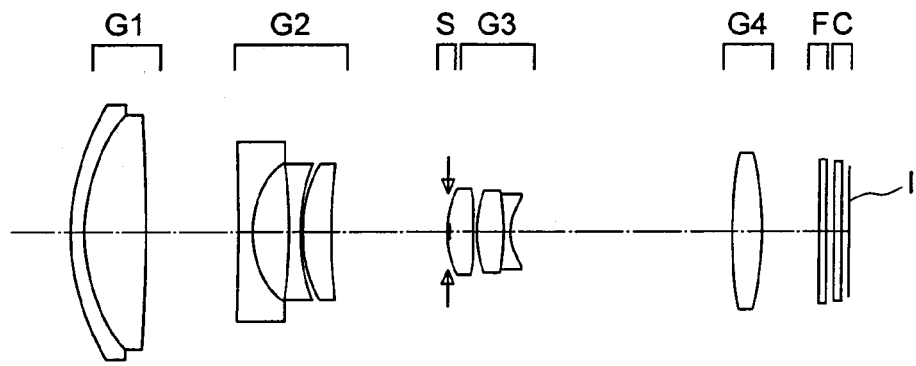
Figure 1C:
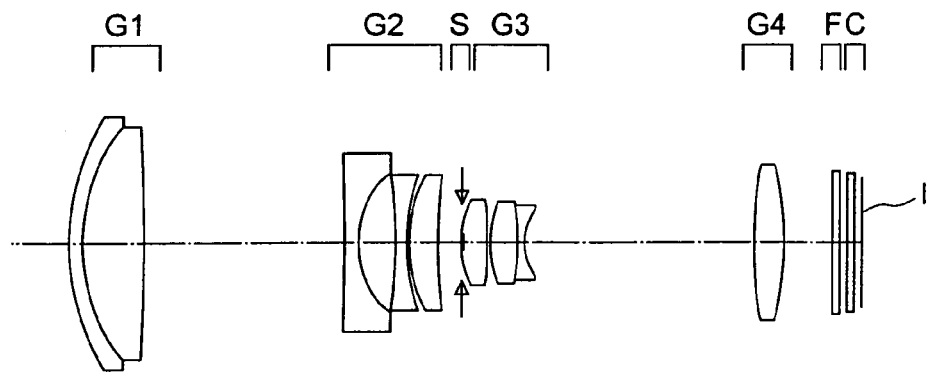

A zoom lens system in the first embodiment, as shown in FIG. 1A to FIG. 1C, includes, in order form an object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit moves toward the object side, the second lens unit G2, after moving once toward the object side, is turned over, and moves toward an image side, the third lens unit G3 after moving integrally with the aperture stop S, once toward the object side, is turned over, and moves toward the image side, and the fourth lens unit G4 moves toward the image side.

In order from the object side, the first lens unit G1 includes a first negative meniscus lens having a convex surface directed toward the object side, and a second biconvex positive lens. The first negative meniscus lens and the second biconvex positive lens are cemented. The second lens unit G2 includes a third biconcave negative lens, a fourth biconcave negative lens, and a fifth positive meniscus lens having a convex surface directed toward the object side. The third lens unit G3 includes a sixth biconvex positive lens, a seventh biconvex positive lens, and an eighth biconcave negative lens. The seventh biconvex positive lens and the eighth biconcave negative lens are cemented. The fourth lens unit G4 includes a ninth biconvex positive lens. A lens vertex of a tenth surface is positioned at the object side of the aperture stop.

An aspheric surface is used for six surfaces namely, a surface on the image side of the second biconvex positive lens, both surfaces of the third biconcave negative lens, both surfaces of the sixth biconvex positive lens, and a surface on the object side of the ninth biconvex positive lens.

Figure 2A:
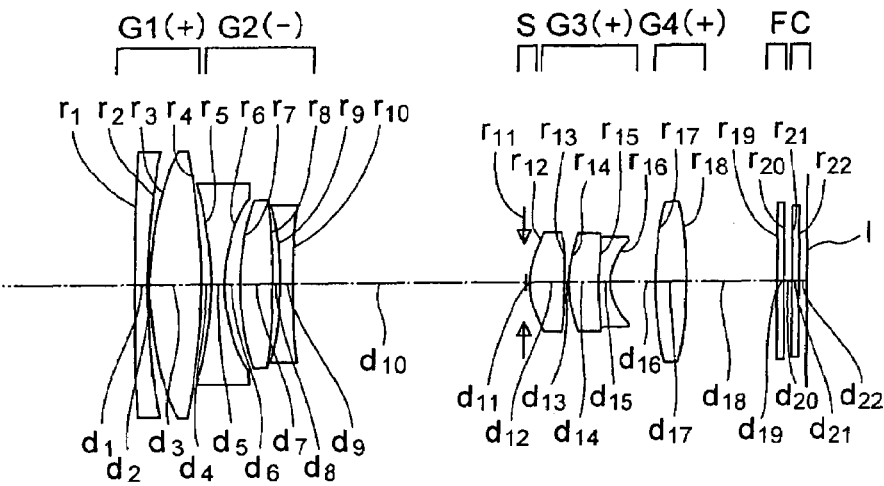
FIG. 2A, FIG. 2B, and FIG. 2C are diagrams similar to FIG. 1A, FIG. 1B, and FIG. 1C respectively, according to a second embodiment of the zoom lens system of the present invention.
Figure 2B:
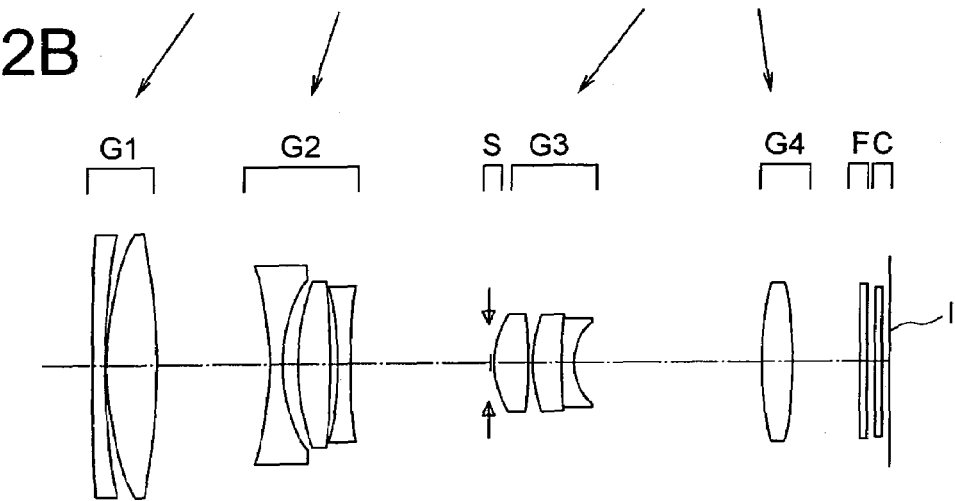
Figure 2C:
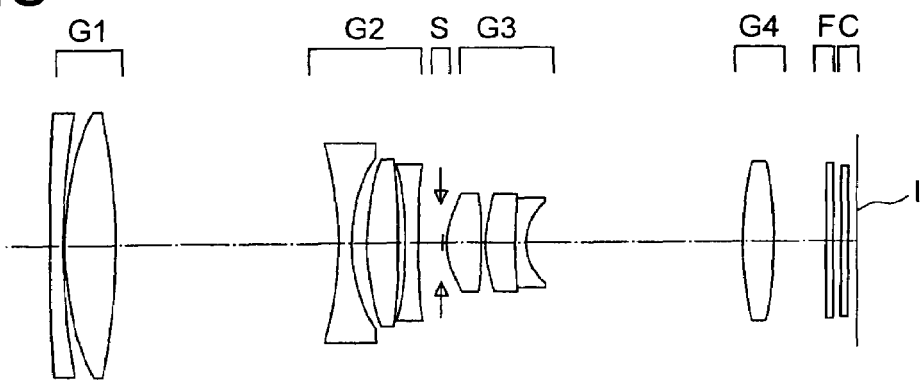

A zoom lens system in the second embodiment, as shown in FIG. 2A to FIG. 2C includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side and a second biconvex positive lens. The second lens unit G2 includes a third biconcave negative lens, a fourth biconvex positive lens, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely a surface on the image side of the second biconvex positive lens, both surfaces of the third biconcave negative lens, both surfaces of the sixth biconvex positive lens, and both surfaces of the ninth biconvex positive lens.

Figure 3A:
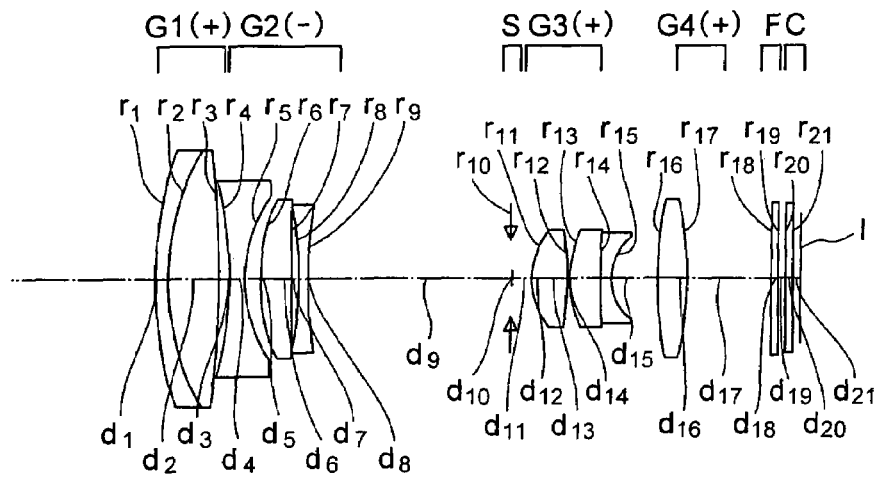
FIG. 3A, FIG. 3B, and FIG. 3C are diagrams similar to FIG. 1A, FIG. 1B, and FIG. 1C respectively, according to a third embodiment of the zoom lens system of the present invention.
Figure 3B:
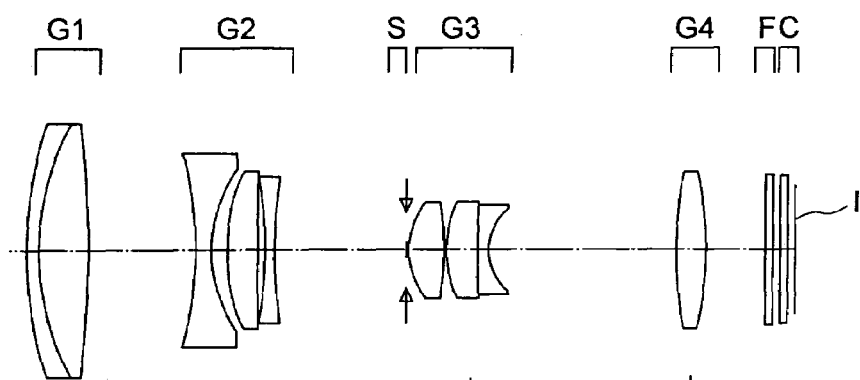
Figure 3C:
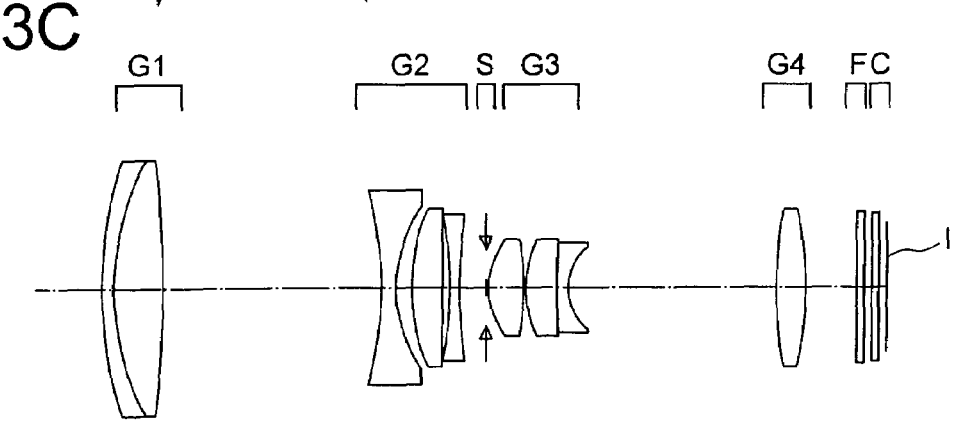

A zoom lens system in the third embodiment, as shown in FIG. 3A to FIG. 3C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth positive meniscus lens having a convex surface directed toward the object side, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 4A:
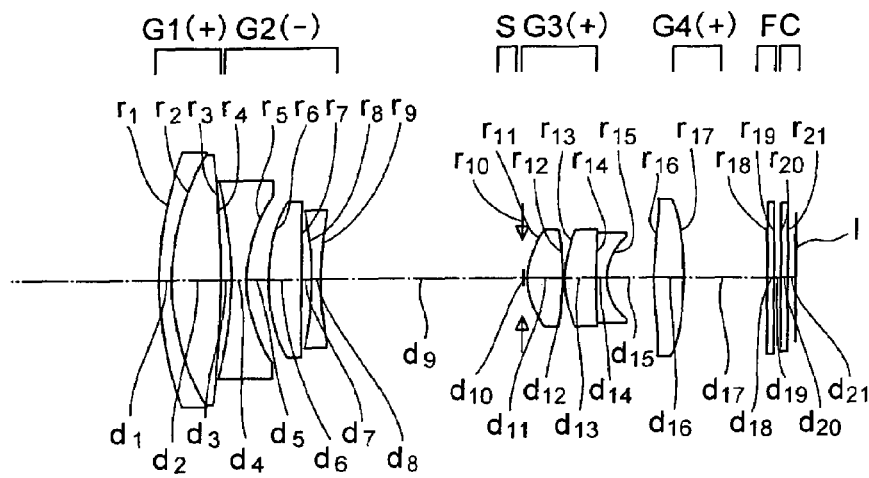
FIG. 4A, FIG. 4B, and FIG. 4C are diagrams similar to FIG. 1A, FIG. 1B, and FIG. 1C respectively, according to a fourth embodiment of the zoom lens system of the present invention.
Figure 4B:
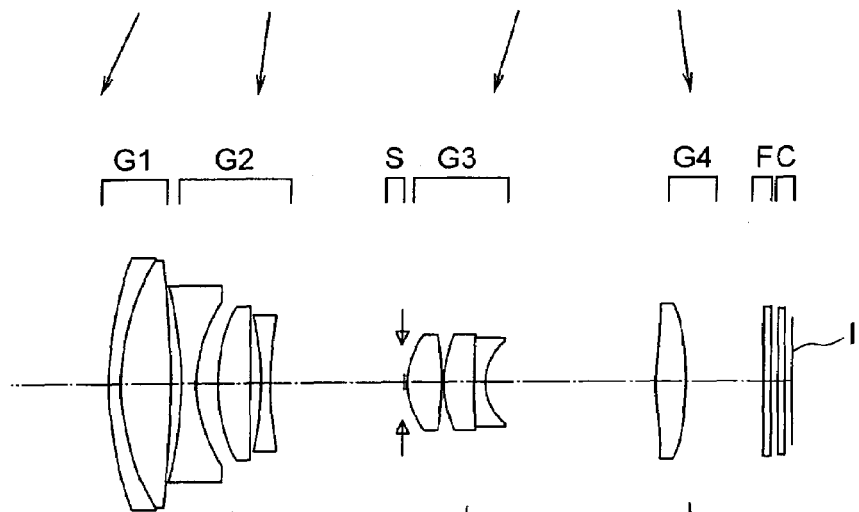
Figure 4C:
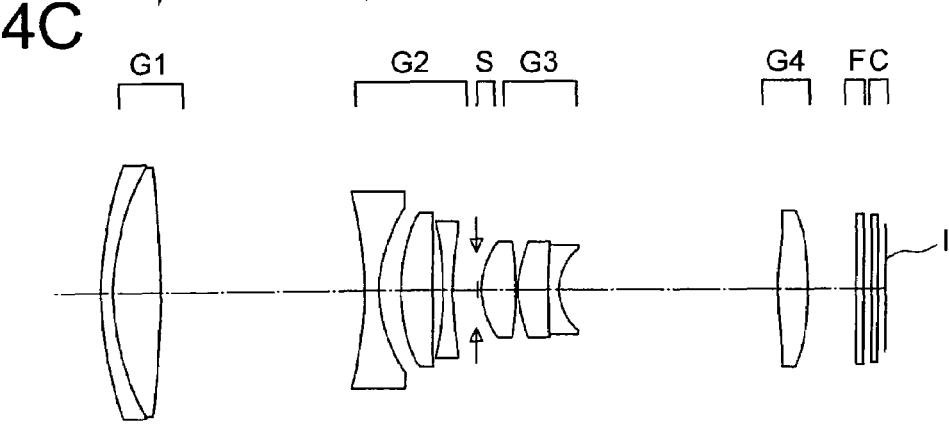

A zoom lens system in the fourth embodiment, as shown in FIG. 4A to FIG. 4C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth positive meniscus lens having a convex surface directed toward the object side, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 5A:
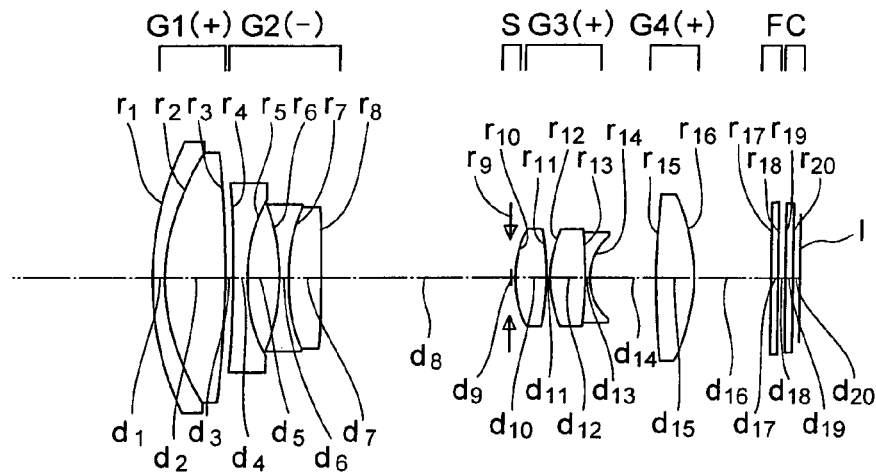
FIG. 5A, FIG. 5B, and FIG. 5C are diagrams similar to FIG. 1A, FIG. 1B, and FIG. 1C respectively, according to a fifth embodiment of the zoom lens system of the present invention.
Figure 5B:
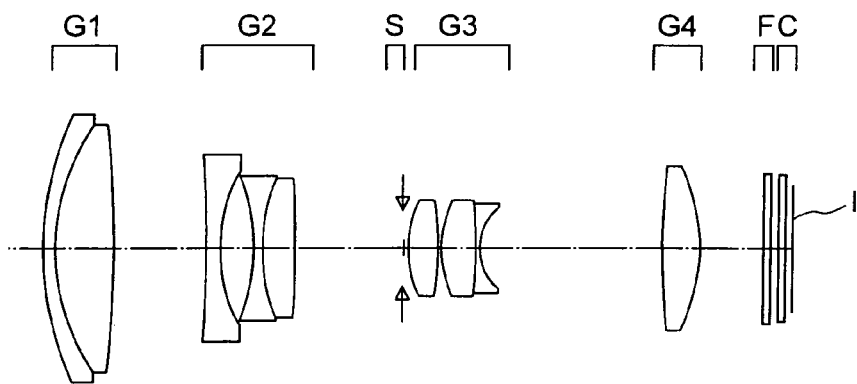
Figure 5C:
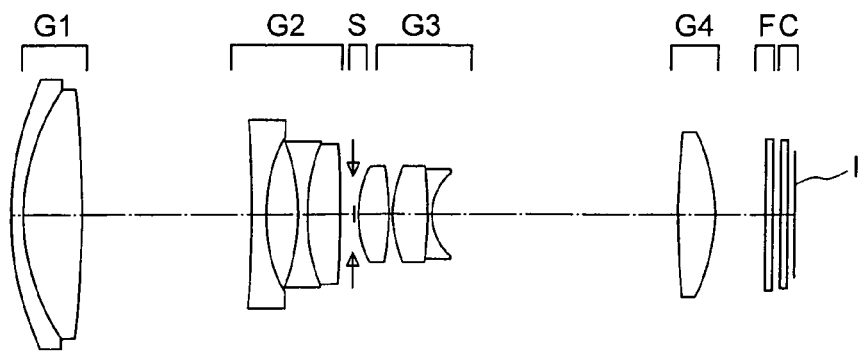

A zoom lens system in the fifth embodiment, as shown in FIG. 5A to FIG. 5C, includes in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth biconcave negative lens, and a fifth biconvex positive lens. The fourth biconcave negative lens and the fifth biconvex positive lens are cemented. The third lens unit G3 includes a sixth biconvex positive lens, a seventh biconvex positive lens, and an eighth biconcave negative lens. The seventh biconvex positive lens and the eighth biconcave negative lens are cemented. The fourth lens unit G4 includes a ninth biconvex positive lens.

An aspheric surface is used for six surfaces namely, a surface on the image side of the second biconvex positive lens, both surfaces of the third biconcave negative lens, both surfaces of the sixth biconvex positive lens, and a surface on the image side of the ninth biconvex positive lens.

Figure 6A:
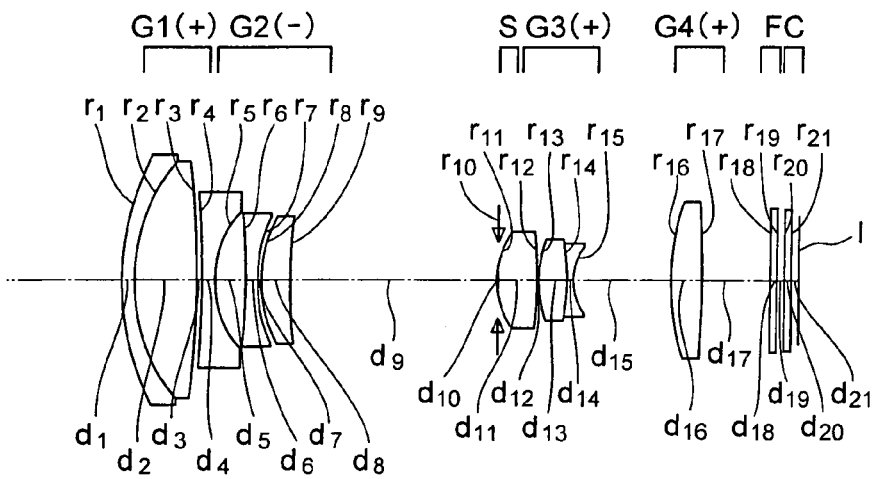
FIG. 6A, FIG. 6B, and FIG. 6C are diagrams similar to FIG. 1A, FIG. 1B, and FIG. 1C respectively, according to a sixth embodiment of the zoom lens system of the present invention.
Figure 6B:
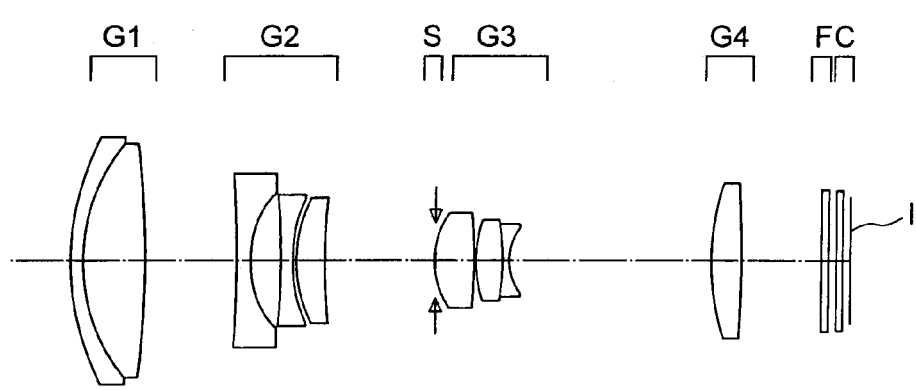
Figure 6C:
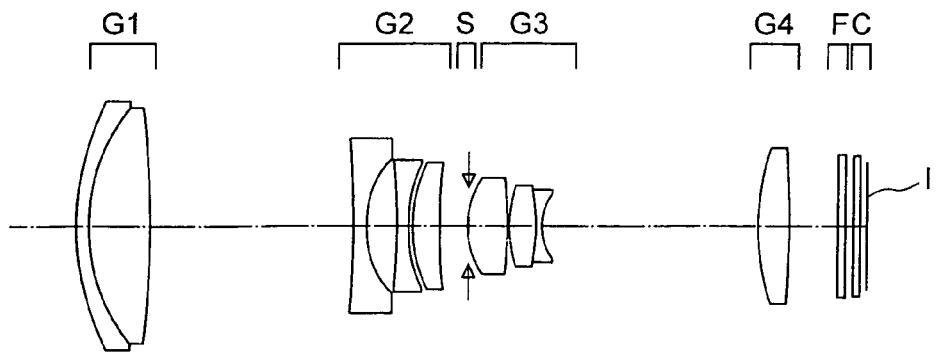

A zoom lens system in the sixth embodiment, as shown in FIG. 6A to FIG. 6C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 after moving integrally with the aperture stop S once toward the object side, is turned over, and moves toward the image side, and the fourth lens unit G4, after moving once toward the object side, is turned over, and moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth biconcave negative lens, and a positive meniscus lens having a convex surface directed toward the object side. The third lens unit G3 includes a sixth biconvex positive lens, a seventh biconvex positive lens, and an eighth biconcave negative lens. The seventh biconvex positive lens and the eighth biconcave negative lens are cemented. The fourth lens unit G4 includes a ninth biconvex positive lens. A lens apex of a tenth surface is positioned on the object side of the aperture stop S.

An aspheric surface is used for six surfaces namely a surface on the image side of the second biconvex positive lens, both surfaces of the third biconcave negative lens, both surfaces of the sixth biconvex positive lens, and a surface on the image side of the ninth biconvex positive lens.

Figure 7A:
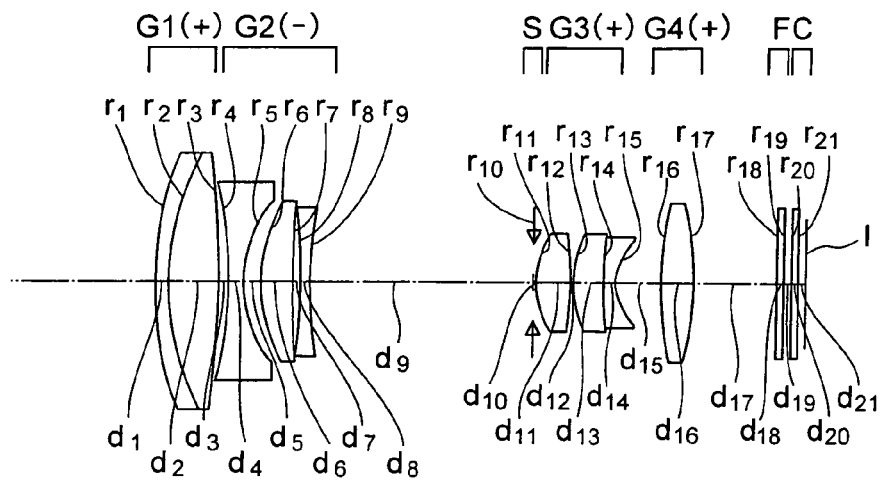
FIG. 7A, FIG. 7B, and FIG. 7C are diagrams similar to FIG. 1A, FIG. 1B, and FIG. 1C respectively, according to a seventh embodiment of the zoom lens system of the present invention.
Figure 7B:
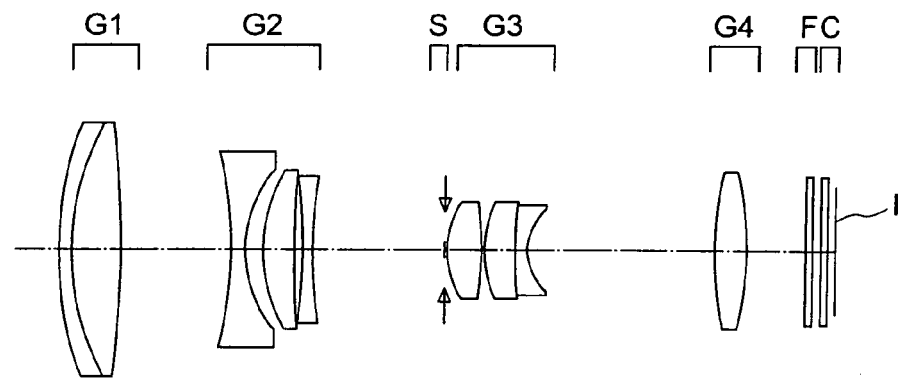
Figure 7C:
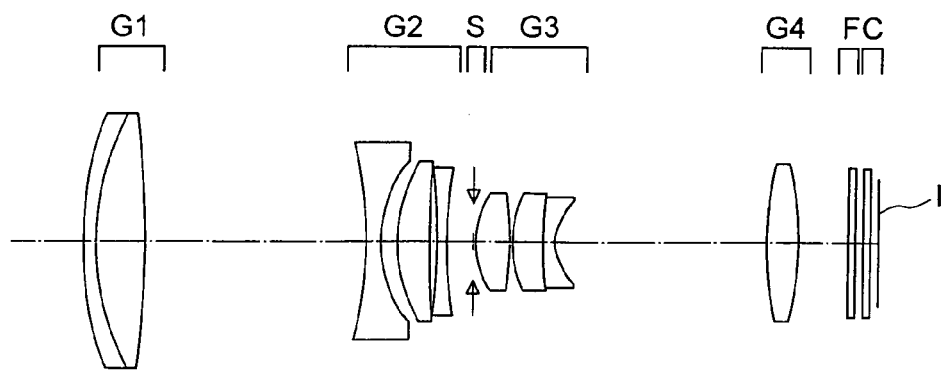

A zoom lens system in the seventh embodiment, as shown in FIG. 7A to FIG. 7C, includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 moves toward the object side, the second lens unit G2, after moving once toward the object side, is turned over, and moves toward the image side, the third lens unit G3 moves integrally with the aperture stop S toward the object side, and the fourth lens unit G4 moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth positive meniscus lens having a convex surface directed toward the object side, and a fifth biconcave negative lens. The third lens unit G3 includes a sixth biconvex positive lens, a seventh positive meniscus lens having a convex surface directed toward the object side, and an eighth negative meniscus lens having a convex surface directed toward the object side. The seventh positive meniscus lens and the eighth negative meniscus lens are cemented. The fourth lens unit G4 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Figure 8A:
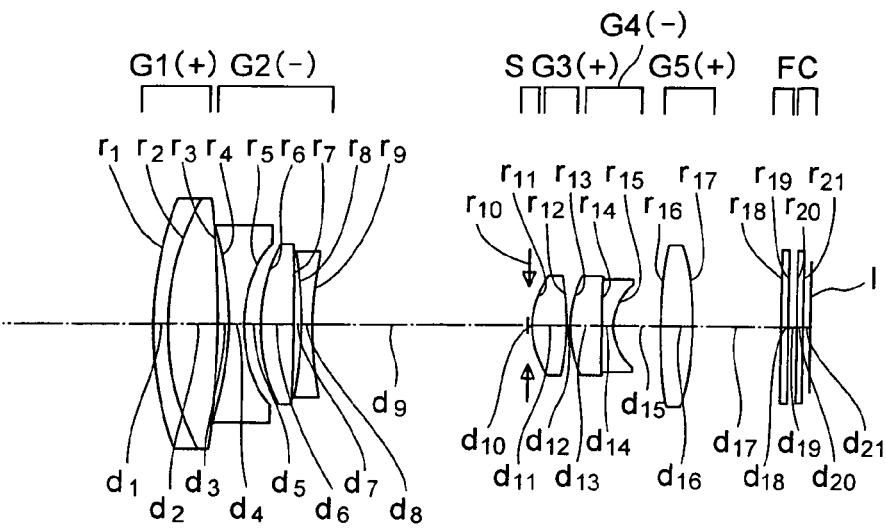
FIG. 8A, FIG. 8B, and FIG. 8C are diagrams similar to FIG. 1A, FIG. 1B, and FIG. 1C respectively, according to an eighth embodiment of the zoom lens system of the present invention.
Figure 8B:
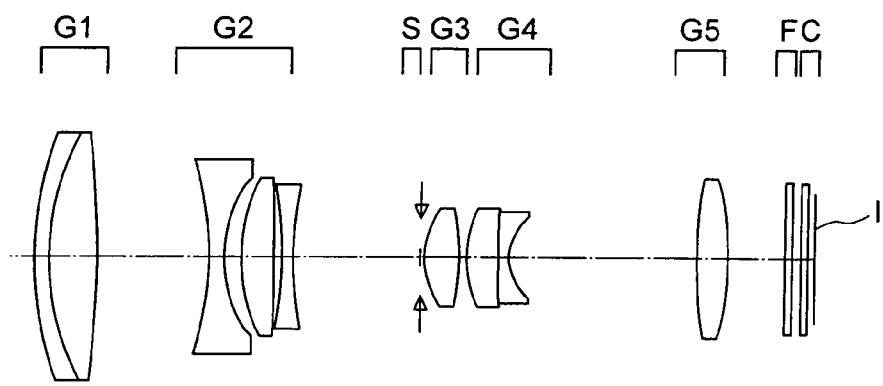
Figure 8C:
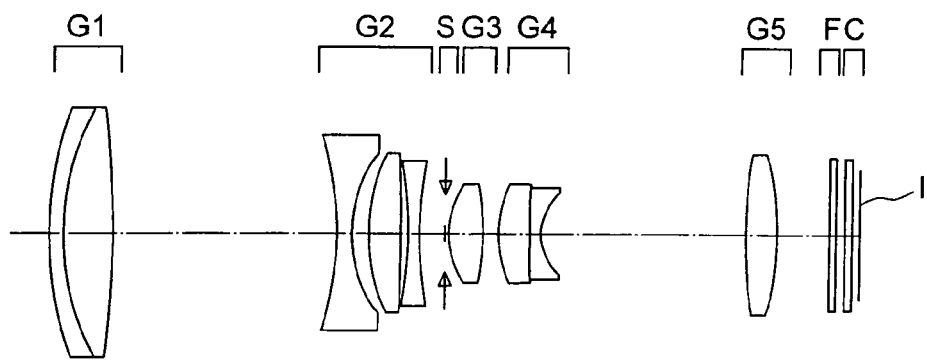
Figure 9A:
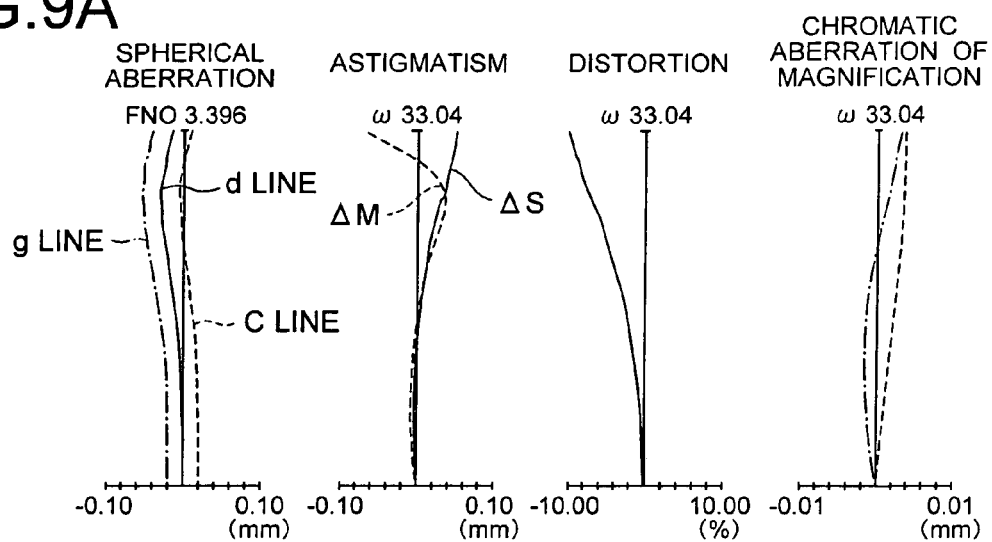
FIG. 9A, FIG. 9B, and FIG. 9C are diagrams showing a spherical aberration, an astigmatism, a distortion, and a chromatic aberration of magnification at the time of the infinite object point focusing, according to the first embodiment, where.
Figure 9B:
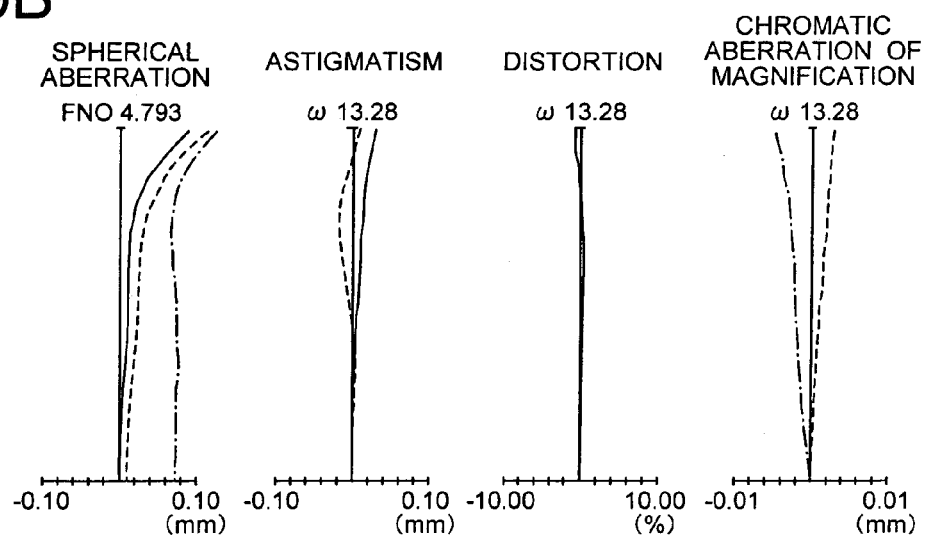
Figure 9C:
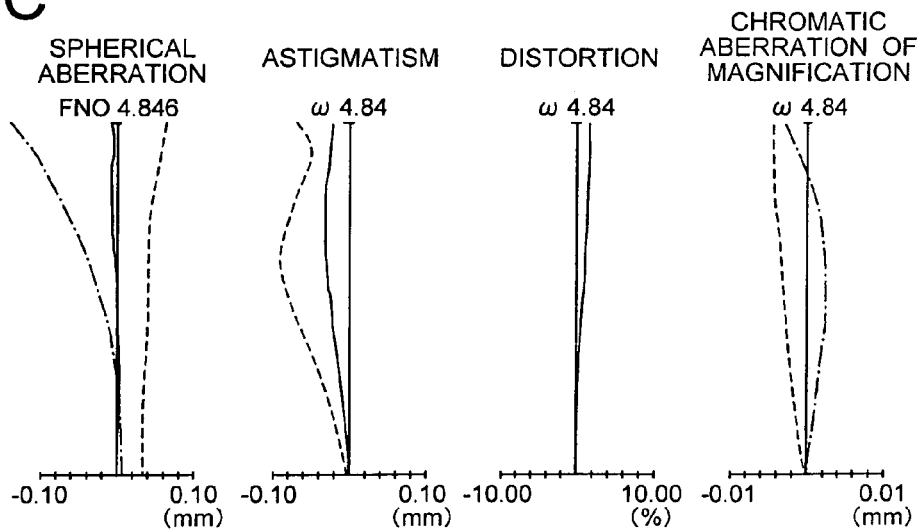
Figure 10A:
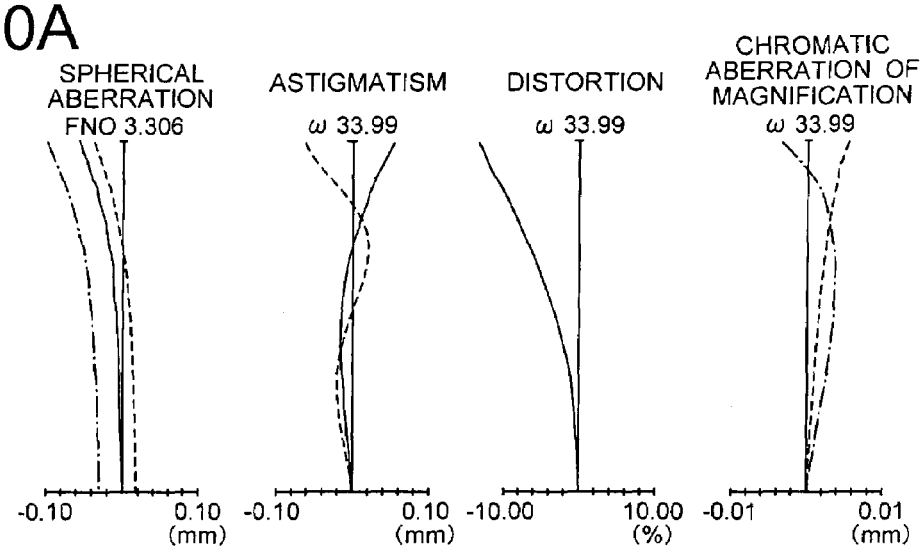
FIG. 10A, FIG. 10B, and FIG. 10C are diagrams similar to FIG. 9A, FIG. 9B, and FIG. 9C respectively, at the time of the infinite object point focusing, according to the second embodiment.
Figure 10B:
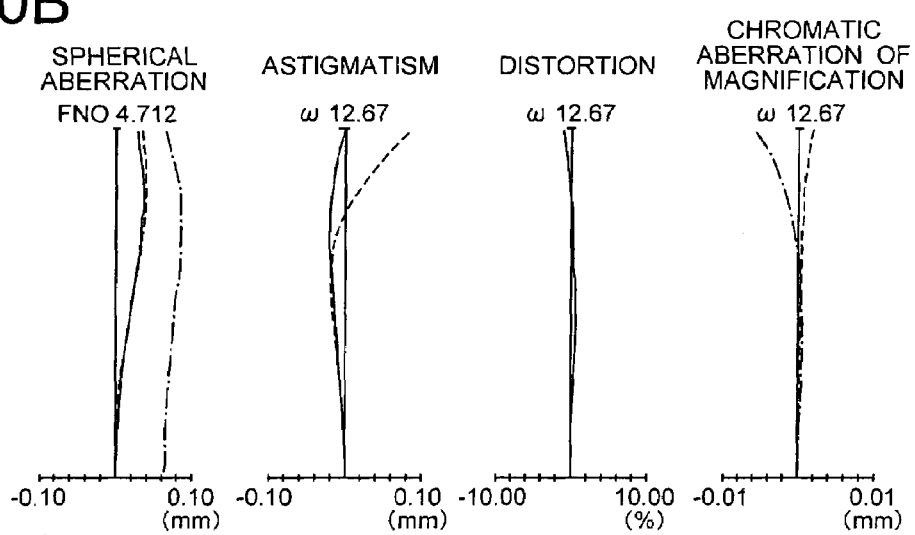
Figure 10C:
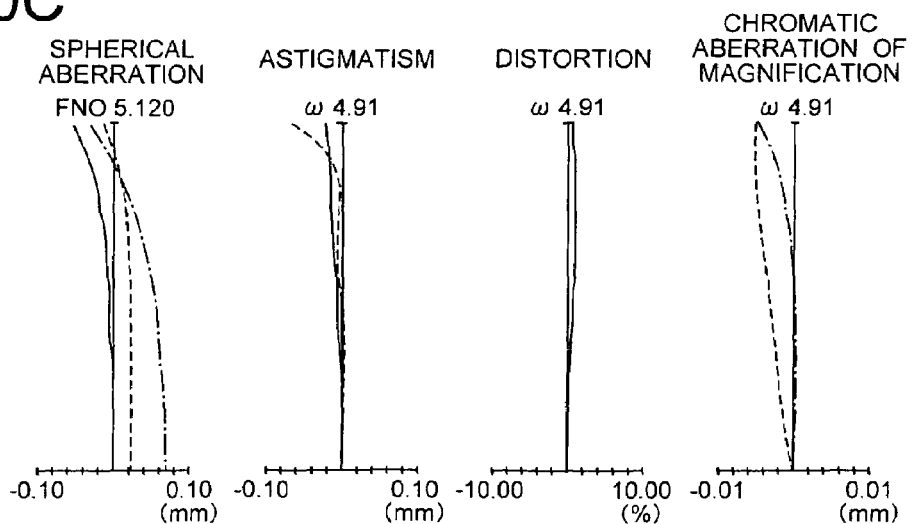
Figure 11A:
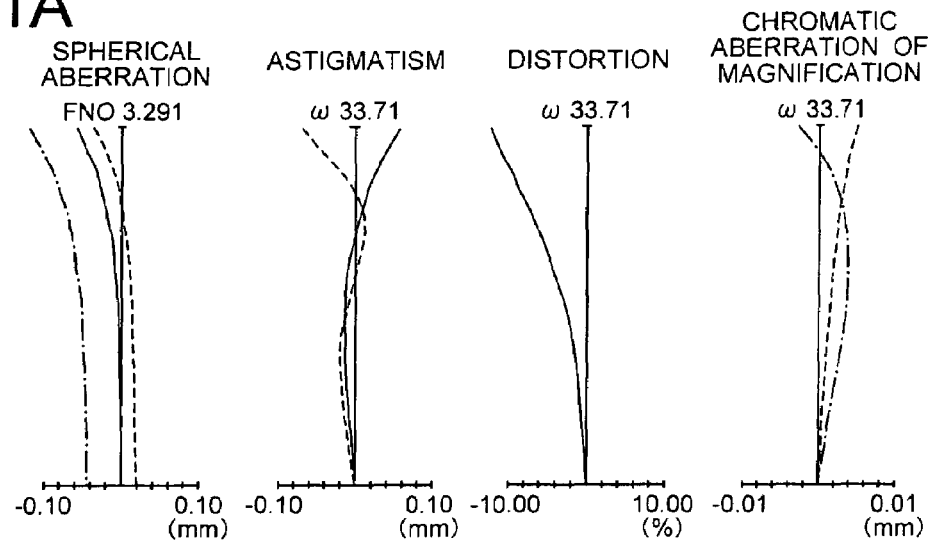
FIG. 11A, FIG. 11B, and FIG. 11C are diagrams similar to FIG. 9A, FIG. 9B, and FIG. 9C respectively, at the time of the infinite object point focusing, according to the third embodiment.
Figure 11B:
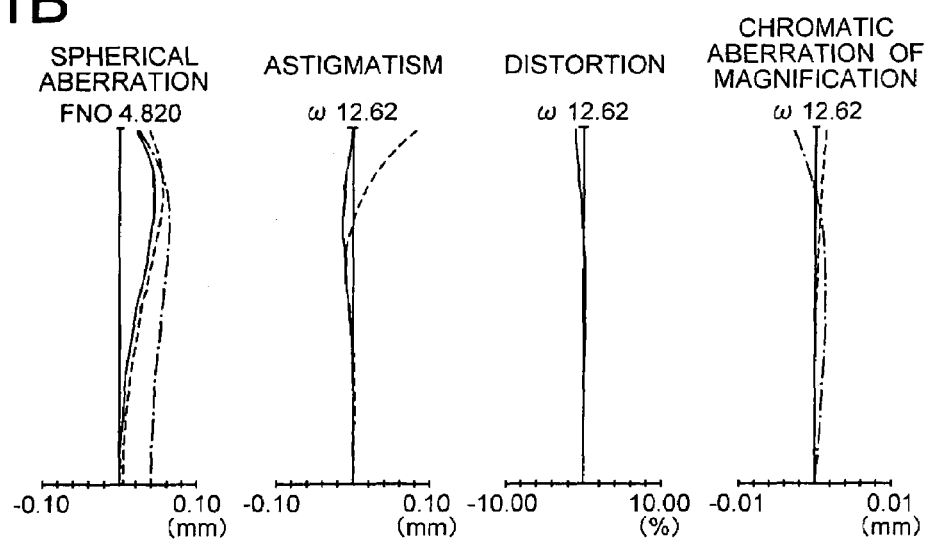
Figure 11C:
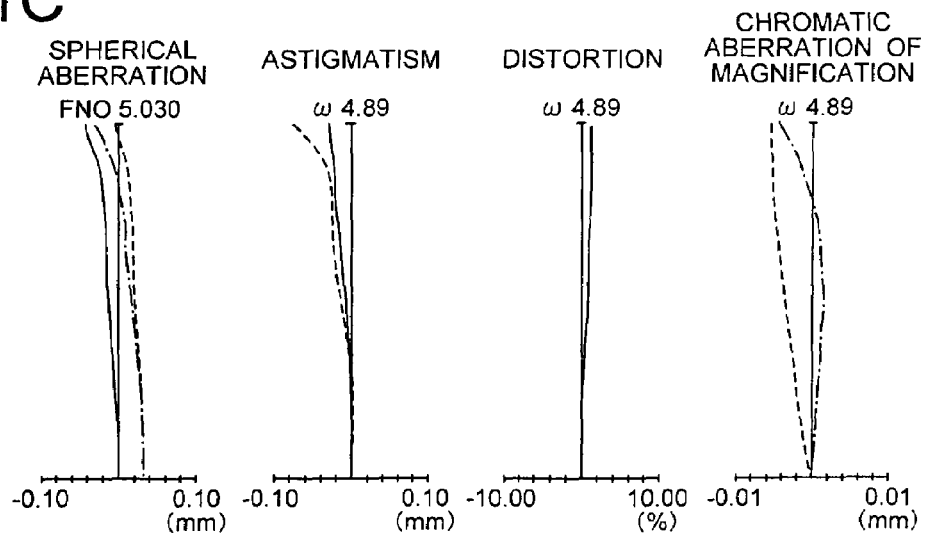
Figure 12A:
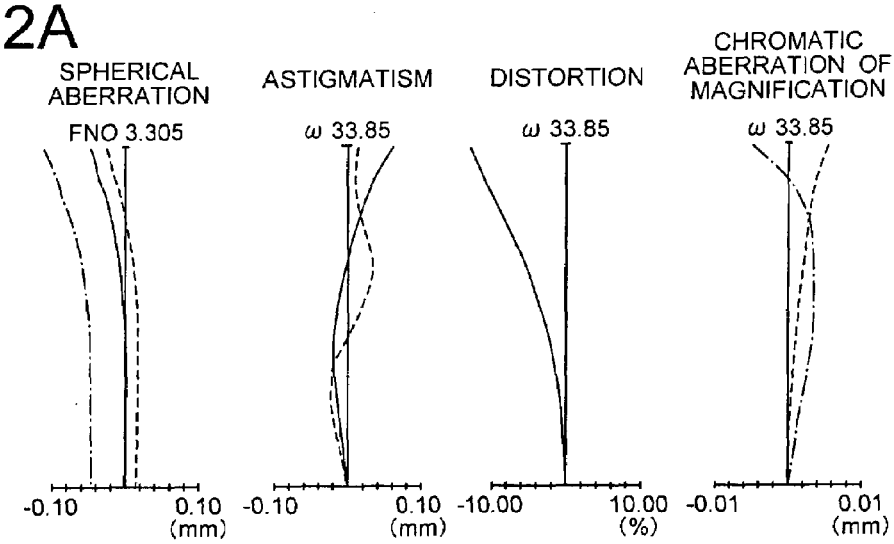
FIG. 12A, FIG. 12B, and FIG. 12C are diagrams similar to FIG. 9A, FIG. 9B, and FIG. 9C respectively, at the time of the infinite object point focusing, according to the fourth embodiment.
Figure 12B:
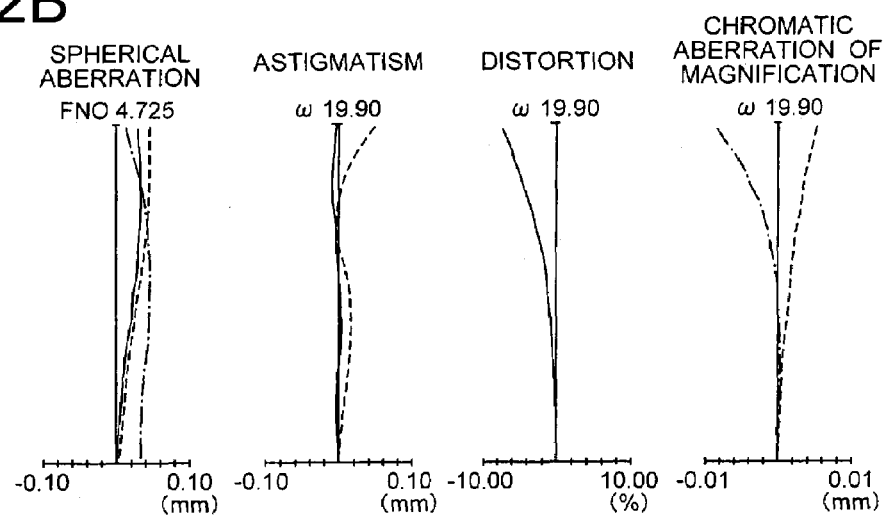
Figure 12C:
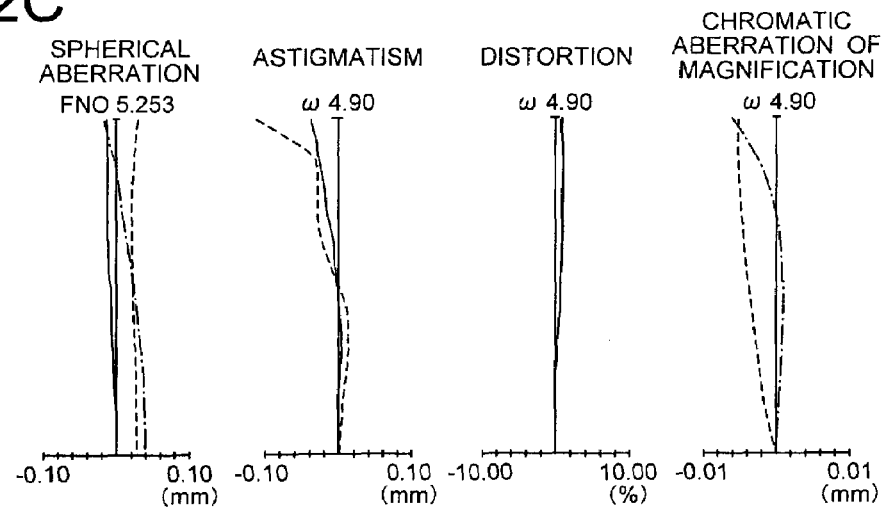
Figure 13A:
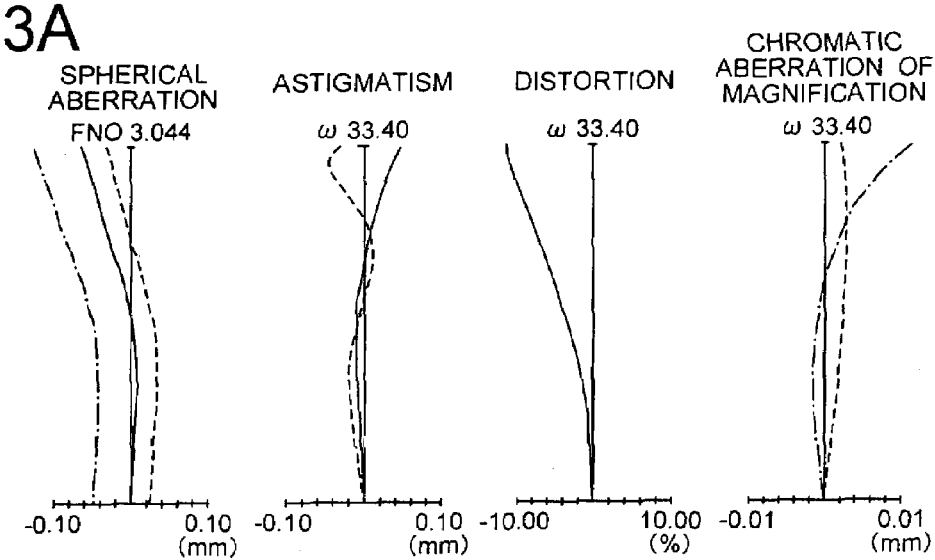
FIG. 13A, FIG. 13B, and FIG. 13C are diagrams similar to FIG. 9A, FIG. 9B, and FIG. 9C respectively, at the time of the infinite object point focusing, according to the fifth embodiment.
Figure 13B:
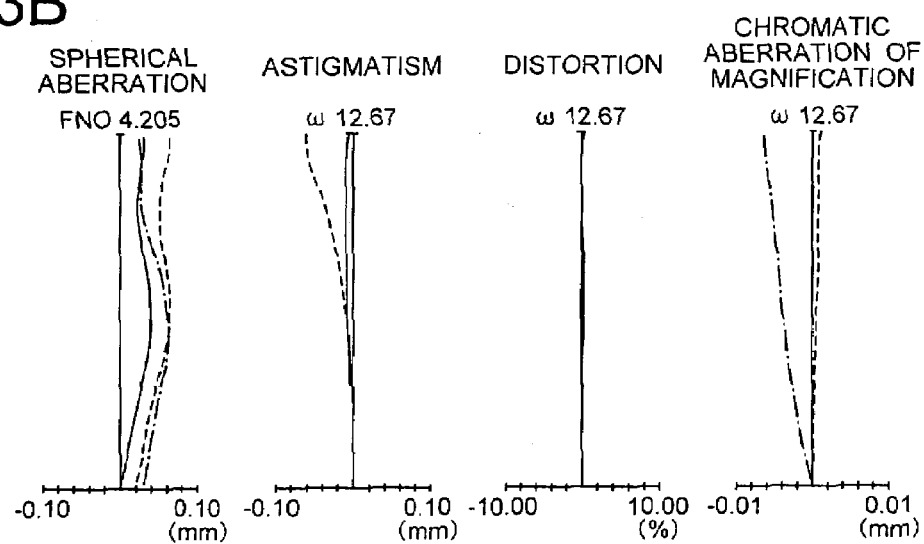
Figure 13C:
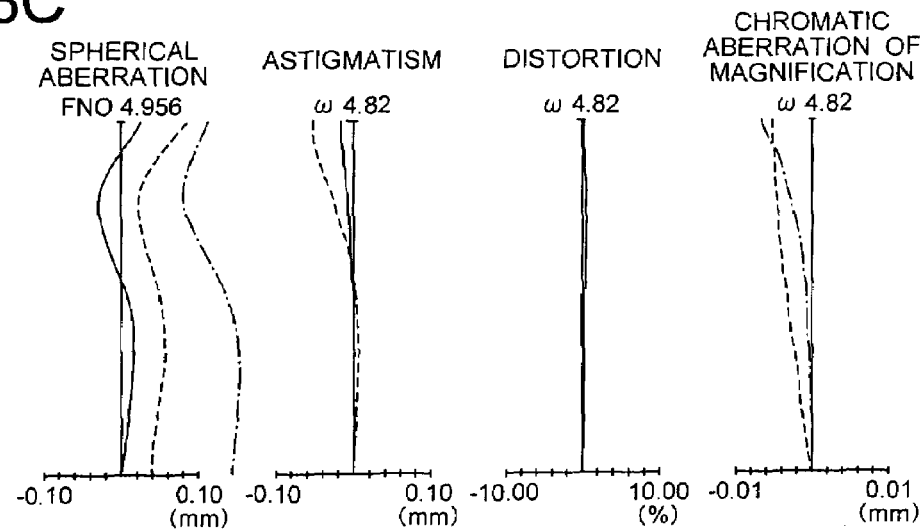
Figure 14A:
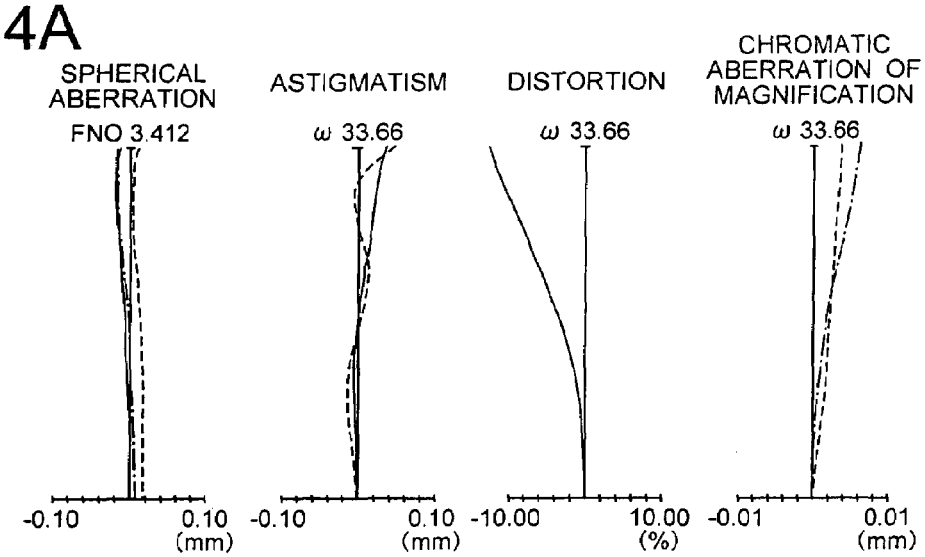
FIG. 14A, FIG. 14B, and FIG. 14C are diagrams similar to FIG. 9A, FIG. 9B, and FIG. 9C respectively, at the time of the infinite object point focusing, according to the sixth embodiment.
Figure 14B:
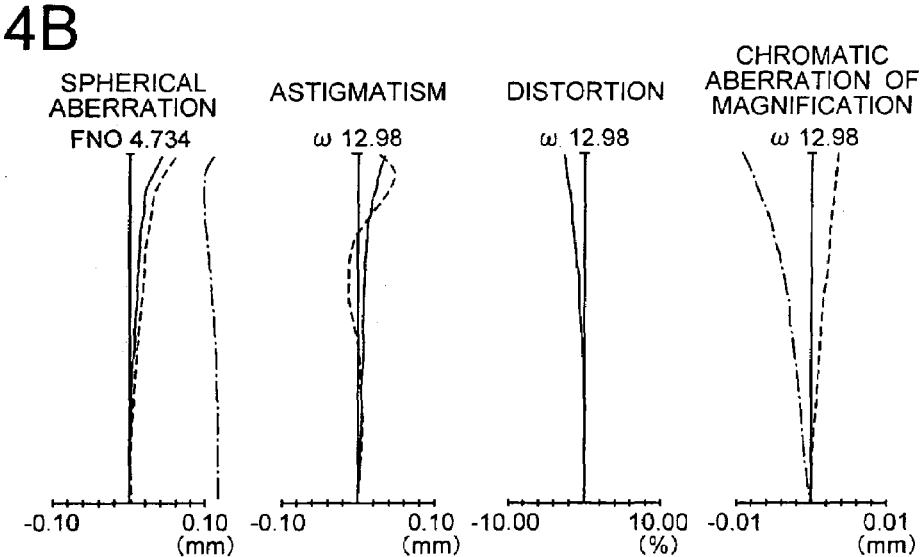
Figure 14C:
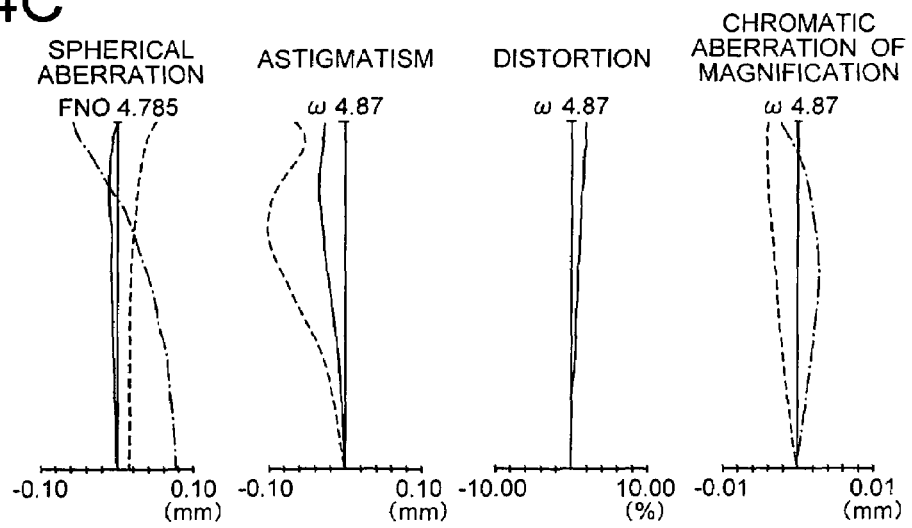
Figure 15A:
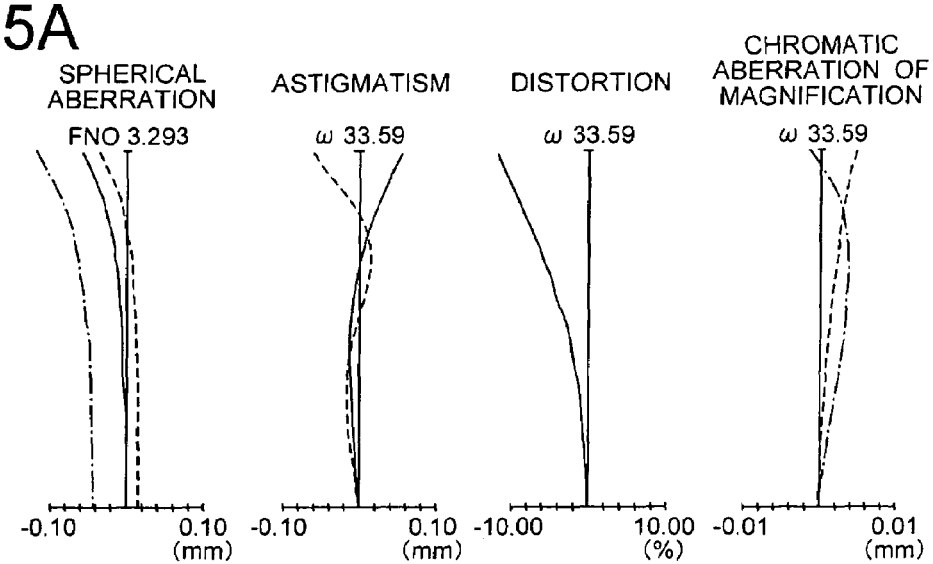
FIG. 15A, FIG. 15B, and FIG. 15C are diagrams similar to FIG. 9A, FIG. 9B, and FIG. 9C respectively, at the time of the infinite object point focusing, according to the seventh embodiment.
Figure 15B:
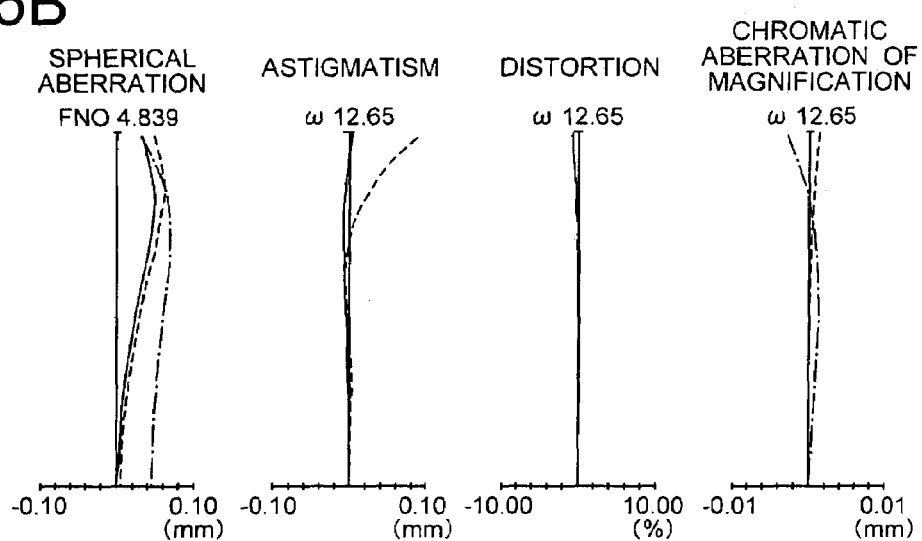
Figure 15C:
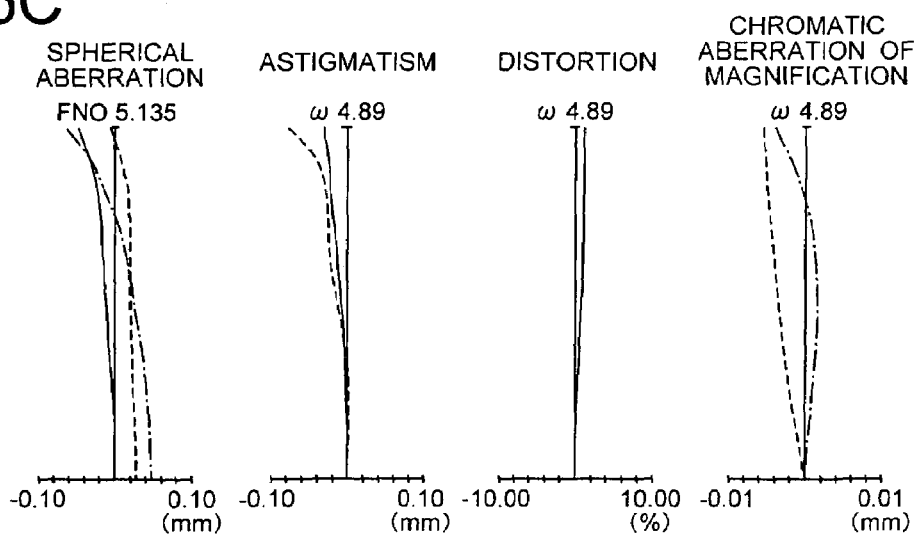
Figure 16A:
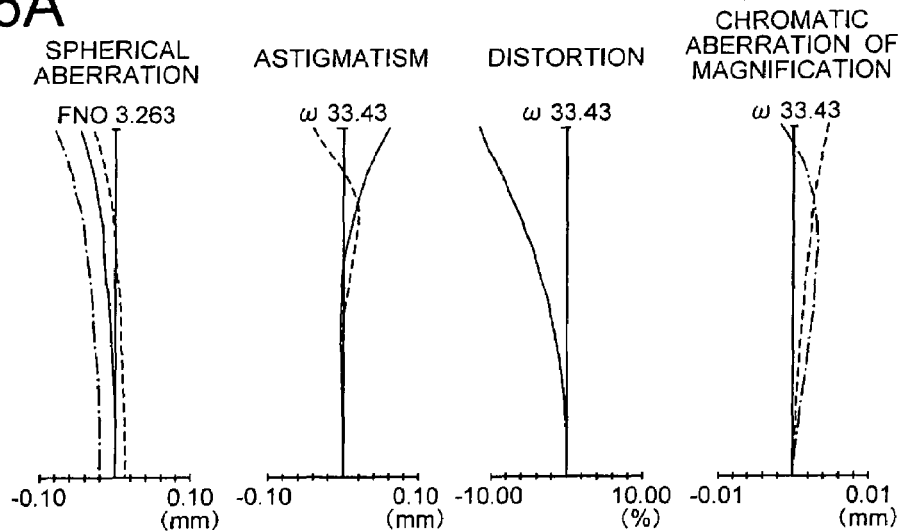
FIG. 16A, FIG. 16B, and FIG. 16C are diagrams similar to FIG. 9A, FIG. 9B, and FIG. 9C respectively, at the time of the infinite object point focusing, according to the eighth embodiment.
Figure 16B:
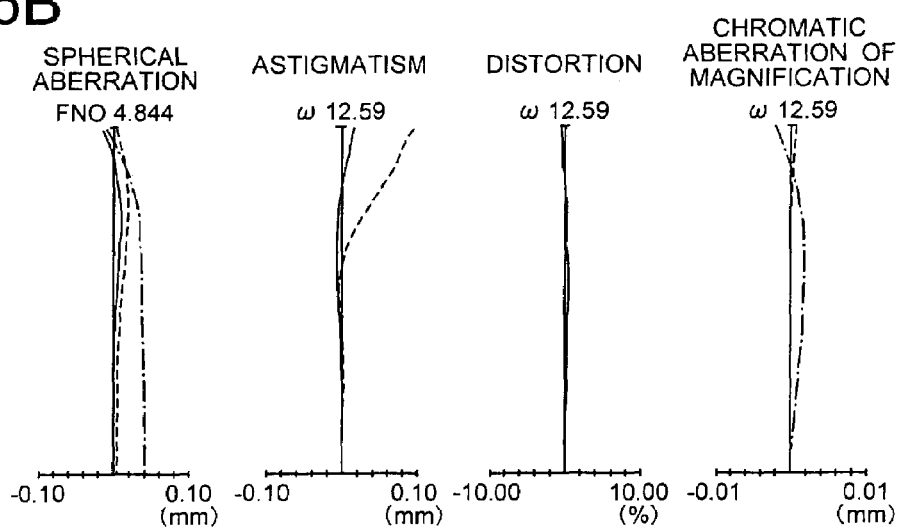
Figure 16C:
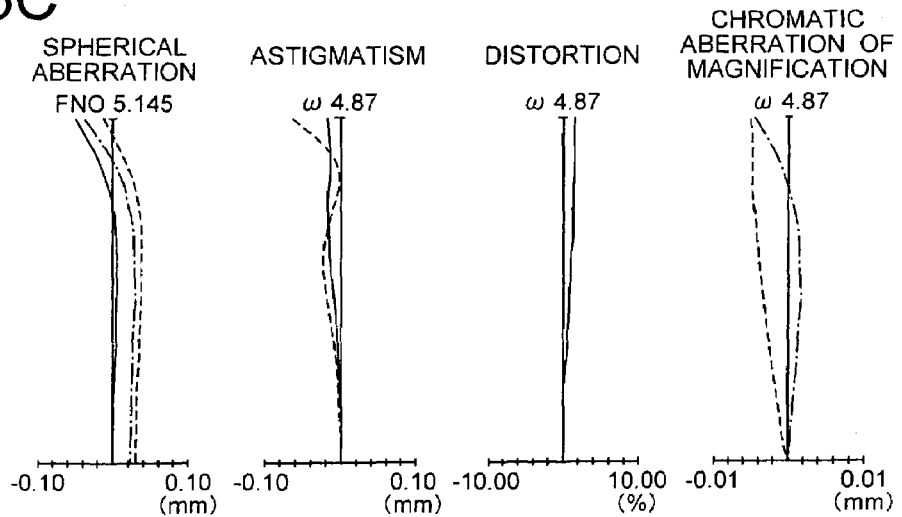

A zoom lens system in the eighth embodiment, as shown in FIG. 8A to FIG. 8C, includes, in order from the object side thereof, a first lens unit G1 having a positive refracting power, a second lens unit G2 having a negative refracting power, an aperture stop S, a third lens unit G3 having a positive refracting power, a fourth lens unit G4 having a negative refracting power, and a fifth lens unit G5 having a positive refracting power.

At the time of zooming from the wide angle end to the telephoto end, the first lens unit G1 moves toward the object side, the second lens unit G2, after moving once toward the object, is turned over, and moves toward the image side, the third lens unit G3 moves integrally with the aperture stop S toward the object side, the fourth lens unit G4 moves toward the object side, and the fifth lens unit G5 moves toward the image side.

In order from the object side, the first lens unit G1 includes a first negative meniscus lens having a convex surface directed toward the object side and a second biconvex positive lens. The first negative meniscus lens and the second biconvex positive lens are cemented. The second lens unit G2 includes a third biconcave negative lens, a fourth biconvex positive lens, and a fifth biconcave negative lens. The third lens unit G3 includes a sixth biconvex positive lens. The fourth lens unit G4 includes a seventh positive meniscus lens having a convex surface directed toward the object side and an eighth negative meniscus lens having a convex surface directed toward the object side. The seventh positive meniscus lens and the eighth negative meniscus lens are cemented. The fifth lens unit G5 includes a ninth biconvex positive lens.

An aspheric surface is used for seven surfaces namely, a surface on the image side of the second biconvex positive lens, both surfaces of the third biconcave negative lens, both surfaces of the sixth biconvex positive lens, and both surfaces of the ninth biconvex positive lens.

Numerical data of each embodiment described above is shown below. Apart from symbols described above, f denotes a focal length of the entire zoom lens system, BF denotes a back focus, each of $f_1, f_2, \ldots$ denotes a focal length of each lens unit, 1 m denotes an image height, $F_{NO}$ denotes an F number, ω denotes a half image angle, WE denotes a wide angle end, ST denotes an intermediate state, TE denotes a telephoto end, each of $r_1, r_2, \ldots$ denotes a radius of curvature of each lens surface, each of $d_1, d_2, \ldots$ denotes a distance between two lenses, each of $n_{d1}, n_{d2}, \ldots$ denotes a refractive index of each lens for a d-line, and each of $v_{d1}, v_{d2}, \ldots$ denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive direction, and y is let to be in a direction orthogonal to the optical axis, a shape of the aspheric surface is described by the following expression.

ここまで

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, $A_4, A_6, A_8, A_{10}$, and $A_{12}$ denote aspherical-surface coefficients of a fourth order, a sixth order, an eight order, a tenth order, and a twelfth order respectively. Moreover, in the aspherical surface coefficients, 'e–n' ('e$^{-n}$') (where, n is an integral number) indicates '$10^{-n}$'.

Further "A" means that the surface is an aspheric surface, and "S" means that the surface is an aperture stop.

EXAMPLE 1

| | | | |
|---|---|---|---|
| $r_1 = 15.444$ | $d_1 = 0.80$ | $n_{d1} = 1.84666$ | $\nu_{d1} = 23.78$ |
| $r_2 = 11.717$ | $d_2 = 3.80$ | $n_{d2} = 1.59201$ | $\nu_{d2} = 67.07$ |
| $r_3 = -98.951(A)$ | $d_3 = $ (Variable) | | |
| $r_4 = -2854.305(A)$ | $d_4 = 0.90$ | $n_{d3} = 1.83481$ | $\nu_{d3} = 42.71$ |
| $r_5 = 6.067(A)$ | $d_5 = 2.20$ | | |
| $r_6 = -35.773$ | $d_6 = 0.70$ | $n_{d4} = 1.88300$ | $\nu_{d4} = 40.76$ |
| $r_7 = 11.573$ | $d_7 = 0.10$ | | |
| $r_8 = 8.635$ | $d_8 = 1.87$ | $n_{d5} = 1.94595$ | $\nu_{d5} = 17.98$ |
| $r_9 = 30.479$ | $d_9 = $ (Variable) | | |
| $r_{10} = \infty(S)$ | $d_{10} = -0.10$ | | |
| $r_{11} = 5.696(A)$ | $d_{11} = 1.70$ | $n_{d6} = 1.58313$ | $\nu_{d6} = 59.38$ |
| $r_{12} = -20.003(A)$ | $d_{12} = 0.10$ | | |
| $r_{13} = 7.317$ | $d_{13} = 1.80$ | $n_{d7} = 1.76200$ | $\nu_{d7} = 40.10$ |
| $r_{14} = -17.180$ | $d_{14} = 0.40$ | $n_{d8} = 1.74077$ | $\nu_{d8} = 27.79$ |
| $r_{16} = 31.620(A)$ | $d_{16} = 1.85$ | $n_{d9} = 1.74320$ | $\nu_{d9} = 49.34$ |
| $r_{17} = -24.423$ | $d_{17} = $ (Variable) | | |
| $r_{18} = \infty$ | $d_{18} = 0.50$ | $n_{d10} = 1.51633$ | $\nu_{d10} = 64.14$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$(Light receiving surface of electronic image pickup apparatus, image plane) | | | |

Aspherical coefficients

3rd surface $K = 0.000$
$A_4 = 2.35252e{-}05$
$A_6 = 4.58211e{-}08$
$A_8 = -1.99975e{-}09$
$A_{10} = 1.43444e{-}11$ 4th surface $K = 0.000$
$A_4 = -1.21713e{-}05$
$A_6 = -8.45979e{-}06$
$A_8 = 5.55140e{-}07$
$A_{10} = -8.58521e{-}09$ 5th surface $K = -0.018$
$A_4 = 7.52509e{-}05$
$A_6 = 8.45492e{-}07$
$A_8 = -6.77958e{-}07$
$A_{10} = 1.07984e{-}07$ 11th surface $K = 1.133$
$A_4 = -1.14893e{-}03$
$A_6 = -3.52642e{-}05$
$A_8 = -9.31419e{-}08$
$A_{10} = -3.39604e{-}08$ 12th surface $K = 0.000$
$A_4 = 6.27645e{-}04$
$A_6 = -1.98791e{-}06$
$A_8 = 4.38006e{-}06$
$A_{10} = -5.32650e{-}22$ 16th surface $K = 0.000$
$A_4 = -4.35107e{-}05$
$A_6 = 1.25613e{-}05$
$A_8 = -5.34745e{-}07$
$A_{10} = 9.44035e{-}09$

Zoom data(∞)

| Zoom ratio | 6.78957 | |
|---|---|---|
| $f_1$ | 25.6636 | |
| $f_2$ | -5.93358 | |
| $f_3$ | 10.1186 | |
| $f_4$ | 18.8057 | |

| | WE | ST | TE |
|---|---|---|---|
| f(mm) | 6.58 | 16.39 | 44.70 |
| $F_{NO}$ | 3.40 | 4.79 | 4.85 |
| 2ω(°) | 66.09 | 26.56 | 9.67 |
| Im | 3.84 | 3.84 | 3.84 |
| Lens total length | 40.245 | 47.889 | 48.804 |
| BF | 6.126 | 5.078 | 4.572 |
| $d_3$ | 0.41 | 5.74 | 12.36 |
| $d_9$ | 11.64 | 7.21 | 1.64 |
| $d_{15}$ | 5.95 | 13.74 | 14.12 |
| $d_{17}$ | 4.60 | 3.55 | 3.01 |

EXAMPLE 2

| | | | |
|---|---|---|---|
| $r_1 = 164.290$ | $d_1 = 0.80$ | $n_{d1} = 1.92286$ | $\nu_{d1} = 18.90$ |
| $r_2 = 42.006$ | $d_2 = 0.10$ | | |
| $r_3 = 20.528$ | $d_3 = 3.23$ | $n_{d2} = 1.69350$ | $\nu_{d2} = 53.21$ |
| $r_4 = -36.130(A)$ | $d_4 = $ (Variable) | | |
| $r_5 = -17.430(A)$ | $d_5 = 0.80$ | $n_{d3} = 1.83481$ | $\nu_{d3} = 42.71$ |
| $r_6 = 9.847(A)$ | $d_6 = 0.89$ | | |
| $r_7 = 14.810$ | $d_7 = 1.96$ | $n_{d4} = 1.92286$ | $\nu_{d4} = 18.90$ |
| $r_8 = -53.551$ | $d_8 = 0.45$ | | |
| $r_9 = -19.236$ | $d_9 = 0.79$ | $n_{d5} = 1.88300$ | $\nu_{d5} = 40.76$ |
| $r_{10} = 33.352$ | $d_{10} = $ (Variable) | | |
| $r_{11} = \infty(S)$ | $d_{11} = 0.14$ | | |
| $r_{12} = 4.993(A)$ | $d_{12} = 2.20$ | $n_{d6} = 1.49700$ | $\nu_{d6} = 81.54$ |
| $r_{13} = -16.289(A)$ | $d_{13} = 0.10$ | | |
| $r_{14} = 6.943$ | $d_{14} = 1.95$ | $n_{d7} = 1.51633$ | $\nu_{d7} = 64.14$ |
| $r_{15} = 32.067$ | $d_{15} = 0.69$ | $n_{d8} = 1.66680$ | $\nu_{d8} = 33.05$ |
| $r_{16} = 3.446$ | $d_{16} = $ (Variable) | | |
| $r_{17} = 21.059(A)$ | $d_{17} = 1.95$ | $n_{d9} = 1.69350$ | $\nu_{d9} = 53.21$ |
| $r_{18} = -32.749(A)$ | $d_{18} = $ (Variable) | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$(Light receiving surface of electronic image pickup apparatus, image plane) | | | |

Aspherical coefficients

4th surface $K = 0.000$
$A_4 = 3.55846e{-}05$
$A_6 = -7.84781e{-}08$
$A_8 = 3.91858e{-}10$
$A_{10} = -1.35153e{-}12$ 5th surface $K = 0.000$
$A_4 = 5.30520e{-}05$
$A_6 = 3.44321e{-}06$
$A_8 = -2.64614e{-}09$
$A_{10} = -4.17059e{-}10$ 6th surface $K = 0.000$
$A_4 = -2.90084e{-}04$
$A_6 = 6.88077e{-}06$ -continued A₈ = −1.25164e−07
A₁₀ = 4.82695e−09

12th surface

K = 0.000
A₄ = −7.66431e−04
A₆ = −1.26220e−05
A₈ = −2.78834e−07
A₁₀ = 1.49151e−07

13th surface

K = 0.000
A₄ = 5.71686e−04
A₆ = −3.43827e−06
A₈ = 8.72738e−07
A₁₀ = 1.92117e−07

17th surface

K = 0.000
A₄ = 3.70848e−04
A₆ = −6.68050e−06
A₈ = −1.18010e−06
A₁₀ = 3.67358e−08

18th surface

K = 0.000
A₄ = 3.46958e−04
A₆ = −1.92683e−05
A₈ = −9.42946e−07
A₁₀ = 3.50981e−08

Zoom data(∞)

| | | | |
|---|---|---|---|
| Zoom ratio | | 6.71196 | |
| $f_1$ | | 27.7776 | |
| $f_2$ | | −7.55699 | |
| $f_3$ | | 11.0757 | |
| $f_4$ | | 18.7603 | |
| | WE | ST | TE |
| f(mm) | 6.62 | 17.34 | 44.45 |
| $F_{NO}$ | 3.31 | 4.71 | 5.12 |
| 2ω(°) | 67.99 | 25.35 | 9.83 |
| Im | 3.84 | 3.84 | 3.84 |
| Lens total length | 40.782 | 48.828 | 49.321 |
| BF | 6.861 | 5.547 | 4.623 |
| $d_4$ | 0.63 | 6.95 | 13.62 |
| $d_{10}$ | 14.36 | 8.68 | 1.67 |
| $d_{16}$ | 2.87 | 11.59 | 13.34 |
| $d_{18}$ | 5.46 | 4.07 | 3.17 |

EXAMPLE 3

| | | | |
|---|---|---|---|
| $r_1$ = 24.013 | $d_1$ = 0.80 | $n_{d1}$ = 1.92286 | $v_{d1}$ = 18.90 |
| $r_2$ = 16.672 | $d_2$ = 3.11 | $n_{d2}$ = 1.69350 | $v_{d2}$ = 53.21 |
| $r_3$ = −62.378(A) | $d_3$ = (Variable) | | |
| $r_4$ = −17.392(A) | $d_4$ = 0.90 | $n_{d3}$ = 1.83481 | $v_{d3}$ = 42.71 |
| $r_5$ = 8.527(A) | $d_5$ = 0.99 | | |
| $r_6$ = 11.789 | $d_6$ = 1.92 | $n_{d4}$ = 1.92286 | $v_{d4}$ = 18.90 |
| $r_7$ = 776.551 | $d_7$ = 0.44 | | |
| $r_8$ = −24.913 | $d_8$ = 0.65 | $n_{d5}$ = 1.88300 | $v_{d5}$ = 40.76 |
| $r_9$ = 33.289 | $d_9$ = (Variable) | | |
| $r_{10}$ = ∞(S) | $d_{10}$ = 0.14 | | |
| $r_{11}$ = 5.015(A) | $d_{11}$ = 2.20 | $n_{d6}$ = 1.49700 | $v_{d6}$ = 81.54 |
| $r_{12}$ = −14.334(A) | $d_{12}$ = 0.10 | | |
| $r_{13}$ = 7.242 | $d_{13}$ = 1.95 | $n_{d7}$ = 1.51633 | $v_{d7}$ = 64.14 |
| $r_{14}$ = 26.272 | $d_{14}$ = 0.69 | $n_{d8}$ = 1.66680 | $v_{d8}$ = 33.05 |
| $r_{15}$ = 3.492 | $d_{15}$ = (Variable) | | |
| $r_{16}$ = 22.562(A) | $d_{16}$ = 1.95 | $n_{d9}$ = 1.69350 | $v_{d9}$ = 53.21 |
| $r_{17}$ = −28.859(A) | $d_{17}$ = (Variable) | | |
| $r_{18}$ = ∞ | $d_{18}$ = 0.40 | $n_{d10}$ = 1.54771 | $v_{d10}$ = 62.84 |
| $r_{19}$ = ∞ | $d_{19}$ = 0.50 | | |
| $r_{20}$ = ∞ | $d_{20}$ = 0.50 | $n_{d11}$ = 1.51633 | $v_{d11}$ = 64.14 |
| $r_{21}$ = ∞ | $d_{21}$ = 0.37 | | |
| $r_{22}$ = ∞(Light receiving surface of electronic image pickup apparatus, image plane) | | | |

Aspherical coefficients

3rd surface

K = 0.000
A₄ = 1.40060e−05
A₆ = −2.13786e−08
A₈ = 6.13713e−11
A₁₀ = −3.87157e−13

4th surface

K = 0.000
A₄ = 1.38945e−04
A₆ = 2.77606e−06
A₈ = −2.50200e−08
A₁₀ = −1.24310e−10

5th surface

K = 0.000
A₄ = −2.09641e−04
A₆ = 6.71803e−06
A₈ = −4.86344e−08
A₁₀ = 3.00306e−09

11th surface

K = 0.000
A₄ = −8.97936e−04
A₆ = −1.06205e−05
A₈ = −1.06557e−06
A₁₀ = 1.81692e−07

12th surface

K = 0.000
A₄ = 5.00236e−04
A₆ = 3.01203e−06
A₈ = −8.96053e−07
A₁₀ = 2.69843e−07

16th surface

K = 0.000
A₄ = 3.00774e−04
A₆ = −5.89899e−06
A₈ = −1.66604e−06
A₁₀ = 5.94373e−08

17th surface

K = 0.000
A₄ = 2.80909e−04
A₆ = −2.09921e−05
A₈ = −1.17115e−06
A₁₀ = 5.19021e−08

Zoom data(∞)

| | | | |
|---|---|---|---|
| Zoom ratio | | 6.7234 | |
| $f_1$ | | 28.3083 | |
| $f_2$ | | −7.32029 | |
| $f_3$ | | 10.752 | |
| $f_4$ | | 18.5467 | |
| | WE | ST | TE |
| f(mm) | 6.62 | 17.32 | 44.49 |
| $F_{NO}$ | 3.29 | 4.82 | 5.03 |
| 2ω(°) | 67.41 | 25.23 | 9.77 |
| Im | 3.84 | 3.84 | 3.84 |
| Lens total length | 39.886 | 47.929 | 48.885 |
| BF | 6.709 | 5.278 | 4.635 |
| $d_3$ | 0.68 | 6.67 | 13.55 |

-continued

| | | | |
|---|---|---|---|
| d$_9$ | 13.80 | 8.30 | 1.67 |
| d$_{15}$ | 2.86 | 11.83 | 13.19 |
| d$_{17}$ | 5.29 | 3.80 | 3.25 |

EXAMPLE 4

| | | | |
|---|---|---|---|
| r$_1$ = 23.006 | d$_1$ = 0.80 | n$_{d1}$ = 1.92286 | ν$_{d1}$ = 18.90 |
| r$_2$ = 15.977 | d$_2$ = 3.00 | n$_{d2}$ = 1.69350 | ν$_{d2}$ = 53.21 |
| r$_3$ = −62.704(A) | d$_3$ = (Variable) | | |
| r$_4$ = −22.989(A) | d$_4$ = 0.90 | n$_{d3}$ = 1.83481 | ν$_{d3}$ = 42.71 |
| r$_5$ = 8.008(A) | d$_5$ = 1.39 | | |
| r$_6$ = 10.182 | d$_6$ = 1.98 | n$_{d4}$ = 1.92286 | ν$_{d4}$ = 18.90 |
| r$_7$ = 62.378 | d$_7$ = 0.73 | | |
| r$_8$ = −23.718 | d$_8$ = 0.60 | n$_{d5}$ = 1.88300 | ν$_{d5}$ = 40.76 |
| r$_9$ = 25.162 | d$_9$ = (Variable) | | |
| r$_{10}$ = ∞(S) | d$_{10}$ = 0.14 | | |
| r$_{11}$ = 5.027(A) | d$_{11}$ = 2.20 | n$_{d6}$ = 1.49700 | ν$_{d6}$ = 81.54 |
| r$_{12}$ = −12.074(A) | d$_{12}$ = 0.10 | | |
| r$_{13}$ = 7.900 | d$_{13}$ = 1.95 | n$_{d7}$ = 1.51633 | ν$_{d7}$ = 64.14 |
| r$_{14}$ = 33.216 | d$_{14}$ = 0.69 | n$_{d8}$ = 1.66680 | ν$_{d8}$ = 33.05 |
| r$_{15}$ = 3.627 | d$_{15}$ = (Variable) | | |
| r$_{16}$ = 24.000(A) | d$_{16}$ = 1.97 | n$_{d9}$ = 1.69350 | ν$_{d9}$ = 53.21 |
| r$_{17}$ = −26.936(A) | d$_{17}$ = (Variable) | | |
| r$_{18}$ = ∞ | d$_{18}$ = 0.40 | n$_{d10}$ = 1.54771 | ν$_{d10}$ = 62.84 |
| r$_{19}$ = ∞ | d$_{19}$ = 0.50 | | |
| r$_{20}$ = ∞ | d$_{20}$ = 0.50 | n$_{d11}$ = 1.51633 | ν$_{d11}$ = 64.14 |
| r$_{21}$ = ∞ | d$_{21}$ = 0.37 | | |
| r$_{22}$ = ∞(Light receiving surface of electronic image pickup apparatus, image plane) | | | |

Aspherical coefficients

3rd surface

K = 0.000
A$_4$ = 1.59974e−05
A$_6$ = −4.42324e−08
A$_8$ = 1.84410e−10
A$_{10}$ = −3.58654e−13

4th surface

K = 0.000
A$_4$ = 5.75994e−05
A$_6$ = −9.85323e−07
A$_8$ = 9.63724e−08
A$_{10}$ = −1.08278e−09

5th surface

K = 0.000
A$_4$ = −2.49956e−04
A$_6$ = 7.63525e−06
A$_8$ = −6.41552e−07
A$_{10}$ = 2.11270e−08

11th surface

K = 0.000
A$_4$ = −1.07374e−03
A$_6$ = 5.52660e−06
A$_8$ = −2.37896e−06
A$_{10}$ = 1.85262e−07

12th surface

K = 0.000
A$_4$ = 4.77468e−04
A$_6$ = 1.87922e−05
A$_8$ = −1.97636e−06
A$_{10}$ = 2.42875e−07

16th surface

K = 0.000
A$_4$ = 2.46144e−05
A$_6$ = 2.29610e−05
A$_8$ = −3.04556e−06
A$_{10}$ = 5.72624e−08

17th surface

K = 0.000
A$_4$ = 8.68126e−21
A$_6$ = 7.52396e−06
A$_8$ = −2.43406e−06
A$_{10}$ = 4.93919e−08

Zoom data(∞)

| | | | |
|---|---|---|---|
| Zoom ratio | | 6.71775 | |
| f$_1$ | | 27.4998 | |
| f$_2$ | | −6.90604 | |
| f$_3$ | | 10.3788 | |
| f$_4$ | | 18.596 | |

| | WE | ST | TE |
|---|---|---|---|
| f(mm) | 6.63 | 11.51 | 44.55 |
| F$_{NO}$ | 3.30 | 4.73 | 5.25 |
| 2ω(°) | 67.70 | 39.81 | 9.79 |
| Im | 3.84 | 3.84 | 3.84 |
| Lens total length | 39.435 | 42.683 | 49.282 |
| BF | 6.659 | 6.407 | 4.628 |
| d$_3$ | 0.64 | 0.68 | 12.83 |
| d$_9$ | 12.81 | 8.49 | 1.66 |
| d$_{15}$ | 2.87 | 10.65 | 13.70 |
| d$_{17}$ | 5.25 | 4.94 | 3.19 |

EXAMPLE 5

| | | | |
|---|---|---|---|
| r$_1$ = 19.646 | d$_1$ = 0.80 | n$_{d1}$ = 1.94595 | ν$_{d1}$ = 17.98 |
| r$_2$ = 13.881 | d$_2$ = 3.70 | n$_{d2}$ = 1.74320 | ν$_{d2}$ = 49.34 |
| r$_3$ = −90.270(A) | d$_3$ = (Variable) | | |
| r$_4$ = −33.942(A) | d$_4$ = 0.90 | n$_{d3}$ = 1.83481 | ν$_{d3}$ = 42.71 |
| r$_5$ = 12.719(A) | d$_5$ = 1.98 | | |
| r$_6$ = −12.262 | d$_6$ = 0.61 | n$_{d4}$ = 1.88300 | ν$_{d4}$ = 40.76 |
| r$_7$ = 12.142 | d$_7$ = 2.05 | n$_{d5}$ = 1.94595 | ν$_{d5}$ = 17.98 |
| r$_8$ = −150.000 | d$_8$ = (Variable) | | |
| r$_9$ = ∞(S) | d$_9$ = 0.30 | | |
| r$_{10}$ = 5.763(A) | d$_{10}$ = 2.00 | n$_{d6}$ = 1.58313 | ν$_{d6}$ = 59.46 |
| r$_{11}$ = −15.446(A) | d$_{11}$ = 0.15 | | |
| r$_{12}$ = 8.650 | d$_{12}$ = 2.10 | n$_{d7}$ = 1.69680 | ν$_{d7}$ = 55.53 |
| r$_{13}$ = −32.978 | d$_{13}$ = 0.40 | n$_{d8}$ = 1.68893 | ν$_{d8}$ = 31.07 |
| r$_{14}$ = 3.627 | d$_{14}$ = (Variable) | | |
| r$_{15}$ = 45.965(A) | d$_{15}$ = 2.25 | n$_{d9}$ = 1.58313 | ν$_{d9}$ = 59.46 |
| r$_{16}$ = −12.050 | d$_{16}$ = (Variable) | | |
| r$_{17}$ = ∞ | d$_{17}$ = 0.50 | n$_{d10}$ = 1.51633 | ν$_{d10}$ = 64.14 |
| r$_{18}$ = ∞ | d$_{18}$ = 0.50 | | |
| r$_{19}$ = ∞ | d$_{19}$ = 0.50 | n$_{d11}$ = 1.51633 | ν$_{d11}$ = 64.14 |
| r$_{20}$ = ∞ | d$_{20}$ = 0.37 | | |
| r$_{21}$ = ∞(Light receiving surface of electronic image pickup apparatus, image plane) | | | |

Aspherical coefficients

3rd surface

K = 0.000
A$_4$ = 1.72873e−05
A$_6$ = 1.00905e−08
A$_8$ = −1.35814e−09
A$_{10}$ = 1.33056e−11

-continued

4th surface

K = −0.000
$A_4$ = 2.52626e−04
$A_6$ = −1.14136e−06
$A_8$ = 1.04373e−07
$A_{10}$ = −2.35489e−09

5th surface

K = 0.000
$A_4$ = 1.22053e−04
$A_6$ = 7.13556e−06
$A_8$ = 1.70641e−07

10th surface

K = −2.533
$A_4$ = 6.31518e−04
$A_6$ = −5.74248e−07
$A_8$ = −6.32104e−06

11th surface

K = 0.000
$A_4$ = 0.000
$A_6$ = 0.000
$A_8$ = −6.29881e−06
$A_{10}$ = 5.97918e−08

15th surface

K = 0.000
$A_4$ = −3.54293e−05
$A_6$ = 5.19930e−06
$A_8$ = −1.74258e−07
$A_{10}$ = 1.54906e−09

Zoom data(∞)

| | | | |
|---|---|---|---|
| Zoom ratio | | 6.8648 | |
| $f_1$ | | 24.2064 | |
| $f_2$ | | −6.19709 | |
| $f_3$ | | 10.2188 | |
| $f_4$ | | 16.6094 | |
| | WE | ST | TE |
| f(mm) | 6.62 | 17.07 | 45.48 |
| $F_{NO}$ | 3.04 | 4.20 | 4.96 |
| 2ω(°) | 66.80 | 25.34 | 9.63 |
| Im | 3.84 | 3.84 | 3.84 |
| Lens total length | 40.046 | 46.812 | 48.948 |
| BF | 6.276 | 5.619 | 4.729 |
| $d_3$ | 0.52 | 5.81 | 10.65 |
| $d_8$ | 11.72 | 6.73 | 0.91 |
| $d_{14}$ | 4.30 | 11.42 | 15.43 |
| $d_{16}$ | 4.71 | 4.08 | 3.16 |

EXAMPLE 6

| | | | |
|---|---|---|---|
| $r_1$ = 17.454 | $d_1$ = 0.80 | $n_{d1}$ = 1.84666 | $ν_{d1}$ = 23.78 |
| $r_2$ = 12.865 | $d_2$ = 3.88 | $n_{d2}$ = 1.59201 | $ν_{d2}$ = 67.07 |
| $r_3$ = −58.235(A) | $d_3$ = (Variable) | | |
| $r_4$ = −125.071(A) | $d_4$ = 0.90 | $n_{d3}$ = 1.83481 | $ν_{d3}$ = 42.71 |
| $r_5$ = 7.280(A) | $d_5$ = 1.86 | | |
| $r_6$ = −42.769 | $d_6$ = 0.70 | $n_{d4}$ = 1.88300 | $ν_{d4}$ = 40.76 |
| $r_7$ = 10.119 | $d_7$ = 0.21 | | |
| $r_8$ = 8.750 | $d_8$ = 1.79 | $n_{d5}$ = 1.94595 | $ν_{d5}$ = 17.98 |
| $r_9$ = 30.740 | $d_9$ = (Variable) | | |
| $r_{10}$ = ∞(S) | $d_{10}$ = −0.10 | | |
| $r_{11}$ = 5.514(A) | $d_{11}$ = 2.47 | $n_{d6}$ = 1.58313 | $ν_{d6}$ = 59.38 |
| $r_{12}$ = −19.113(A) | $d_{12}$ = 0.10 | | |
| $r_{13}$ = 8.251 | $d_{13}$ = 1.73 | $n_{d7}$ = 1.76200 | $ν_{d7}$ = 40.10 |
| $r_{14}$ = −15.102 | $d_{14}$ = 0.40 | $n_{d8}$ = 1.74077 | $ν_{d8}$ = 27.79 |
| $r_{15}$ = 3.763 | $d_{15}$ = (Variable) | | |
| $r_{16}$ = 18.149(A) | $d_{16}$ = 1.89 | $n_{d9}$ = 1.74320 | $ν_{d9}$ = 49.34 |
| $r_{17}$ = −82.182 | $d_{17}$ = (Variable) | | |
| $r_{18}$ = ∞ | $d_{18}$ = 0.50 | $n_{d10}$ = 1.51633 | $ν_{d10}$ = 64.14 |
| $r_{19}$ = ∞ | $d_{19}$ = 0.50 | | |
| $r_{20}$ = ∞ | $d_{20}$ = 0.50 | $n_{d11}$ = 1.51633 | $ν_{d11}$ = 64.14 |
| $r_{21}$ = ∞ | $d_{21}$ = 0.37 | | |
| $r_{22}$ = ∞(Light receiving surface of electronic image pickup apparatus, image plane) | | | |

Aspherical coefficients

3rd surface

K = 0.000
$A_4$ = 2.42732e−05
$A_6$ = −2.68713e−08
$A_8$ = −3.70576e−10
$A_{10}$ = 2.33544e−12

4th surface

K = 0.000
$A_4$ = −5.85214e−04
$A_6$ = 3.55846e−05
$A_8$ = −7.79620e−07
$A_{10}$ = 6.21999e−09

5th surface

K = 0.286
$A_4$ = −7.63152e−04
$A_6$ = 4.21741e−05
$A_8$ = −2.59939e−07
$A_{10}$ = 1.70717e−08

11th surface

K = −0.783
$A_4$ = 3.23319e−05
$A_6$ = 8.85408e−06
$A_8$ = 1.44538e−06
$A_{10}$ = 7.70421e−10

12th surface

K = 0.000
$A_4$ = 5.78909e−04
$A_6$ = 7.07219e−06
$A_8$ = 2.01554e−06
$A_{10}$ = 6.51954e−09

16th surface

K = 0.000
$A_4$ = 7.79852e−05
$A_6$ = 1.06241e−05
$A_8$ = −6.34354e−07
$A_{10}$ = 1.43679e−08

Zoom data(∞)

| | | | |
|---|---|---|---|
| Zoom ratio | | 6.69297 | |
| $f_1$ | | 26.0673 | |
| $f_2$ | | −6.29533 | |
| $f_3$ | | 10.4655 | |
| $f_4$ | | 20.1648 | |
| | WE | ST | TE |
| f(mm) | 6.63 | 17.10 | 44.37 |
| $F_{NO}$ | 3.41 | 4.73 | 4.78 |
| 2ω(°) | 67.32 | 25.96 | 9.74 |
| Im | 3.84 | 3.84 | 3.84 |
| Lens total length | 41.776 | 48.408 | 49.165 |
| BF | 5.677 | 6.466 | 4.523 |
| $d_3$ | 0.28 | 5.68 | 12.52 |
| $d_9$ | 13.05 | 6.95 | 1.85 |
| $d_{15}$ | 6.15 | 12.70 | 13.65 |
| $d_{17}$ | 4.18 | 4.99 | 3.04 |

EXAMPLE 7

| | | | |
|---|---|---|---|
| $r_1 = 24.029$ | $d_1 = 0.80$ | $n_{d1} = 1.92286$ | $\nu_{d1} = 18.90$ |
| $r_2 = 16.721$ | $d_2 = 3.10$ | $n_{d2} = 1.69350$ | $\nu_{d2} = 53.21$ |
| $r_3 = -64.356$(A) | $d_3 = $ (Variable) | | |
| $r_4 = -19.034$(A) | $d_4 = 0.92$ | $n_{d3} = 1.88300$ | $\nu_{d3} = 40.76$ |
| $r_5 = 8.072$(A) | $d_5 = 1.00$ | | |
| $r_6 = 10.147$ | $d_6 = 2.00$ | $n_{d4} = 1.92286$ | $\nu_{d4} = 18.90$ |
| $r_7 = 70.885$ | $d_7 = 0.48$ | | |
| $r_8 = -35.556$ | $d_8 = 0.62$ | $n_{d5} = 1.80610$ | $\nu_{d5} = 40.92$ |
| $r_9 = 26.083$ | $d_9 = $ (Variable) | | |
| $r_{10} = \infty$(S) | $d_{10} = 0.14$ | | |
| $r_{11} = 5.020$(A) | $d_{11} = 2.20$ | $n_{d6} = 1.49700$ | $\nu_{d6} = 81.54$ |
| $r_{12} = -14.716$(A) | $d_{12} = 0.10$ | | |
| $r_{13} = 7.125$ | $d_{13} = 1.95$ | $n_{d7} = 1.51633$ | $\nu_{d7} = 64.14$ |
| $r_{14} = 26.539$ | $d_{14} = 0.69$ | $n_{d8} = 1.66680$ | $\nu_{d8} = 33.05$ |
| $r_{15} = 3.488$ | $d_{15} = $ (Variable) | | |
| $r_{16} = 23.816$(A) | $d_{16} = 1.94$ | $n_{d9} = 1.69350$ | $\nu_{d9} = 53.21$ |
| $r_{17} = -27.840$(A) | $d_{17} = $ (Variable) | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$(Light receiving surface of electronic image pickup apparatus, image plane) | | | |

Aspherical coefficients

3rd surface $K = 0.000$
$A_4 = 1.35140\text{e}-05$
$A_6 = -2.33435\text{e}-08$
$A_8 = 1.23757\text{e}-10$
$A_{10} = -8.10882\text{e}-13$ 4th surface $K = 0.000$
$A_4 = 1.30512\text{e}-04$
$A_6 = 1.47815\text{e}-06$
$A_8 = -6.81221\text{e}-10$
$A_{10} = -2.70048\text{e}-10$ 5th surface $K = 0.000$
$A_4 = -1.58194\text{e}-04$
$A_6 = 5.63542\text{e}-06$
$A_8 = -1.07321\text{e}-07$
$A_{10} = 4.05133\text{e}-09$ 11th surface $K = 0.000$
$A_4 = -8.53942\text{e}-04$
$A_6 = -6.82689\text{e}-06$
$A_8 = -8.49045\text{e}-07$
$A_{10} = 2.14012\text{e}-07$ 12th surface $K = 0.000$
$A_4 = 5.35563\text{e}-04$
$A_6 = 7.59298\text{e}-06$
$A_8 = -6.23472\text{e}-07$
$A_{10} = 3.16243\text{e}-07$ 16th surface $K = 0.000$
$A_4 = 3.05386\text{e}-04$
$A_6 = -6.20989\text{e}-06$
$A_8 = -1.59636\text{e}-06$
$A_{10} = 5.53535\text{e}-08$ 17th surface $K = 0.000$
$A_4 = 2.79885\text{e}-04$
$A_6 = -2.10615\text{e}-05$ $A_8 = -1.08940\text{e}-06$
$A_{10} = 4.72480\text{e}-08$ Zoom data(∞)

| | |
|---|---|
| Zoom ratio | 6.73206 |
| $f_1$ | 28.5538 |
| $f_2$ | −7.36557 |
| $f_3$ | 10.7549 |
| $f_4$ | 18.7978 |

| | WE | ST | TE |
|---|---|---|---|
| f(mm) | 6.61 | 17.27 | 44.53 |
| $F_{NO}$ | 3.29 | 4.84 | 5.14 |
| $2\omega$(°) | 67.18 | 25.30 | 9.78 |
| Im | 3.84 | 3.84 | 3.84 |
| Lens total length | 40.027 | 47.980 | 49.290 |
| BF | 6.712 | 5.260 | 4.638 |
| $d_3$ | 0.67 | 6.69 | 13.63 |
| $d_9$ | 13.82 | 8.27 | 1.67 |
| $d_{15}$ | 2.87 | 11.81 | 13.39 |
| $d_{17}$ | 5.24 | 3.77 | 3.22 |

EXAMPLE 8

| | | | |
|---|---|---|---|
| $r_1 = 24.020$ | $d_1 = 0.80$ | $n_{d1} = 1.92286$ | $\nu_{d1} = 18.90$ |
| $r_2 = 16.572$ | $d_2 = 3.08$ | $n_{d2} = 1.69350$ | $\nu_{d2} = 53.21$ |
| $r_3 = -68.334$(A) | $d_3 = $ (Variable) | | |
| $r_4 = -21.830$(A) | $d_4 = 0.90$ | $n_{d3} = 1.83481$ | $\nu_{d3} = 42.71$ |
| $r_5 = 8.126$(A) | $d_5 = 1.00$ | | |
| $r_6 = 12.507$ | $d_6 = 2.01$ | $n_{d4} = 1.92286$ | $\nu_{d4} = 18.90$ |
| $r_7 = -160.265$ | $d_7 = 0.44$ | | |
| $r_8 = -27.890$ | $d_8 = 0.65$ | $n_{d5} = 1.88300$ | $\nu_{d5} = 40.76$ |
| $r_9 = 21.047$ | $d_9 = $ (Variable) | | |
| $r_{10} = \infty$(S) | $d_{10} = 0.14$ | | |
| $r_{11} = 5.061$(A) | $d_{11} = 2.20$ | $n_{d6} = 1.49700$ | $\nu_{d6} = 81.54$ |
| $r_{12} = -13.544$(A) | $d_{12} = $ (Variable) | | |
| $r_{13} = 7.030$ | $d_{13} = 1.95$ | $n_{d7} = 1.51633$ | $\nu_{d7} = 64.14$ |
| $r_{14} = 49.126$ | $d_{14} = 0.69$ | $n_{d8} = 1.66680$ | $\nu_{d8} = 33.05$ |
| $r_{15} = 3.499$ | $d_{15} = $ (Variable) | | |
| $r_{16} = 23.559$(A) | $d_{16} = 2.01$ | $n_{d9} = 1.69350$ | $\nu_{d9} = 53.21$ |
| $r_{17} = -26.698$(A) | $d_{17} = $ (Variable) | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$(Light receiving surface of electronic image pickup apparatus, image plane) | | | |

Aspherical coefficients

3rd surface $K = 0.000$
$A_4 = 1.17380\text{e}-05$
$A_6 = -2.24608\text{e}-08$
$A_8 = 2.75549\text{e}-10$
$A_{10} = -2.05321\text{e}-12$ 4th surface $K = 0.000$
$A_4 = -9.11156\text{e}-05$
$A_6 = 8.78426\text{e}-06$
$A_8 = -1.22764\text{e}-07$
$A_{10} = 5.28096\text{e}-10$ 5th surface $K = 0.000$
$A_4 = -3.85803\text{e}-04$ -continued $A_6 = 4.49285e-06$
$A_8 = 2.22686e-07$
$A_{10} = -3.14604e-09$
11th surface $K = 0.000$
$A_4 = -7.80650e-04$
$A_6 = -1.15675e-05$
$A_8 = -4.74312e-07$
$A_{10} = 2.42119e-07$
12th surface $K = 0.000$
$A_4 = 6.50113e-04$
$A_6 = 9.15799e-07$
$A_8 = 7.50956e-08$
$A_{10} = 3.30091e-07$
16th surface $K = 0.000$
$A_4 = 2.91274e-04$
$A_6 = -5.95470e-06$
$A_8 = -2.42391e-06$
$A_{10} = 8.28202e-08$
17th surface $K = 0.000$
$A_4 = 2.44954e-04$
$A_6 = -2.01991e-05$
$A_8 = -1.81550e-06$
$A_{10} = 6.89403e-08$ Zoom data(∞)

| Zoom ratio | 6.73995 |
|---|---|
| $f_1$ | 29.1282 |
| $f_2$ | -6.99367 |
| $f_3$ | 7.71607 |
| $f_4$ | -11.0709 |
| $f_5$ | 18.3461 |

| | WE | ST | TE |
|---|---|---|---|
| f(mm) | 6.61 | 17.26 | 44.55 |
| $F_{NO}$ | 3.26 | 4.84 | 5.14 |
| 2ω(°) | 66.87 | 25.18 | 9.74 |
| Im | 3.84 | 3.84 | 3.84 |
| Lens total length | 39.613 | 47.505 | 49.236 |
| BF | 6.808 | 4.964 | 4.637 |
| $d_3$ | 0.70 | 6.81 | 13.68 |
| $d_9$ | 13.25 | 7.94 | 1.68 |
| $d_{12}$ | 0.10 | 0.49 | 0.96 |
| $d_{15}$ | 2.89 | 11.43 | 12.41 |
| $d_{17}$ | 5.43 | 3.50 | 3.22 |

A spherical aberration (SA), an astigmatism (AS), a distortion (DT), and a chromatic aberration of magnification (CC) at the wide angle end, at the intermediate zoom state defined in the present invention, and at the telephoto end, at the time of infinite object point focusing according to the first embodiment to the eighth embodiment described above, are shown in FIG. 9A, FIG. 9B, and FIG. 9C to FIG. 16A, FIG. 16B, and FIG. 16C.

In the diagram, 'ω' is a half image angle.

Values of conditional expressions (1) to (22) in the embodiments are given below.

| | Example 1 | Example 2 | Example 3 | Example 4 |
|---|---|---|---|---|
| (1) $\Delta 2G_{ws}/f_w$ | 0.351 | 0.247 | 0.300 | 0.476 |
| (2) $\Delta 2G_{st}/f_t$ | -0.128 | -0.138 | -0.131 | -0.124 |
| (A) $\Delta 1G_{ws}/\Delta 2G_{ws}$ | 3.308 | 4.863 | 4.026 | 1.011 |
| (B) $\Delta 1G_{st}/\Delta 2G_{st}$ | -0.154 | -0.086 | -0.179 | -1.197 |

-continued

| | | | | |
|---|---|---|---|---|
| (C) $\Delta 3G_{ws}/\Delta 2G_{ws}$ | 2.916 | 4.470 | 3.771 | 2.369 |
| (D) $\Delta 3G_{st}/\Delta 2G_{st}$ | 0.028 | -0.141 | -0.138 | -0.233 |
| (E) $\beta_{4Gs}/\beta_{4Gw}$ | 1.086 | 1.126 | 1.134 | 1.027 |
| (F) $\beta_{3Gs}/\beta_{3Gw}$ | 1.517 | 1.496 | 1.526 | 1.686 |
| (G) $\beta_{3Gw}$ | -1.050 | -0.943 | -0.941 | -0.978 |
| (H) $\beta_{5Gs}/\beta_{5Gw}$ | | | | |
| (I) $\beta_{34Gs}/\beta_{34Gw}$ | | | | |
| (J) $\beta_{34Gw}$ | | | | |
| (3) $SF_{2n1}$ | 0.996 | 0.278 | 0.342 | 0.483 |
| (4) $n_{d2n1}$ | 1.835 | 1.835 | 1.835 | 1.835 |
| (5) $\nu_{d2n1}$ | 42.710 | 42.710 | 42.710 | 42.710 |
| (6) $n_{d2n2}$ | 1.88300 | 1.88300 | 1.88300 | 1.88300 |
| (7) $\nu_{d2n2}$ | 40.760 | 40.760 | 40.760 | 40.760 |
| (8) $n_{d2p}$ | 1.94595 | 1.92286 | 1.92286 | 1.92286 |
| (9) $\nu_{d2p}$ | 17.984 | 18.900 | 18.900 | 18.900 |
| (10) $(\|asp_{2n1l}\| + \|asp_{2n1r}\|)/f_w$ | 0.0122 | 0.0400 | 0.0334 | 0.0266 |
| (12) $d_{1np}/d_1$ | 0.000 | 0.024 | 0.000 | 0.000 |
| (13) $n_{d1p}$ | 1.59201 | 1.69350 | 1.69350 | 1.69350 |
| (14) $\nu_{d1p}$ | 67.069 | 53.210 | 53.210 | 53.210 |
| (15) $n_{d1n}$ | 1.84666 | 1.92286 | 1.92286 | 1.92286 |
| (16) $\nu_{d1n}$ | 23.780 | 18.900 | 18.900 | 18.900 |
| (17) $\|f_2/f_t\|$ | 0.133 | 0.170 | 0.165 | 0.155 |
| (18) $f_1/f_t$ | 0.574 | 0.625 | 0.636 | 0.617 |
| (19) $f_3/f_t$ | 0.226 | 0.249 | 0.242 | 0.233 |
| (20) $f_{RE}/f_t$ | 0.421 | 0.422 | 0.417 | 0.417 |
| (21) $f_t/f_w$ | 6.790 | 6.712 | 6.723 | 6.718 |
| (22) $I_m/f_w$ | 0.583 | 0.580 | 0.580 | 0.579 |

| | Example 5 | Example 6 | Example 7 | Example 8 |
|---|---|---|---|---|
| (1) $\Delta 2G_{ws}/f_w$ | 0.228 | 0.190 | 0.282 | 0.255 |
| (2) $\Delta 2G_{st}/f$ | -0.060 | -0.137 | -0.125 | -0.114 |
| (A) $\Delta 1G_{ws}/\Delta 2G_{ws}$ | 4.507 | 5.282 | 4.225 | 4.635 |
| (B) $\Delta 1G_{st}/\Delta 2G_{st}$ | -0.767 | -0.124 | -0.246 | -0.352 |
| (C) $\Delta 3G_{ws}/\Delta 2G_{ws}$ | 4.312 | 5.845 | 3.974 | 4.160 |
| (D) $\Delta 3G_{st}/\Delta 2G_{st}$ | -1.125 | 0.164 | -0.185 | -0.232 |
| (E) $\beta_{4Gs}/\beta_{4Gw}$ | 1.062 | 0.940 | 1.133 | |
| (F) $\beta_{3Gs}/\beta_{3Gw}$ | 1.522 | 1.831 | 1.531 | |
| (G) $\beta_{3Gw}$ | -1.034 | -0.973 | -0.928 | |
| (H) $\beta_{5Gs}/\beta_{5Gw}$ | | | | 1.179 |
| (I) $\beta_{34Gs}/\beta_{34Gw}$ | | | | 1.487 |
| (J) $\beta_{34Gw}$ | | | | -1.023 |
| (3) $SF_{2n1}$ | 0.455 | 0.890 | 0.404 | 0.457 |
| (4) $n_{d2n1}$ | 1.835 | 1.835 | 1.883 | 1.835 |
| (5) $\nu_{d2n1}$ | 42.710 | 42.710 | 40.760 | 42.710 |
| (6) $n_{d2n2}$ | 1.88300 | 1.88300 | 1.80610 | 1.88300 |
| (7) $\nu_{d2n2}$ | 40.760 | 40.760 | 40.920 | 40.760 |
| (8) $n_{d2p}$ | 1.94595 | 1.94595 | 1.92286 | 1.92286 |
| (9) $\nu_{d2p}$ | 17.984 | 17.984 | 18.900 | 18.900 |
| (10) $(\|asp_{2n1l}\| + \|asp_{2n1r}\|)/f_w$ | 0.0469 | 0.0109 | 0.0282 | 0.0270 |
| (12) $d_{1np}/d_1$ | 0.000 | 0.000 | 0.000 | 0.000 |
| (13) $n_{d1p}$ | 1.74320 | 1.59201 | 1.69350 | 1.69350 |
| (14) $\nu_{d1p}$ | 49.340 | 67.069 | 53.210 | 53.210 |
| (15) $n_{d1n}$ | 1.94595 | 1.84666 | 1.92286 | 1.92286 |
| (16) $\nu_{d1n}$ | 17.984 | 23.780 | 18.900 | 18.900 |
| (17) $\|f_2/f_t\|$ | 0.136 | 0.142 | 0.165 | 0.157 |
| (18) $f_1/f_t$ | 0.532 | 0.588 | 0.641 | 0.654 |
| (19) $f_3/f_t$ | 0.225 | 0.236 | 0.242 | 0.173 |
| (20) $f_{RE}/f_t$ | 0.365 | 0.454 | 0.422 | 0.674 |
| (21) $f_t/f_w$ | 6.865 | 6.693 | 6.732 | 6.740 |
| (22) $I_m/f_w$ | 0.580 | 0.579 | 0.581 | 0.581 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 17:
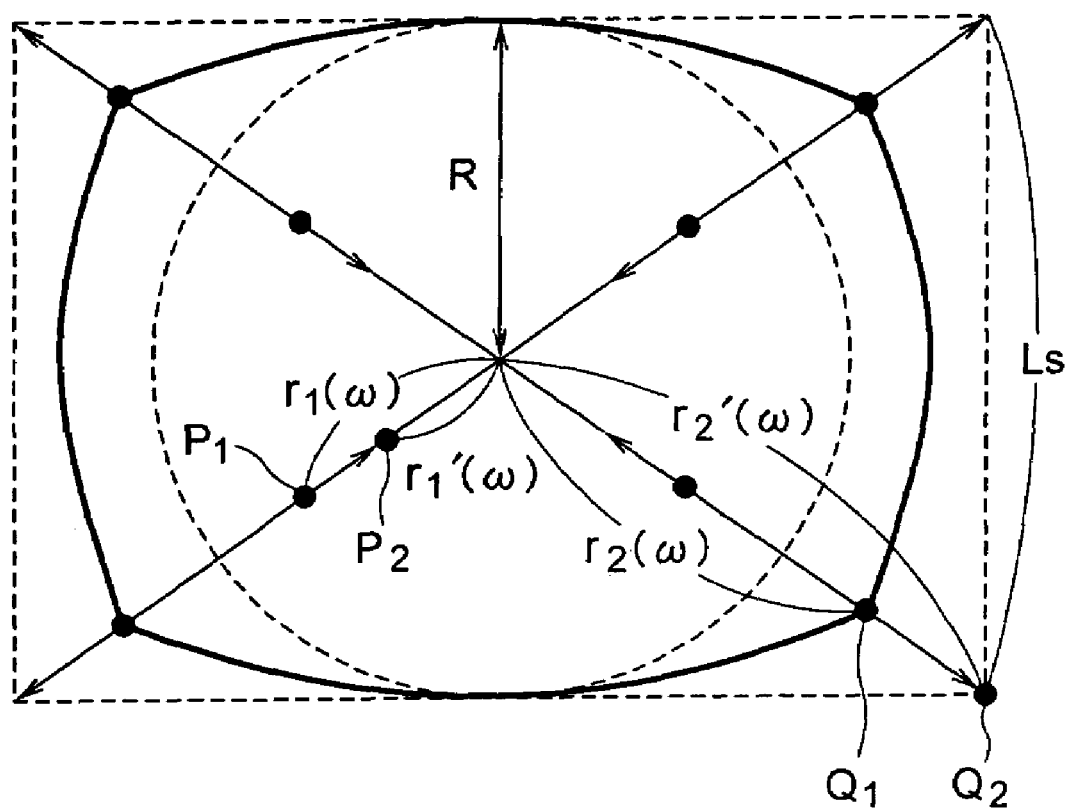
FIG. 17 is a diagram describing a correction of a distortion.

For example, as shown in FIG. 17, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 17, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward (in) a direction away from the center of the circle.

Here, $r'(\omega)$ can be expressed as follows.

$$r'(\omega) = \alpha \cdot f \tan \omega \quad (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it is considered to be advantageous from a point of amount of data and amount of calculation.

Incidentally, an optical image ceases to be a continuous amount at a point of time when an image is picked up by an electronic image pickup element (for sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the zooming does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be carried out by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image becomes asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that $r(\omega)$, in other words, a relationship of half image angle and the image height, or a relationship between a real image height r and an ideal image height $r'/\alpha$ is recorded in a recording medium which is built-in in the electronic image pickup apparatus.

For an image after the distortion correction not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result is obtained which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shaped distortion is remained to some extent. Moreover, when the number of divided zones is increased, there arises a need to hold specific data necessary for correction, additionally in a recording medium. For this reason, it is not preferable to increase the number of divided zones. Therefore, one or a plurality of coefficients associated with each focal length in the focal point zones which are divided, are calculated in advance. The coefficients may be determined based on a measurement by simulation or a measurement by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may be let to be a final amount of correction by multiplying uniformly the coefficient for each focal length with respect to this amount of correction.

Incidentally, when there is no distortion in an image obtained by imaging of an infinite object, the following relationship $$f = y / \tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shaped distortion in the imaging system, the relationship becomes $$f > y / \tan \omega.$$

In other words, when the focal length f of the imaging system, and the image height y are let to be fixed, a value of $\omega$ becomes large.

(Digital Camera)

Figure 18:
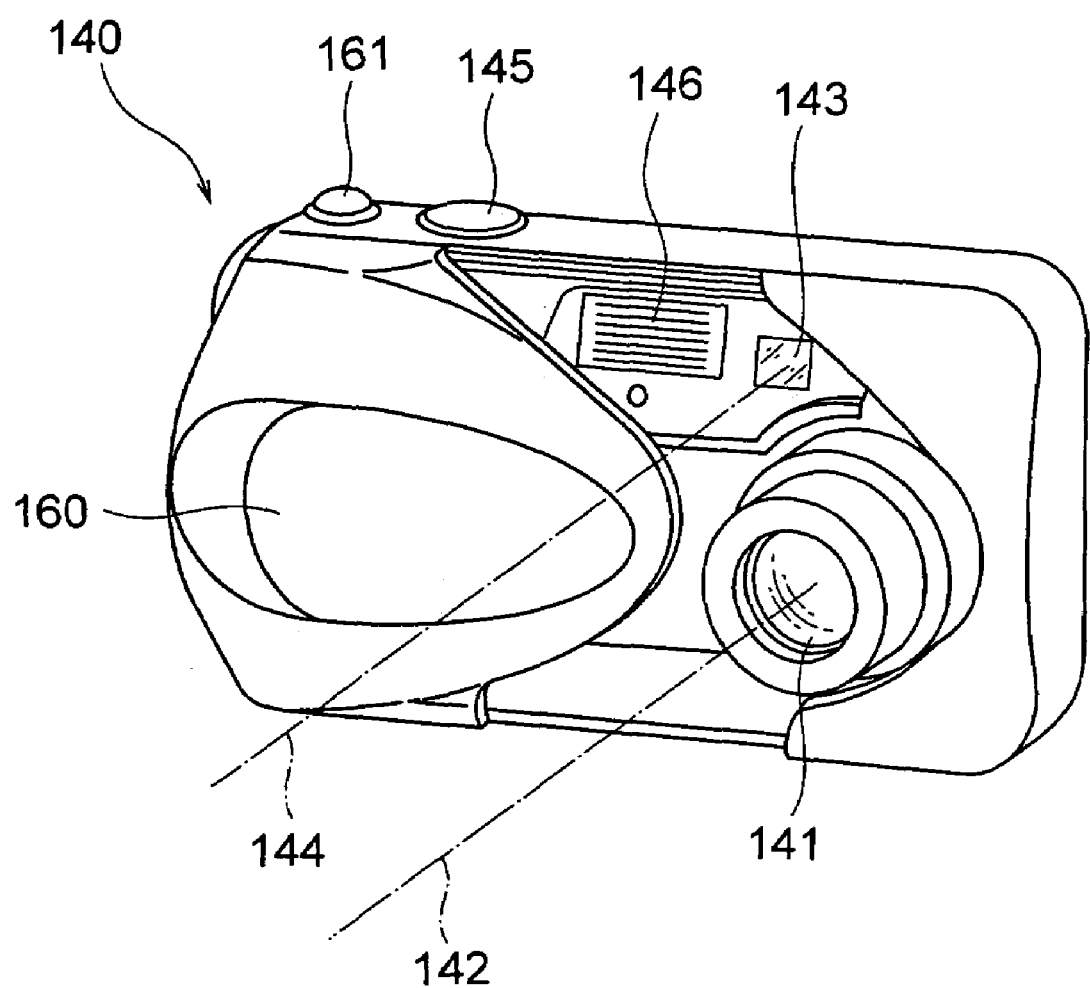
FIG. 18 is a front perspective view showing an appearance of a digital camera in which, the zoom lens system according to the present invention is incorporated.
Figure 19:
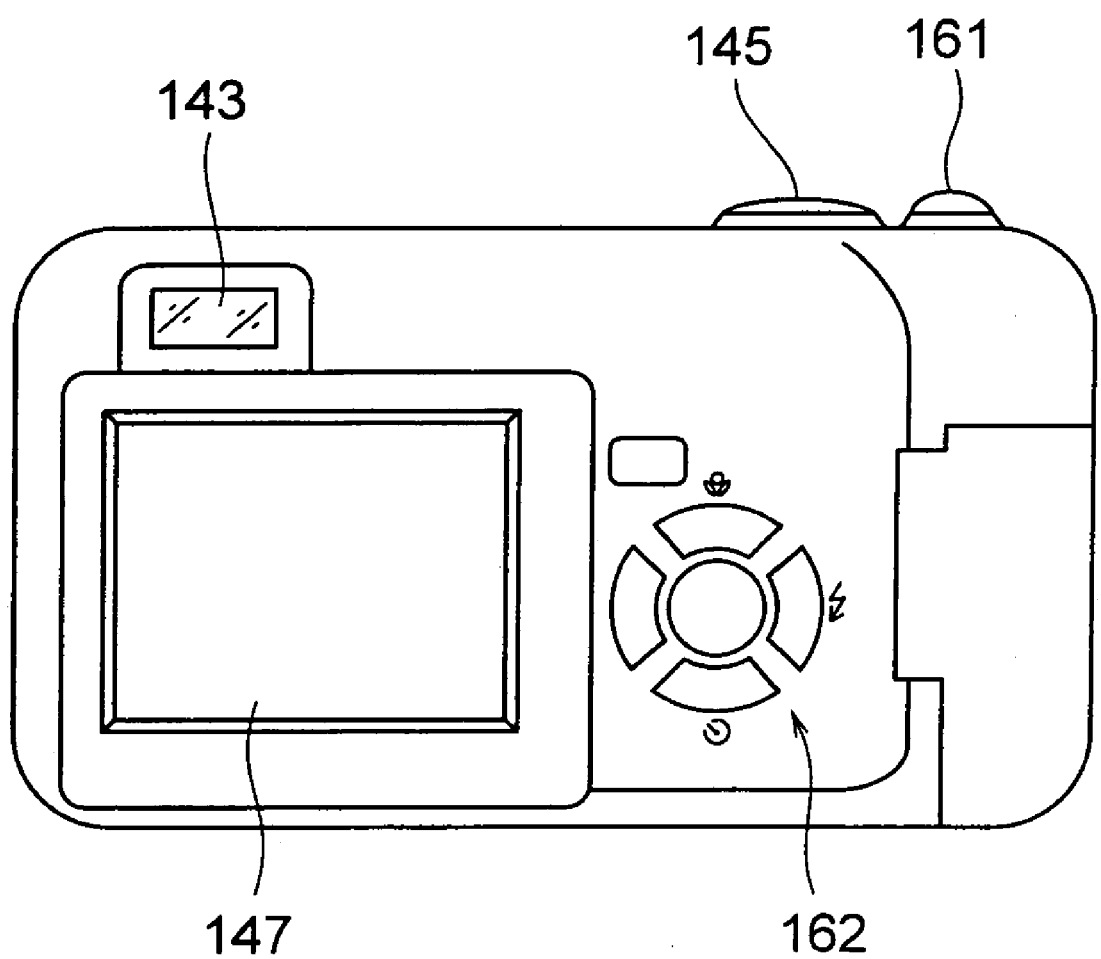
FIG. 19 is a rear perspective view of the digital camera in FIG. 18.
Figure 20:
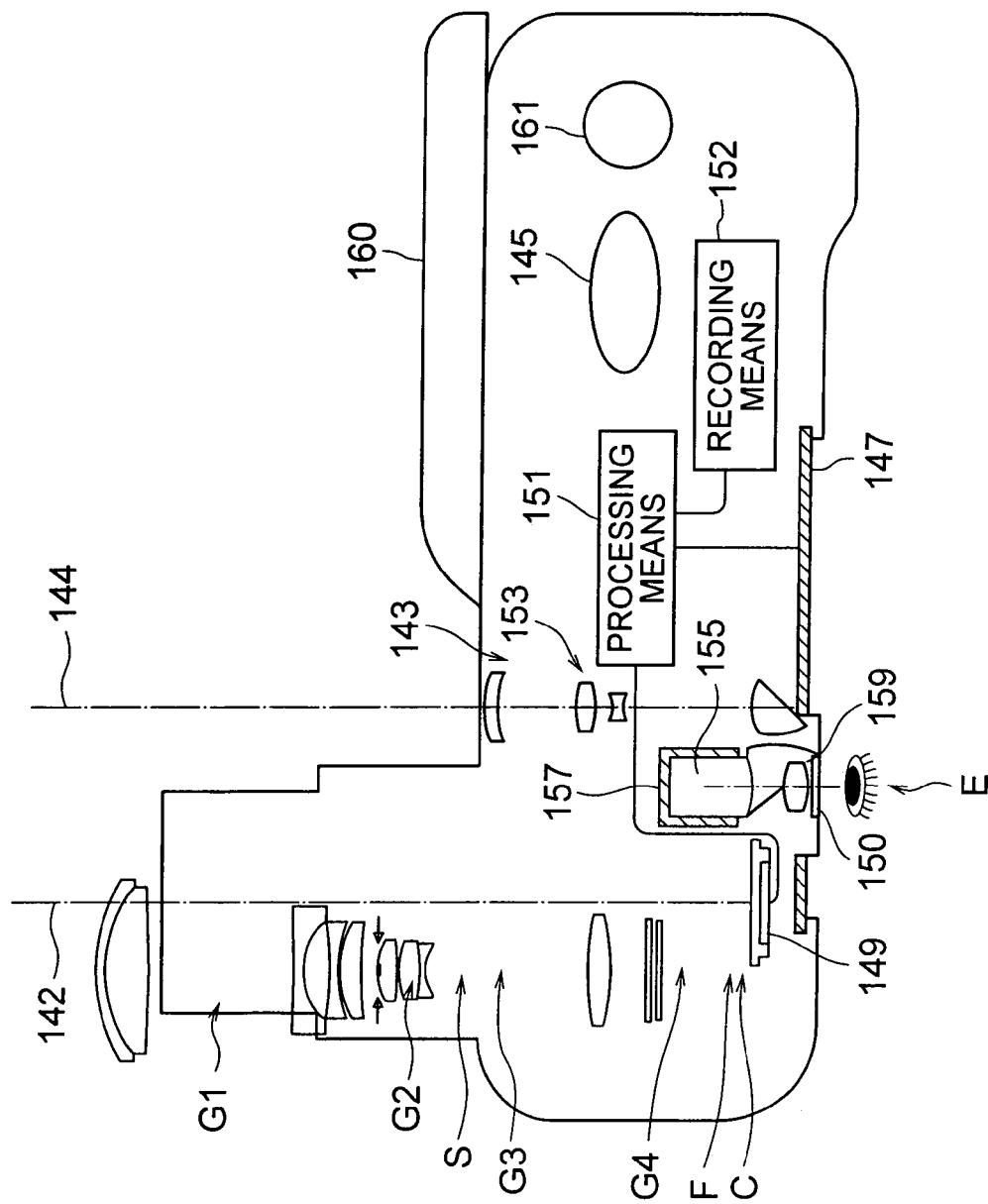
FIG. 20 is a cross-sectional view of the digital camera in FIG. 18.

FIG. 18 to FIG. 20 are conceptual diagrams of a structure of a digital camera according to the present invention in which, a zoom lens system described above is incorporated in a taking optical system 141. FIG. 18 is a front perspective view showing an appearance of a digital camera 140, FIG. 19 is a rear perspective view of the same, and FIG. 20 is a schematic cross-sectional view showing a structure of the digital camera 140. FIG. 18 and FIG. 20 show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera 140 is set in a photo taking state, the taking optical system 141 assumes the uncollapsed state shown in FIG. 20, and when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver salt film is disposed instead of the CCD 149.

Furthermore, a finder objective optical system 153 is disposed on the finder optical path 144. The finder objective optical system 153 consists of a plurality of lens units (three lens units in the diagram), and two prisms, and is made of a zoom optical system in which, a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141, which, according to the present invention, has an extremely small thickness (is extremely slim) in collapsed state, and an extremely stable imaging performance in the entire zooming region at high magnification, it is possible to realize a high-performance, a small size, and a widening of angle.

(Internal Circuit Structure)

FIG. 21 is a structural block diagram of an internal circuit of main components of the digital camera 140. In the following description, the processing means 151 described above includes for instance, a CDS/ADC section 124, a temporary storage memory 117, and an image processing section 118, and a storage means consists of a storage medium section 119, for example.

As shown in FIG. 21, the digital camera 140 includes an operating section 112, a control section 113 which is connected to the operating section 112, the temporary storage memory 117, and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside by a user of the digital camera via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light, an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117, image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically, various image-processing including the distortion correction, based on image-quality parameters specified by the control section 113.

The storage medium section 119 is a recording (storage) medium in the form of a card or a stick including a flash memory for instance, which is detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from these memories.

The digital camera 140 structured in such manner has the taking optical system 141 according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side end and the telephoto side end is possible.

As it has been described above, the present invention is useful for a zoom lens system having a high zooming ratio of about seven times, in which, the slimming of the digital camera is taken into consideration.

As it has been described above, the present invention is useful for a zoom lens system having a high zooming ratio of about seven times, in which the slimming of the digital camera is taken into consideration.

What is claimed is:

1. A zoom lens system comprising in order from an object side thereof:

a first lens unit having a positive refracting power, a second lens unit having a negative refracting power, and a rear lens group having a positive refracting power, which includes a third lens unit having a positive refracting power; and an aperture stop which is disposed between the second lens unit and the third lens unit, wherein at a time of zooming from a wide angle end to a telephoto end, when focused on an object at a longest distance, at the telephoto end, the first lens unit moves to be positioned more toward an object side, than at a wide angle end, at the telephoto end, the second lens unit moves to be positioned more toward an image side, than at the wide angle end, at the telephoto end, the aperture stop moves to be positioned more toward the object side, than at the wide angle end, and at the telephoto end, the third lens unit moves to be positioned more toward the object side, than at the wide angle end, and a combined system of the first lens unit and the second lens unit at the wide angle end has a negative refracting power, and at the time of zooming from the wide angle end to the telephoto end, the second lens unit is positioned more toward the object side than a position of the second lens unit at the wide angle end, and when a state in which, the second lens unit is positioned closest to the object is defined as an intermediate zoom state, at the intermediate zoom state, the first lens unit moves to be positioned more toward the object side, than at the wide angle end, at the intermediate zoom state, the aperture stop moves to be positioned more toward the object side, than at the wide angle end, at the intermediate zoom state, the third lens unit moves to be positioned more toward the object side, than at the wide angle end, and at the intermediate zoom state, an object point of the third lens unit moves to be positioned more toward the object side, than at the wide angle•end, and the zoom lens system satisfies the following conditional expression $$5.0 < f_t/f_w < 15.0 \tag{21}$$

where, $f_w$ is a focal length at the wide angle end, of the entire zoom lens system, and $f_t$ is a focal length at the telephoto end, of the entire zoom lens system.

2. The zoom lens system according to claim 1, wherein at the time of zooming from the wide angle end to the telephoto end, the following conditional expressions are satisfied $$0.06 < \Delta 2G_{\_ws}/f_w < 1.5 \quad (1)$$

$$-0.6 < \Delta 2G_{\_st}/f_t < -0.02 \quad (2)$$

where, $\Delta 2G_{\_ws}$ is a difference in a distance of a position of the second lens unit at the wide angle end and a position of the second lens unit at the intermediate zoom state, $\Delta 2G_{\_st}$ is a difference in a distance of a position of the second lens unit at the intermediate zoom state and a position of the second lens unit at the telephoto end, $f_w$ is a focal length at the wide angle end, of the entire zoom lens system, and $f_t$ is a focal length at the telephoto end, of the entire zoom lens system, and a reference numeral in a direction of advancement toward the image side has a minus sign, and a reference numeral in a direction of advancement toward the object side has a plus sign.

3. The zoom lens system according to claim 2, wherein at the time of zooming from the wide angle end to the telephoto end, the following conditional expressions are satisfied $$0.9 < \Delta 1G_{\_ws}/\Delta 2G_{\_ws} < 10.0 \quad (A)$$

$$-2.0 < \Delta 1G_{\_st}/\Delta 2G_{\_st} < 0.3 \quad (B)$$

$$2.0 < \Delta 3G_{\_ws}/\Delta 2G_{\_ws} < 10.0 \quad (C)$$

$$-1.5 < \Delta 3G_{\_st}/\Delta 2G_{\_st} < 0.5 \quad (D)$$

where, $\Delta 1G_{\_ws}$ is a difference in a distance of a position of the first lens unit at the wide angle end and a position of the first lens unit at the intermediate zoom state, $\Delta 1G_{\_st}$ is a difference in a distance of a position of the first lens unit at the intermediate zoom state and a position of the first lens unit at the telephoto end, $\Delta 3G_{\_ws}$ is a difference in a distance of a position of the third lens unit at the wide angle end and a position of the third lens unit at the intermediate zoom state, and $\Delta 3G_{\_st}$ is a difference in a distance of a position of the third lens unit at the intermediate zoom state and a position of the third lens unit at the telephoto end, and a reference numeral in a direction of advancement toward the image side has a minus sign and a reference numeral in a direction of advancement toward the object side has a plus sign.

4. The zoom lens system according to claim 2, where the rear lens group comprises a fourth lens unit having a positive refracting power, which is disposed toward the image side of the third lens unit, and the zoom lens system is a four-unit zoom lens system.

5. The zoom lens system according to claim 4, wherein the zoom lens system satisfied the following conditional expressions $$0.8 < \beta_{4Gs}/\beta_{4Gw} < 1.3 \quad (E),$$

$$1.3 < \beta_{3Gs}/\beta_{3Gw} < 3.0 \quad (F)$$

$$-1.3 < \beta_{3Gw} < -0.8 \quad (G)$$

where, $\beta_{3Gw}$ denotes a lateral magnification of the third lens unit, at a wide angle end, $\beta_{3Gs}$ denotes a lateral magnification of the third lens unit, at the intermediate zoom state, $\beta_{4Gw}$ denotes a lateral magnification of the fourth lens unit, at the wide angle end, and $\beta_{4Gs}$ denotes a lateral magnification of the fourth lens unit, at the intermediate zoom state.

6. The zoom lens system according to claim 2, wherein the rear lens group comprises a fourth lens unit having a negative refracting power and a fifth lens unit having a positive refracting power, which are disposed toward the image side of the third lens unit, and in the intermediate zoom state, the fourth lens unit moves to be positioned more toward the object side, than at the wide angle end, and the zoom lens system is a five-unit zoom lens system.

7. The zoom lens system according to claim 6, wherein the zoom lens system satisfies the following conditional expressions $$0.8 < \beta_{5Gs}/\beta_{5Gw} < 1.3 \quad (H),$$

$$1.3 < \beta_{34Gs}/\beta_{34Gw} < 3.0 \quad (I)$$

$$-1.3 < \beta_{34Gw} < -0.9 \quad (J)$$

where, $\beta_{34Gw}$ denotes a lateral magnification of a combined system of the third lens unit and the fourth lens unit, at a wide angle end, $\beta_{34Gs}$ denotes a lateral magnification of the combined system of the third lens unit and the fourth lens unit, at the intermediate zoom state, $\beta_{5Gw}$ denotes a lateral magnification of the fifth lens unit, at the wide angle end, and $\beta_{5Gs}$ denotes a lateral magnification of the fifth lens unit, at the intermediate zoom state.

8. The zoom lens system according to claim 1, wherein a lens surface closest to the object, of the second lens unit is a concave surface, and a lens surface closest to the image, of the first lens unit is a convex surface.

9. The zoom lens system according to claim 1, wherein the second lens unit comprises two negative lenses namely a first negative lens which is disposed closest to the object side in the second lens unit, and a second negative lens which is disposed toward an image side of the first negative lens, and a first positive lens, and the number of total lens elements included in the second lens unit is three.

10. The zoom lens system according to claim 9, wherein the zoom lens system satisfies the following conditional expression $$-0.5 < SF_{2n1} < 1.0 \quad (3)$$

where, $SF_{2n1}$ is defined as $SF_{2n1} = (R_{2n1f} + R_{2n1r})/(R_{2n1f} - R_{2n1r})$, when $R_{2n1f}$ is a paraxial radius of curvature of a surface on the object side, of the first negative lens, and $R_{2n1r}$ is a paraxial radius of curvature of a surface on an image side of the first negative lens.

11. The zoom lens system according to claim 9, wherein the zoom lens system satisfies the following conditional expressions $$1.78 < n_{d2n1} < 2.20 \quad (4)$$

$$35 < v_{d2n1} < 50 \quad (5)$$

where, $n_{d2n1}$ denotes a refractive index for a d-line, of the first negative lens, and $v_{d2n1}$ denotes an Abbe's number for the first negative lens.

12. The zoom lens system according to claim 9, wherein the zoom lens system satisfies the following conditional expressions $$1.78 < n_{d2n2} < 2.00 \quad (6)$$

$$35 < v_{d2n2} < 50 \quad (7)$$

where, $n_{d2n2}$ denotes a refractive index for a d-line, of the second negative lens, and $v_{d2n2}$ denotes an Abbe's number for the second negative lens.

13. The zoom lens system according to claim 9, wherein the zoom lens system satisfies the following conditional expressions $$1.84 < n_{d2p} < 2.20 \quad (8)$$

$$13 < v_{d2p} < 30 \quad (9)$$

where, $n_{d2p}$ denotes a refractive index for a d-line, of the first positive lens, and $v_{d2p}$ denotes an Abbe's number for the first positive lens.

14. The zoom lens system according to claim 9, wherein one surface or both surfaces of the first negative lens in the second lens unit is or are aspheric, and the zoom lens system satisfies the following conditional expression $$0.005 < (|asp_{2n1f}| + |asp_{2n1r}|)/f_w < 0.1 \quad (10)$$

where, $asp_{2n1f}$ denotes an aspherical deviation of the negative lens closest to the object, in the second lens unit, at a lens surface toward the object, $asp_{2n1r}$ denotes an aspherical deviation of the negative lens closest to the object, in the second lens unit, at a lens surface toward the image, and fw denotes a focal length at the wide angle end, of the entire zoom lens system.

15. The zoom lens system according to claim 9, wherein the second lens unit comprises in order from the object side thereof, the first negative lens, the second negative lens, and the positive lens.

16. The zoom lens system according to claim 9, wherein the second lens unit comprises in order from the object side thereof, the first negative lens, the first positive lens, and the second negative lens.

17. The zoom lens system according to claim 1, wherein the first lens unit comprises a first positive lens and a first negative lens, and the total number of lens elements in the first lens unit is two.

18. The zoom lens system according to claim 17, wherein each of the first negative lens and the first positive lens is a single lens.

19. The zoom lens system according to claim 18, wherein a distance on an optical axis between first negative lens and the first positive lens in the first lens unit satisfies the following condition expression $$0.0 \leq d_{1np}/d_1 < 0.2 \quad (12)$$

where, $d_{1np}$ denotes the distance on the optical axis between the first negative lens and the first positive lens in the first lens unit, and $d_1$ denotes a total thickness of the first lens unit on the optical axis.

20. The zoom lens system according to claim 17, wherein the first negative lens and the first positive lens in the first lens unit are cemented.

21. The zoom lens system according to claim 17, wherein the zoom lens system satisfies the following conditional expressions $$1.47 < n_{d1p} < 1.90 \quad (13)$$

$$40 < v_{d1p} < 85 \quad (14)$$

$$1.75 < n_{d1n} < 2.05 \quad (15)$$

$$12 < v_{d1n} < 31 \quad (16)$$

where, $n_{d1p}$ denotes a refractive index for a d-line, of the first positive lens, $v_{d1p}$ denotes an Abbe's number for the first positive lens, $n_{d1n}$ denotes a refractive index for a d-line, of the first negative lens, and $v_{d1n}$ denotes an Abbe's number for the first negative lens.

22. The zoom lens system according to claim 17, wherein the first lens unit comprises in order from the object side thereof, the first negative lens and the first positive lens.

23. The zoom lens system according to claim 1, wherein the total number of lens elements included in the third lens unit is three.

24. The zoom lens system according to claim 23, wherein the third lens unit comprises in order from the object side thereof, three lenses namely a positive lens, a positive lens, and a negative lens.

25. The zoom lens system according to claim 1, wherein the zoom lens system satisfies the following conditional expression $$0.08 < |f_2/f_t| < 0.24 \quad (17)$$

where, $f_2$ denotes a focal length of the second lens unit, and $f_t$ denotes a focal length of the entire zoom lens system, at a telephoto end.

26. The zoom lens system according to claim 1, wherein the zoom lens system satisfies the following conditional expression $$0.3 < f_1/f_t < 0.95 \quad (18)$$

where, $f_1$ denotes a focal length of the first lens unit, and $f_t$ denotes a focal length of the entire zoom lens system, at a telephoto end.

27. The zoom lens system according to claim 1, wherein the zoom lens system satisfies the following conditional expression $$0.1 < f_3/f_t < 0.5 \quad (19)$$

where, $f_3$ denotes a focal length of the third lens unit, and $f_t$ denotes a focal length of the entire zoom lens system at a telephoto end.

28. The zoom lens system according to claim 1, wherein the rear lens group comprises a lens unit having a positive refracting power closest to the image, which is different from the third lens unit, and the zoom lens system satisfies the following conditional expression $$0.2 < f_{RE}/f_t < 0.6 \tag{20}$$

where, $f_{RE}$ denotes a focal length of the lens unit which is positioned closest to the image, in the rear lens group, and $f_t$ denotes a focal length of the entire zoom lens system, at a telephoto end.

29. An electronic image pickup apparatus comprising:
a zoom lens system according to claim 1, and
an image pickup element which converts an image formed by the zoom lens system, to an electric signal.

30. The electronic image pickup apparatus according to claim 29, wherein the electronic image pickup apparatus satisfies the following conditional expression $$0.4 < I_m/f_w < 0.8 \tag{22}$$

where, $I_m$ denotes a maximum image height in an effective image pickup area, and $f_w$ denotes a focal length of the entire zoom lens system, at a wide angle end.

* * * * *